US005808300A

United States Patent [19]

Caprioli

[11] Patent Number: 5,808,300

[45] Date of Patent: Sep. 15, 1998

[54] METHOD AND APPARATUS FOR IMAGING BIOLOGICAL SAMPLES WITH MALDI MS

[75] Inventor: Richard M. Caprioli, Houston, Tex.

[73] Assignee: Board of Regents, The University of Texas System, Austin, Tex.

[21] Appl. No.: 854,040

[22] Filed: May 9, 1997

Related U.S. Application Data

[60] Provisional application No. 60/017,241 May 10, 1996.

[51] Int. Cl.[6] .................. B01D 59/44

[52] U.S. Cl. .................. 250/288; 250/281; 250/282

[58] Field of Search .................. 250/288, 281, 250/282

[56] References Cited

U.S. PATENT DOCUMENTS

| | | | |
|---|---|---|---|
| 5,241,569 | 8/1993 | Fleming | 376/159 |
| 5,272,338 | 12/1993 | Winograd et al. | 250/309 |
| 5,372,719 | 12/1994 | Afeyan et al. | 210/502.1 |
| 5,453,199 | 9/1995 | Afeyan et al. | 210/638 |
| 5,569,915 | 10/1996 | Purser et al. | 250/281 |
| 5,594,243 | 1/1997 | Weinberger et al. | 250/288 |
| 5,607,859 | 3/1997 | Biemann et al. | 436/173 |

OTHER PUBLICATIONS

Article: Capillary Electrophoresis Combined with Matrix–Assisted Laser Desorption/Ionization Mass Spectrometry; Continuous Sample Deposition on a Matrix–precoated Membrane Target; *Journal of Mass Spectrometry;* vol. 31, 1039–1046, Jun. 21, 1996.

*Primary Examiner*—Kiet T. Nguyen
*Attorney, Agent, or Firm*—Browning Bushman

[57] ABSTRACT

MALDI MS has been used to generate images of samples in one or more m/z pictures, providing the capability of mapping concentrations of specific molecules in X,Y coordinates of the original sample. For sections of mammalian tissue, for example, this can be accomplished in two ways. First, tissue slices can be directly analyzed after thorough drying and application of a thin coating of matrix by electrospray. Second, imprints of the tissue can be analyzed by blotting the dry tissue sections on specially prepared targets, e.g., C-18 (10 μm dia.) beads. Peptides and small proteins bind to the C-18 and create a positive imprint of the tissue which can be imaged by MALDI MS after application of matrix. Such images can be displayed in individual m/z values as a selected ion image which would localize individual compounds in the tissue, as summed ion images, or as a total ion image which would be analogous to a photomicrograph. This imaging process may also be applied to separation techniques where a physical track or other X,Y deposition process is utilized, for example, in the CE/MALDI MS combination where a track is deposited on a membrane target.

27 Claims, 44 Drawing Sheets

METHOD AND APPARATUS FOR IMAGING BIOLOGICAL SAMPLES WITH MALDI MS

This application is a provisional application Ser. No. 60/017,241, filed May 10, 1996.

BACKGROUND OF THE INVENTION

The combination of capillary electrophoresis (CE) and mass spectrometry (MS) provides an effective technique for the analysis of femtomole/attomole amounts of proteins and peptides. The low load levels and high separation efficiency of capillary electrophoresis are well suited to the mass measurement capability and high sensitivity of mass spectrometry. A considerable amount of work has been published using electrospray mass spectrometry for on-line coupling to capillary electrophoresis. For typical electrospray or ion spray sources, CE flow rates are too low for direct coupling and an interface is used where make up solvents are added to provide flow rates of about 0.5–1 $\mu$l/min. Microelectrospray sources can be operated at flow rates of less than 50 nL/min, with some operating into the picoliter/min flow rate range. For both high and low flow rate sources, separation and molecular analysis of peptide mixtures by on line CE/MS techniques have been successfully demonstrated.

Matrix-assisted laser desorption ionization mass spectrometry (MALDI MS) is a second technique that has the capability for coupling to CE because of its high sensitivity, ease of use, and compatibility as an effective off-line method. Although several direct flow methods are under development with MALDI MS, these have not yet demonstrated the capabilities necessary for effective coupling to separation techniques. On the other hand, static sampling systems using MALDI MS have demonstrated extremely high sensitivities, as illustrated in a recent report demonstrating attomole sensitivity for the analysis of peptides contained in complex physiological salt solutions. Further, matrix precoated cellulose targets have been used to analyze 100% aqueous samples without the need of further treatment with organic solvents.

A 1992 report described the off-line coupling of CE with MALDI MS. Subsequently, several other investigators reported several types of interfaces for off-line fraction collection. The effective coupling of the ground electrode with the target for techniques using repetitive sample spotting, while maintaining the separation efficiency of CE, remains deficient. Improper coupling can produce a "memory effect", and to help reduce this effect, either a sheath flow or a high electroosmotic flow rate has been utilized. However, one consequence of this is that the sensitivity of MALDI MS is compromised. Other problems involve difficulties associated with the addition of MALDI matrix to the collected effluent, and the separation resolution lost in collecting discrete sample drops of the CE effluent. MALDI MS of samples deposited on membranes or other surfaces has been reported by a number of workers and includes use of PVDF, nylon, polyethylene and thin layer chromatography plates composed of silica gel and cellulose. Off-line coupling of CE with other detection methods, such as immunodetection and conventional staining methods, have produced several interfaces which utilize membranes. Commonly, the membrane is placed between the exit end of a capillary and the ground electrode and solutes, such as proteins and peptides, that migrate electrophoretically out of the capillary are adsorbed onto the membrane and are subsequently analyzed.

Several other reports have described the use of MALDI for the analysis of specific peptides in whole cells. Several papers describe the analysis of some neuropeptides directly in single neurons of the mollusk *Lymnaea stagnalis*. Isolated neurons were ruptured, mixed with small volumes of matrix, and analyzed. The ability of MALDI MS to be used to elucidate some of the metabolic processing involved in neuropeptide production from precursor peptides has also been demonstrated. Also, a single neuron from *Aplypsia californica* was analyzed for several specific neuropeptides using a procedure involving removal of excess salt by rinsing with matrix solution.

A considerable amount of work has been described for use of secondary ion mass spectrometry (SIMS) for the spacial arrangement of elements in surfaces of samples including biological tissue and organic polymers. In addition, there have been recent efforts to apply the SIMS technique to organic compounds and metabolites in biological samples. One recent report describes conditions for generating secondary ion mass spectra from samples with choline chloride and acetylcholine chloride deposited onto specimens of porcine brain tissue. Samples were then exposed to a primary ion beam of massive glycerol clusters. Images generated from the spacially arranged SIMS spectra were obtained that reflected the identity and location of the spiked analytes. U.S. Pat. No. 5,272,338 describes a specific instrument setup using a liquid metal ion source to ionize a sample in a mass spectrometer, and then a laser beam to irradiate the ejected molecules and resonantly ionize them. The method involves a technique commonly referred to as SIMS/cross beam laser ionization.

U.S. Pat. Nos. 5,372,719 and 5,453,199 disclose techniques for preparing a chemically active surface so that when a sample is exposed to this surface, a chemical image of the sample is deposited on the surface. The disclosed methods involve the separation of molecules by sorbents.

U.S. Pat. No 5,607,859 describes a method for the MS determination of highly polyionic analytes by the interaction of oppositely charged molecules. U.S. Pat. No. 5,569,915 discloses an MS instrument for fragmenting molecules in the gas phase. U.S. Pat. No. 5,241,569 describes neutron activation analysis for detecting gamma rays and beta-electrons from radioactively labeled samples. This technique may be used to locate elements in a sample.

The prior art does not disclose techniques which effectively employ the capability of MALDI MS to analyze and effectively depict a quantity of molecules of interest with a specific atomic mass or within a selected atomic mass window as a function of their position on the test sample. Moreover, prior art does not effectively combine CE with MALDI MS to analyze samples.

SUMMARY OF THE INVENTION

Capillary electrophoresis (CE) and matrix-assisted laser desorption ionization mass spectrometry (MALDI MS) are combined in an off-line arrangement to provide separation and mass analysis of peptide and protein mixtures in the attomole range. A membrane target, precoated with MALDI matrix was used for the continuous deposition of effluent exiting from a CE device. A sample track was produced by linear movement of the target during the electrophoretic separation and this track was subsequently analyzed by MALDI MS. The technique is effective for peptides and proteins, having limits of detection (S/N>3) of about 50 attomoles for neurotensin (1,673 daltons) and 250 attomoles for cytochrome c (12,361 daltons) and apomyoglobin (16, 951 daltons). The electrophoretic separation achieved from the membrane target, as measured by theoretical plate numbers from the mass spectrometric data, can be as high as 80–90% of that achieved by on-line UV detection under optimal conditions, although band broadening occurs and can decrease separation efficiency. Non-volatile buffers such as 10–50 mM phosphate can also be used in the electrophoresis process and directly deposited on the membrane. The use of post-source decay techniques is shown for peptides in the CE sample track in order to obtain sequence verification. The effectiveness of this method of integration of CE and MALDI MS is demonstrated with both peptide and protein mixtures and with the analysis of a tryptic digest of a protein.

The off-line coupling of CE and MALDI MS is described by continuous effluent deposition on a matrix-precoated cellulose membrane which is then used as the MALDI MS target. The continuous deposition of the CE buffer exiting the capillary produces a sample 'track' on the membrane. The membrane precoating procedure allows a high degree of separation efficiency to be maintained through the detection step. The limit of detection achieved for analysis of peptides is typically in the 50–100 attomole range.

MALDI MS has been shown to be quite versatile in its many applications to the analysis of biological samples, especially to peptides and proteins. Typically, samples are mixed with an organic compound which acts as a matrix to facilitate ablation and ionization of compounds in the sample. The presence of this matrix is necessary to provide the required sensitivity and specificity to use laser desorption techniques in the analysis of biological material. The application of thin layers of matrix has special advantages, particularly when very high sensitivity is needed. Methods are also disclosed for the preparation of cellulose membranes precoated with a thin matrix layer for the direct deposition and analysis of aqueous samples. This technique circumvents the problems of mixing and dilution of samples when post addition of matrix is done and effectively allows small (nanoliter) volumes of samples to be applied to the target. These methods are important to the development of an effective off-line capillary electrophoresis/MALDI MS analysis technique.

The use of MALDI MS techniques is disclosed for the imaging of biological samples, e.g., tissue sections, where the spacial arrangement of specific compounds is to be determined. Two different approaches are described; direct targeting of the tissue itself and analysis of blotted targets previously exposed to the tissue. Direct analysis is demonstrated for the spacial arrangement of peptide hormones insulin, glucagon, and gastrin in a slice of rat pancreatic tissue. In addition, spacial detection of peptides in a slice of rat pituitary and in a preparation of human endothelial cells are presented. Sections of tissue were prepared and a thin layer of matrix was applied to the surface with subsequent MALDI MS analysis. Indirect imaging was accomplished using contact blotting of the tissue on specially prepared C-18 coated membranes. Matrix was applied after blotting. The spacial arrangement of peptides in rat pituitary and pancreas is described.

The ability to image a sample in order to obtain the detailed spacial arrangement of compounds in an ordered target sample such as a slice of tissue using MALDI MS would be enormous value in biological research. Selected ion surface maps of such samples could provide details of compound compartmentalization, site-specific metabolic processing, and selective binding domains for a very wide variety of natural and synthetic compounds.

It is an object of the present invention to provide improved techniques which use mass analysis to determine, and preferably to visually depict, quantitative information regarding the atomic mass of molecules of interest as a function of the spacial arrangement of numerous successive laser spots on a test specimen.

It is a related object of the present invention to improve the capability of matrix-assisted laser desorption ionization mass spectrometry by providing for graphic displays of molecules within a selected atomic mass or within a selected atomic mass window as a function of the X,Y location of laser spots on the sample.

It is another object of the present invention to provide an improved apparatus for analyzing a test sample containing molecules of interest by providing a laser source for sequentially striking a test specimen with laser beams at a plurality of laser spots to sequentially release sample molecules of interest from each laser spot. A moving mechanism is provided for sequentially moving the test specimen relative to the laser beam a predetermined linear distance functionally related to the size of a laser spots both prior and subsequent to the movement. The mass analyzer then measures the atomic mass-to-charge for the released sample molecules over a range of atomic masses. Atomic mass data is input to a computer, and the atomic mass within a selected atomic mass window of interest, which most narrowly may be a specific atomic mass, is then depicted as a function of individual laser spots on the test specimen.

It is a feature of the present invention that improved techniques are provided for analyzing the spacial arrangement of specific molecules within a sample by mass analysis. A very thin sample layer may be generated and combined with an energy absorbant matrix to form a test specimen which is then sequentially struck by a laser beam. The sample layer generated is preferably less than 50 microns in thickness.

It is another feature of the invention that the atomic mass of molecules within an atomic mass window of interest may be graphically depicted as a function of the linear distance between successive laser spots. A related feature is that numerous laser spots on a test specimen may be prearranged in an X,Y plot, and the atomic mass of molecules within the atomic mass window of interest may be graphically displayed as a function of a plurality of laser spots arranged within the X,Y plot, thereby providing a graphical depiction of the atomic mass of the molecules of interest.

It is a further feature of the invention that blotting techniques may be used to blot the sample on a blotting surface. The blotting surface may be a liquid absorbing surface, a chemically prepared surface, or a biologically prepared surface.

A significant feature of the present invention is that the atomic mass data is obtained in real time. Atomic mass data may thus be measured by the mass analyzer and displayed during or shortly after the laser spot on the sample is formed by the laser. The mass analyzer may be analyzing molecules of interest and the mass data displayed for one laser spot while the equipment is moving to another laser spot and/or the new laser spot is being struck by the laser. Since data is obtained substantially in real time, selective data laser spots or pixels may be used to first generate a indication of the molecules of interest on the sample surface. If desired, each of the selected pixels may be "filled in" by taking appropriate data from numerous potential laser spots locations on the test sample.

It is a related feature of the invention that the system may be used to display the atomic mass of molecules of interest within a plurality of windows of interest to determine the spacial arrangement of specific molecules within the sample.

Yet another feature of the invention is that relatively small laser spots are formed on the sample. A mask may be used to confine the width of each laser spot to less than about 25 microns. The linear spacing between successive samples is preferably a function of the width of the preceding and subsequent laser spots. In a representative embodiment, two laser spots each having a width of about 25 microns are separated by the linear distance of approximately 50 microns between the centerpoints of the laser spots.

Yet another feature of the present invention is that techniques are provided for substantially drying the sample to minimize movement of sample molecules within the sample layer prior to striking the test specimen with laser pulses. The sample layer may be dried in a vacuum dessicator or a hydrolyzer for at least two hours.

Yet another significant feature of the present invention is that capillary electrophoresis may be effectively combined with mass spectrometry to analyze a test sample. A sample solution containing test molecules of interest is obtained, and the sample solution then passed through a capillary tube and deposited in a linear track on an electrically-conductive target plate. The sample solution may then be dried in the linear track. The laser beam may then be used to strike the dried linear track such that molecules of interest are released and are then measured in a mass spectrometer. Analyzing the atomic masses as a function of time provides an indication of the position of the molecules of interest along the linear track.

Still another feature of the present invention is that the sample solution may be deposited on a linear track along a strip of cellulose material which preferably has a thin layer of an energy absorbing matrix bonded thereto. The sample solution may be passed through the capillary tube and onto the target at a very low flow rate of less than about 1 microliter per minute.

A significant advantage of the present invention is that relatively minor modifications may be made to existing equipment which is then capable of obtaining a significantly improved analysis results by using the techniques of the present invention.

It is another advantage of the invention is that improved graphical software is readily available for displaying atomic mass information as a function of the X,Y plot of numerous laser spots on the target sample.

Still another advantage of the invention is that improved X,Y positioning mechanisms are available so that successive laser spots may be accurately positioned at relatively short linear spacings.

These and further objects, features and advantages of the present invention will become apparent from the following detailed description, wherein reference is made to the figures in the accompanying drawings.

BRIEF DESCRIPTION OF THE DRAWINGS

In FIG. 13*a*, a large circular area generated on wetting of the surface with 5 nL aqueous solution followed by drying. The two small dark spots in this area were caused by exposure to the laser beam (10 shots each). FIG. 13*b* is a magnified view of the inset region in the photograph in FIG. 13*a*.

DETAILED DESCRIPTION OF PREFERRED EMBODIMENTS

Figure 29:
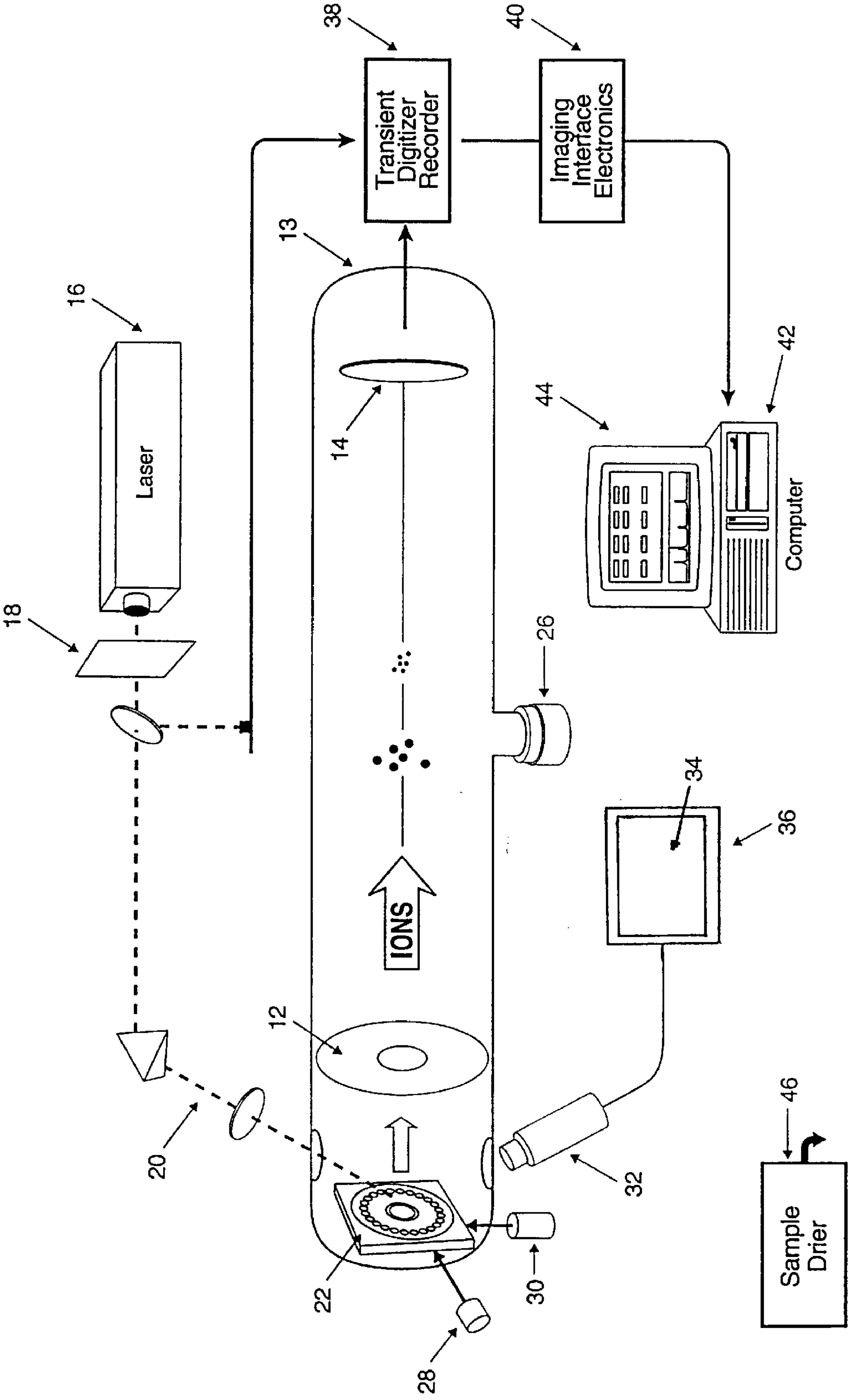
FIG. 29 depicts a suitable apparatus for analyzing a test sample containing molecules of interest, including a laser source, a moving mechanism for sequentially moving the test specimen relative to the laser beam, a mass analyzer, a computer, and a display screen. A sample drier representative of a vacuum dessicator or hydrolyzer is depicted for drying a sample.

FIG. 29 generally depicts a suitable system for analyzing a test sample containing molecules of interest. The system includes a MALDI MS analyzer 10 including acceleration/focus plates 12 and detector 14. A laser source 16 generates a laser beam that passes through a beam adjusting mechanism or mask 18 and suitable optics 20 for striking a sample target 22 containing the test sample, thereby releasing molecules of interest of various atomic masses which are detected by the detector 14. The test sample is provided in a vacuum chamber, which is maintained at a desired vacuum by the pump 26. A suitable moving mechanism as discussed subsequently is provided for sequentially moving the test specimen relative to the laser beam a predetermined linear distance between successive laser spots. The moving mechanism is generally depicted by X movement motor 28 and Y movement motor 30. The laser spots on the sample plate 22 may be visually detected during this operation by camera 32 which illustrates a laser spot 34 on a video monitor 36.

The output from the detector 14 is input to a transient digital recorder 38 and then to an imaging interface electronics 40 discussed subsequently. Computer 42 is provided for processing the data, and a conventional display 44 is provided for depicting atomic mass data as a function of individual laser spots on the test specimen. As disclosed subsequently, a suitable sample drier 46 is provided for drying the sample prior to being input into the analyzer 10.

Figure 30:
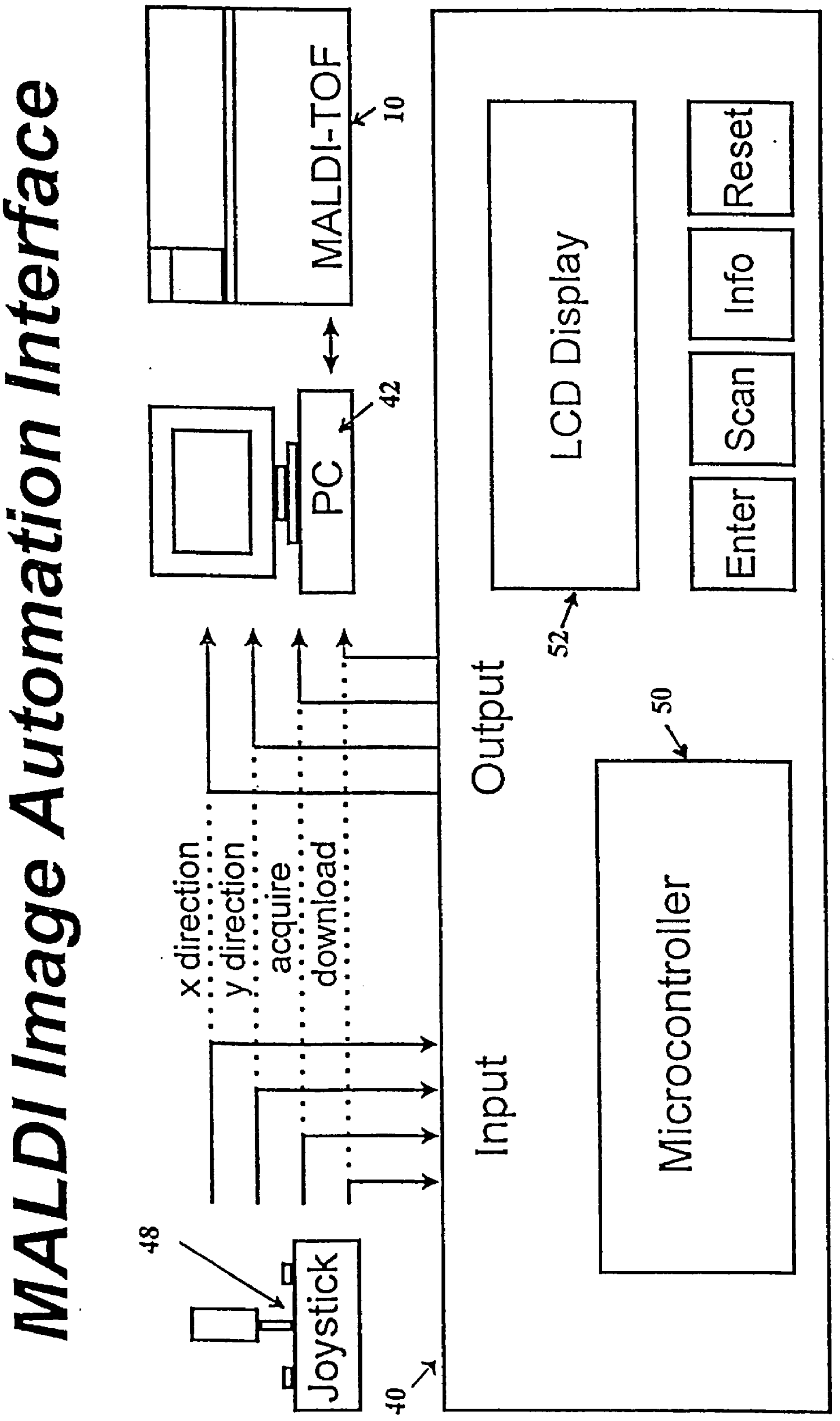
FIG. 30 is a schematic representation of the image automation interface shown in FIG. 29.

FIG. 30 depicts in greater detail the imaging interface electronics 40 generally shown in FIG. 29. A conventional joystick control 48 may be used for selectively regulating movement of the sample target 22 in the X direction and the Y direction, and may also be manipulated to a sample plate "acquire" and a sample plate "download" position. MALDI time-of-flight mass spectrometer 10 thus interfaces with the computer 42 as described subsequently. The imaging interface electronics 40 includes a microcontroller 50 and a suitable LCD display 52. Various controls may be provided for regulating the enter, scan, input, and reset functions of the interface 40.

Figure 31:
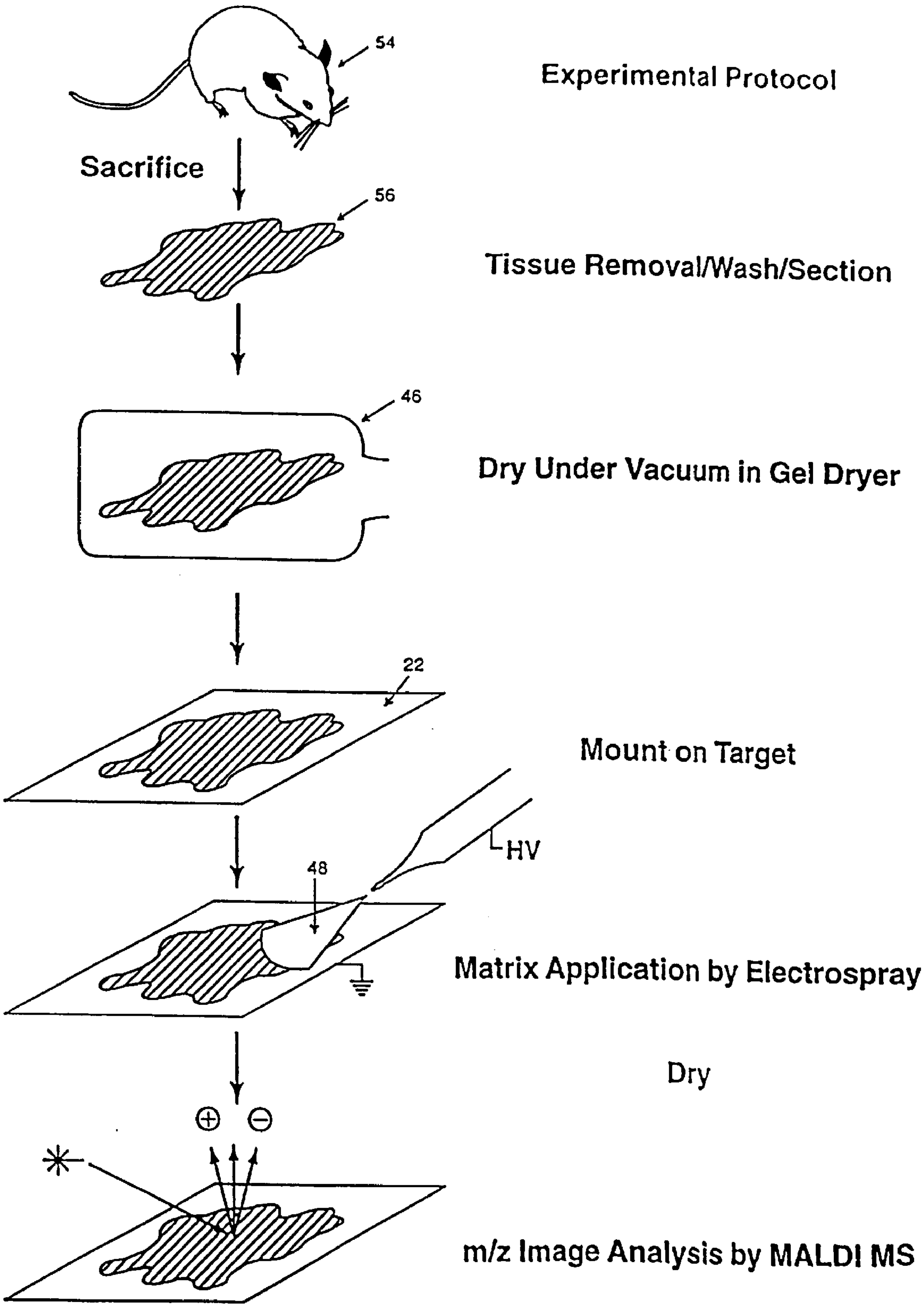
FIG. 31 is a typical experimental procedure, in flow diagram form, for the image analysis of a tissue from an animal. The experimental protocol could involve normal metabolic events, drug therapy, tumor growth, etc.

FIG. 31 generally depicts an exemplary sequence for obtaining an image analysis of biological tissue by MALDI MS. The experimental protocol is depicted as rat 54, which is used as described subsequently to generate a tissue slice 56. The tissue slice is dried by a suitable drier 46 discussed above then mounted on target plate 22. Electrospray techniques may be used to supply a suitable energy-absorbing matrix 48 on the tissue sample, and the tissue sample then dried. The tissue sample with the matrix is then subject to the image analysis process as described subsequently, wherein a laser beam strikes the tissue sample to release molecules of interest.

Figure 32:
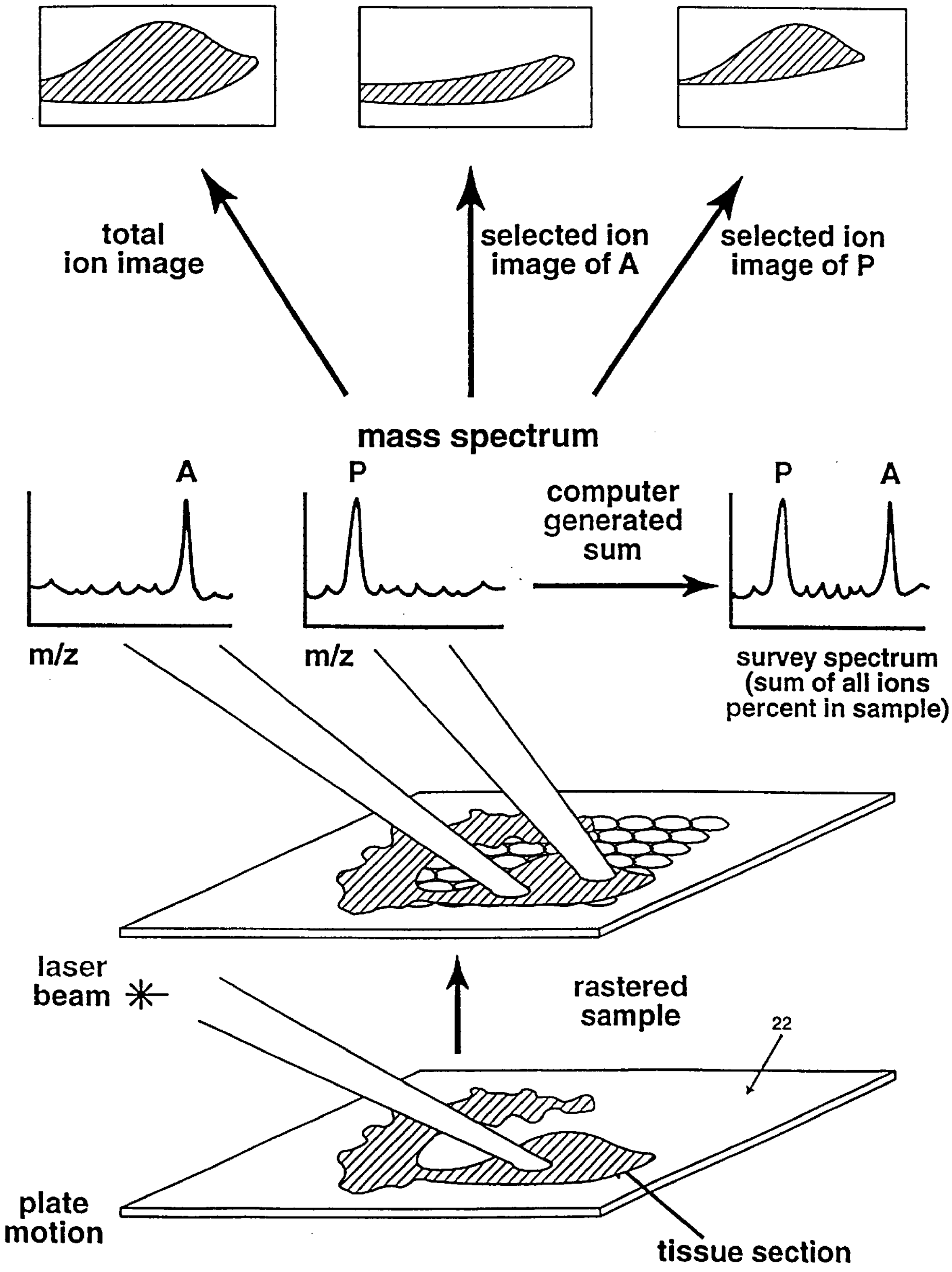
FIG. 32 is an overall imaging process depicted as a flow diagram. The example tissue contains two areas (A and P) which contain different molecules of interest, molecules A and P, respectively. The method thus identifies the location of these molecules in the tissue.

FIG. 32 depicts the sample plate 22 with the tissue section thereon, conceptually illustrates a laser beam for striking the tissue sample at different locations when the plate 22 moves relative to the beam. A sample is then rastered to different positions as shown in FIG. 32 and will thus generate mass spectra for both the A position and for the P position. These mass spectra data may be passed to a computer and a combined mass spectra provided with the A peaks and P. A total ion image may then be depicted, or alternatively a selected ion image of A or a selected ion image of P depicted.

Figure 33:
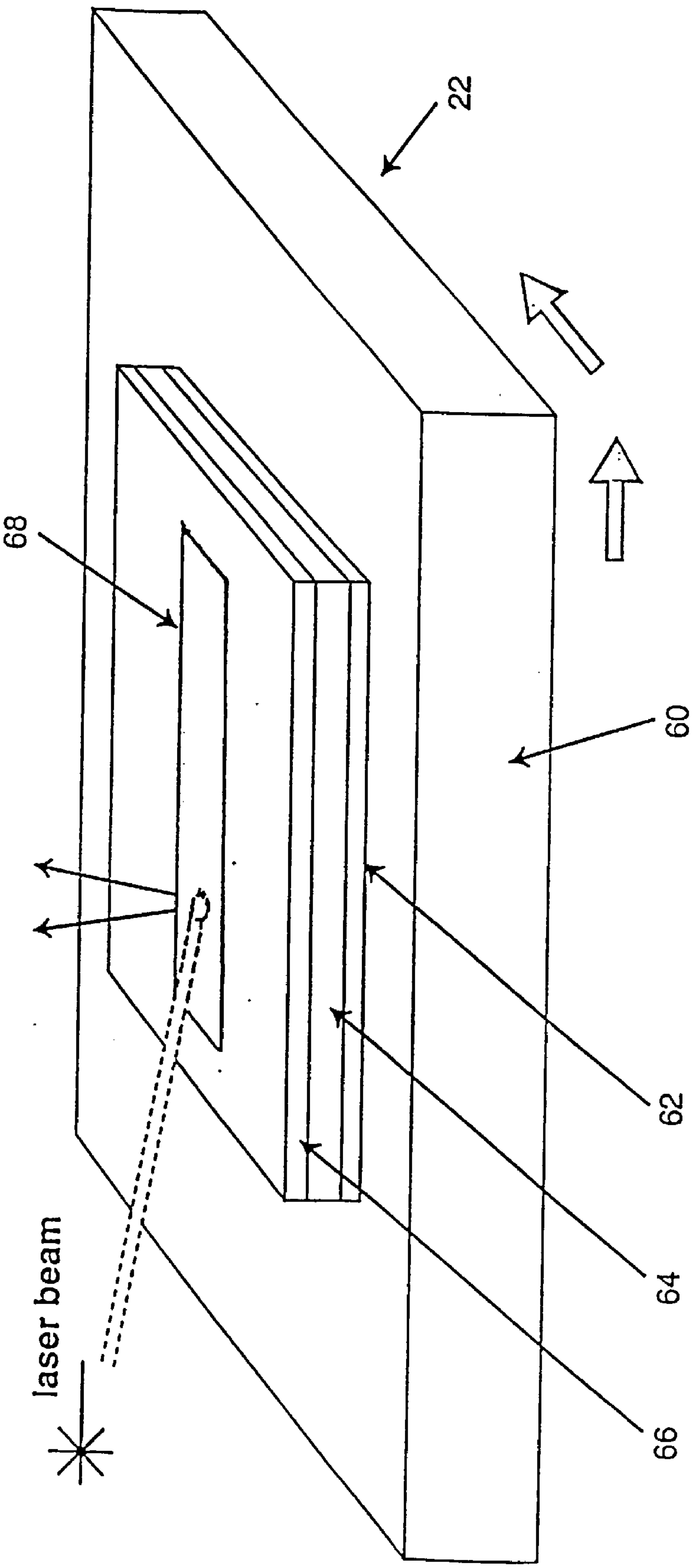
FIG. 33 shows a sample track deposited on a membrane target and shows imaging of the compounds along this track by MALDI MS.

FIG. 33 generally depicts a sample target 22 which is used in the technique involving CE combined with MALDI MS described below. A stainless steel target plate 60 includes a spray mounted glue layer 62 thereon, with a cellulose membrane 64 positioned on the glue layer. An energy-absorbing matrix layer 66 is provided on top of the cellulose membrane, and an elongate sample track 68 is then provided on the membrane. A laser beam strikes the sample track and forms a laser spot thereon, thereby releasing ions. The X,Y motor discussed above may then be used to reposition the plate 22 to another location such that the laser beam strikes a new spot on the sample track 68.

Figure 34:
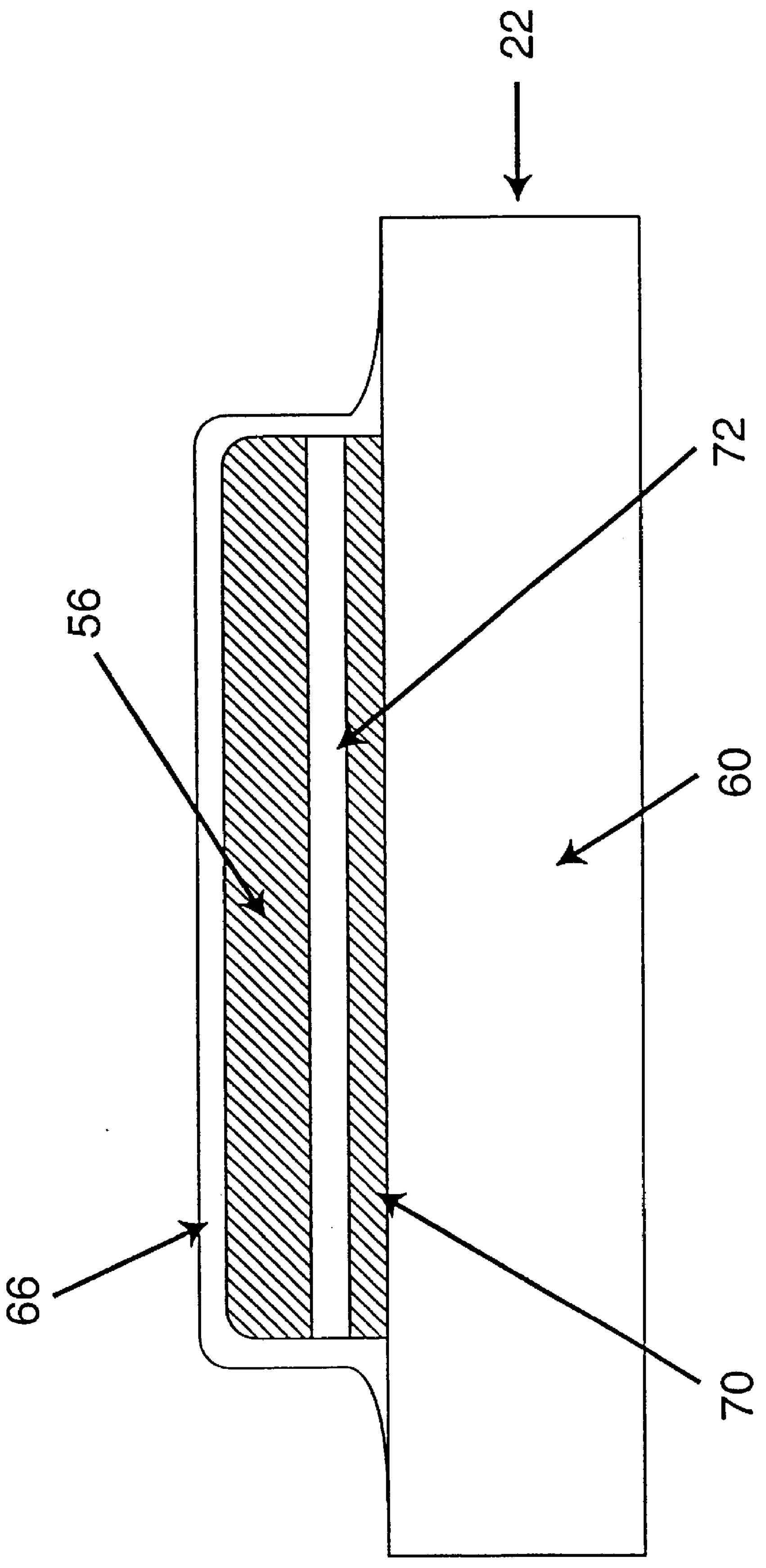
FIG. 34 is a typical sample preparation target, shown in cross-section, depicting the various components making up the imaged sample.

FIG. 34 discloses a sample target for a technique which involves MALDI MS analysis without CE. In this case, a stainless steel target plate 60 is provided on a double-sided sticky tape 70, and a membrane support 72 provided on the top of the sticky tape. The dried tissue slice 56 as shown in FIG. 31 is then provided on the membrane support, and the matrix layer 66 is then applied over the dried tissue slice.

Two distinct but related techniques are disclosed according to the present invention. In the first disclosed technique, detailed explanation is provided for combining CE and MALDI MS. A complete explanation for this technique is disclosed, followed by various embodiments wherein MALDI MS is employed without the sample being an affluent from CE.

CE Combined With MALDI MS

Reagents and Material

Peptide and protein standards, TPCK-trypsin and α-cyano4-hydroxycinnamic acid (CHCA) were obtained from Sigma Chemical Co. (St. Louis, Mo.) and were used without further purification. The μSIL-WAX capillary (50 μm id) was purchased from J&W Scientific (Folsom, Calif.); all other capillaries (50 μm id, 180 μm od) from Polymicro Technologies (Phoenix, Ariz.); Spectra/Por regenerated cellulose membranes from Spectrum Medical Industries, Inc. (Los Angeles, Calif.); and all other membranes from Schleicher & Schuell Inc. (Keene, N.H.).

The tryptic digest of horse apomyoglobin was prepared as follows. One mg of the protein was dissolved in 94 μL of a 0.1 M $NH_4HCO_3$ (pH 8.1) solution. The digestion was carried out by adding 3 μL of newly prepared TPCK-trypsin (5 mg/mL) every 3 hours at 37° C. for a total of 6 hours. The digest aliquot was vacuum-dried. A stock solution corresponding to 100 pmol/μL of the original protein was reconstituted in 0.01% TFA and stored at −20° C.

Sample Deposition Device

Figure 1:
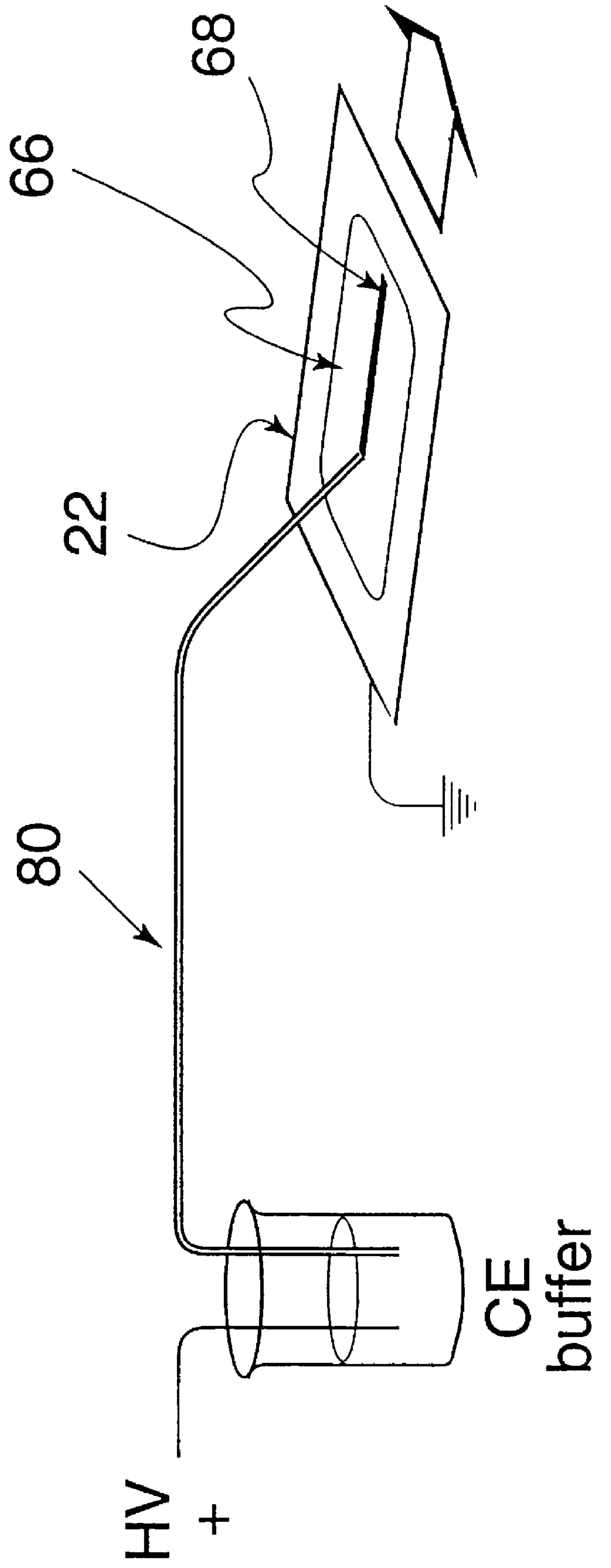
FIG. 1 is a schematic diagram of the membrane sample deposition apparatus for off-line coupling of CE and MALDI MS.

The CE device was constructed for the continuous deposition of effluent and is illustrated in FIG. 1. A high-voltage d.c. power supply (Bertan Associates Inc., Model 205A-50P) was used to provide a 30-kV potential for electrophoretic separation. The positive terminal of this power supply was applied to the sample or buffer vial and then across a fused-silica capillary 80 (50 μm id). The ground terminal of the power supply was connected to the stainless steel body of the target plate. The membrane target consisted of a strip of cellulose membrane (5 cm×5 mm) precoated with CHCA as described below. This pretreated membrane is electrically conductive, providing a continuous electrophoresis process as sample deposition takes place and eliminates the need for use of a sheath flow of electrolyte. The stainless steel MALDI sample plate had a recessed channel 1.5 cm wide by 0.5 mm deep to accommodate the membrane. The plate was mounted on the mobile block of a Sage syringe pump (Orion Research Inc., Model 341B) to afford a moveable platform and was driven at 15 mm/min, thus providing a recording time window of about 3.3 minutes for deposition of a single sample track across the target.

CE Analysis

The procedure for the CE analysis, including target preparation and sample deposition, is as follows; i) A thin layer of adhesive (spray-mount, 3M, St. Paul, Minn.) was deposited on the surface of the recessed channel of a polished MALDI sample plate. A strip of Spectra/Por 2 regenerated cellulose membrane preserved in 0.1M citric acid was fixed to this surface (taking care to remove any air bubbles that may have become trapped). This target was then thoroughly dried in a vacuum desiccator and kept in a dust-free container until needed. ii) A sufficient volume (about 150 μL) of a solution containing 10 mg/mL of CHCA in 80% acetonitrile with 2% acetic acid was applied to the membrane to cover the surface and after 30 seconds, excess liquid was removed by decanting. The plate was placed into a vacuum desiccator for 2 minutes and removed for use typically within a few hours. The membrane appeared transparent, without any crystals visible on microscopic examination.

For sample deposition on the target during CE operation, the plate was mounted onto the movable stage with the exit end of the capillary adjusted to provide good contact with the membrane strip at an angle of about 60° to the target surface. The sample solution was typically loaded electrokinetically at 5 kV for 4 s. Electrophoretic separation was achieved using 30 kV and a 2% acetic acid solution (pH 2.6)

if not otherwise specified. The calculation for the amount of an analyte loaded was based on its concentration, the CE migration time and the length of the capillary, with the assumption that the total ionic mobility of the analyte was the same during injection and separation. Movement of the target plate was usually begun at 90–120 s after the start of the CE analysis and terminated 200 s later (50 mm of travel). The target plate was immediately removed and could be placed into the MALDI instrument without further treatment. Alternatively, the target plate could be left in a dust-free environment for several days or more without noticeable degradation of the quality of the mass spectra. CE experiments with UV detection were carried on a Waters Quanta 4000 system, consisting of a 30 kV d.c. power supply and a fixed wavelength ultraviolet detector (214 nm). The electropherograms were recorded with a Waters model 730 data module.

MALDI MS

MALDI mass spectra were obtained on a Voyager Elite time-of-flight mass spectrometer (PerSeptive Biosystems, Vestec Products) equipped with a nitrogen laser (337 nm, 3 ns pulse, ~30 $\mu$m spot size). The positive ion/linear mode was used, with an accelerating voltage of 20 kV. Each spectrum was produced by accumulating data from approximately 10 laser shots. Mass calibration for peptide analysis was accomplished using the dimer of CHCA ($[2M+H]^+$= 379) and neurotensin ($MH^+$=1674), while that for protein analysis was done using horse apomyoglobin ($MH^+$=16952) and its dimer. The sample track on the membrane could be seen on the monitor of the video camera aimed at the target inside the mass spectrometer, making it easy to move the target stepwise through the laser beam. The relative coordinates for each spectrum taken along the sample track were recorded during acquisition and were converted to electrophoretic migration times. In a typical analysis of a sample track, mass spectra were taken approximately every 250 $\mu$m along the track, corresponding to about 1 s of CE migration time. Spectra could be obtained every 30 $\mu$m, or about every 0.125 s, when necessary.

Membrane Target

Figure 2:
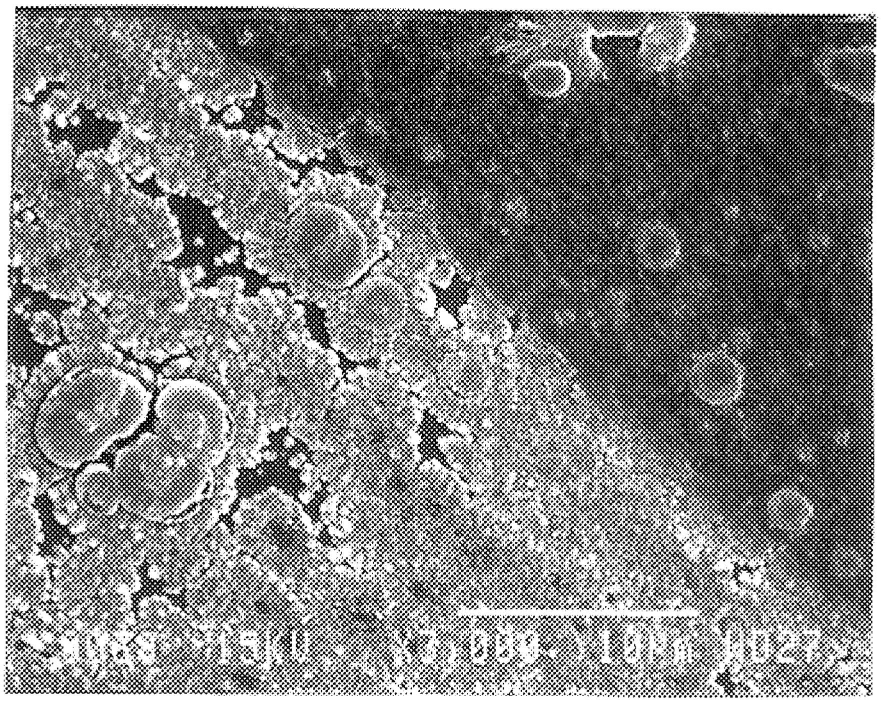
FIG. 2 is a photograph from a scanning electron microscope of the membrane surface showing the microcrystalline surface (left) generated on wetting of the CHCA-precoated membrane with an aqueous solution followed by drying. The dark region to the upper right is the precoated membrane which had not been exposed to the aqueous sample solution. The magnification is 3000 times.

Regenerated cellulose membranes (Spectra/Por 2) were found to give the best performance in terms of mass spectrometric sensitivity and electrophoretic peak shape, among several membranes examined. Regenerated cellulose membranes are gel-like in nature, and have a low binding capacity for most biological compounds. Commonly, they are used as dialysis membranes for proteins and other high molecular weight solutes. It was found that a dilute solution of CHCA briefly exposed to the membrane produced a thin layer of this matrix bound to the membrane in what appeared to be a non-crystalline form. However, on exposure to a small amount (5–10 nL) of an aqueous solution followed by drying, a microcrystalline surface was formed on the membrane. FIG. 2 shows an electron micrograph of the edge of the track left on the membrane by the continuous deposition of an aqueous solution at 10 nL/mm on a moving membrane. The 3000 ×magnification shows a microcrystalline field where the aqueous solution was deposited and the adjacent non-crystalline area untreated by the solution. The microcrystalline track reflects light better, providing visualization of the tract.

Several other membranes were also tested, but none gave results equal to the quality of that of the regenerated cellulose. A CHCA-precoated NA49 CM membrane (negatively charged regenerated cellulose) retained the more positive peptides and yielded good MALDI mass spectra, but gave poor results for the less positively charged peptides. Nitrocellulose membranes were unable to be easily precoated with MALDI matrix (CHCA) because the membrane is soluble in organic solvents. PVDF membranes could be coated with CHCA but were too hydrophobic to remain wetted during the CE analysis. A neutral nylon-based membrane was also found to be unsuitable for similar reasons.

CE/MALDI MS

Figure 3A:
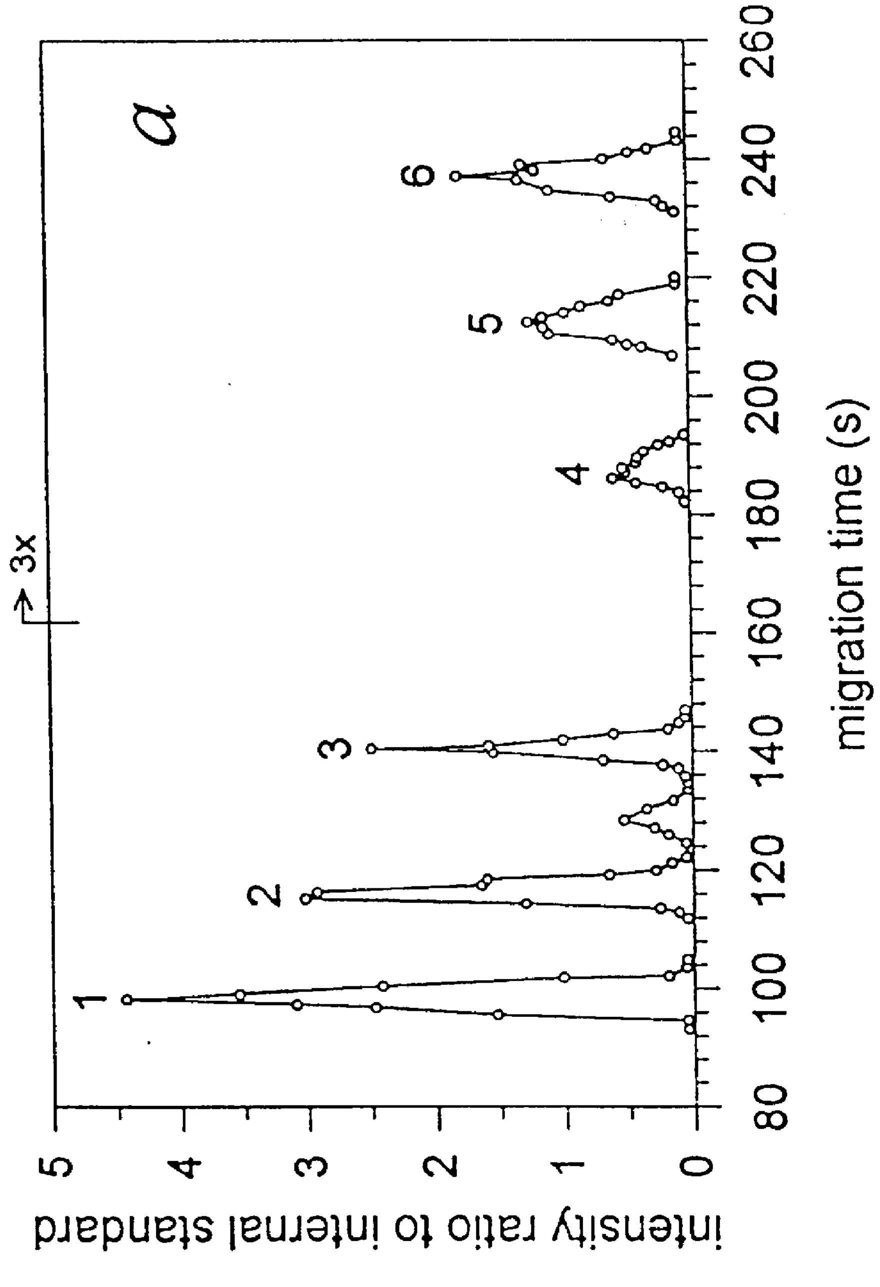
FIG. 3*a* is a composite selected ion electropherogram obtained using a CHCA-precoated regenerated cellulose membrane for the separation of a mixture of six peptides (1:kallidin, 2:angiotensin I, 3:neurotensin, 4:insulin B-chain, 5:casomorphin and 6:physalaemin). Experimental conditions: capillary, 40 cm; total amount of injected sample, ~250 attomoles each; electrokinetic loading at 5 kV for 4 s; buffer, 2% HAc containing 50 fmol/μL renin substrate tetradecapeptide as an internal standard (I.S.).
Figure 3B:
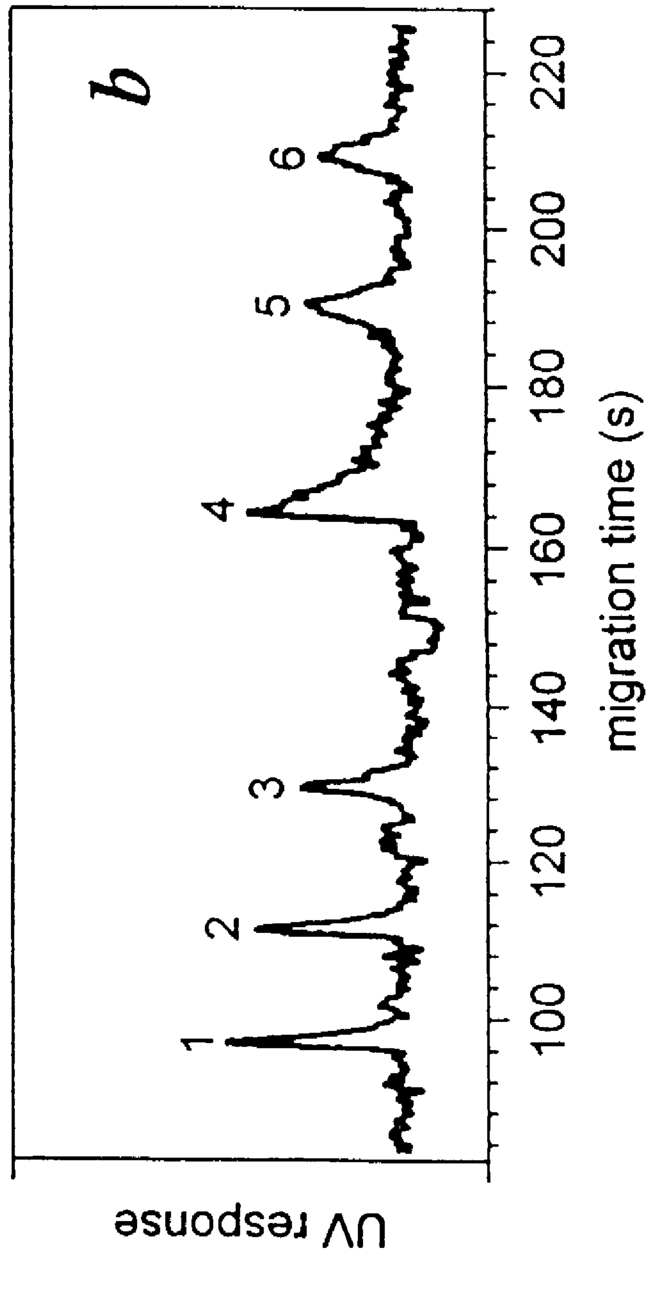
FIG. 3*b* is an electropherogram obtained using on-line UV detection for a similar separation, except that the total amount of sample loaded was ~100 femtomoles each, and the detector was 7 cm from the exit end.
Figure 3C:
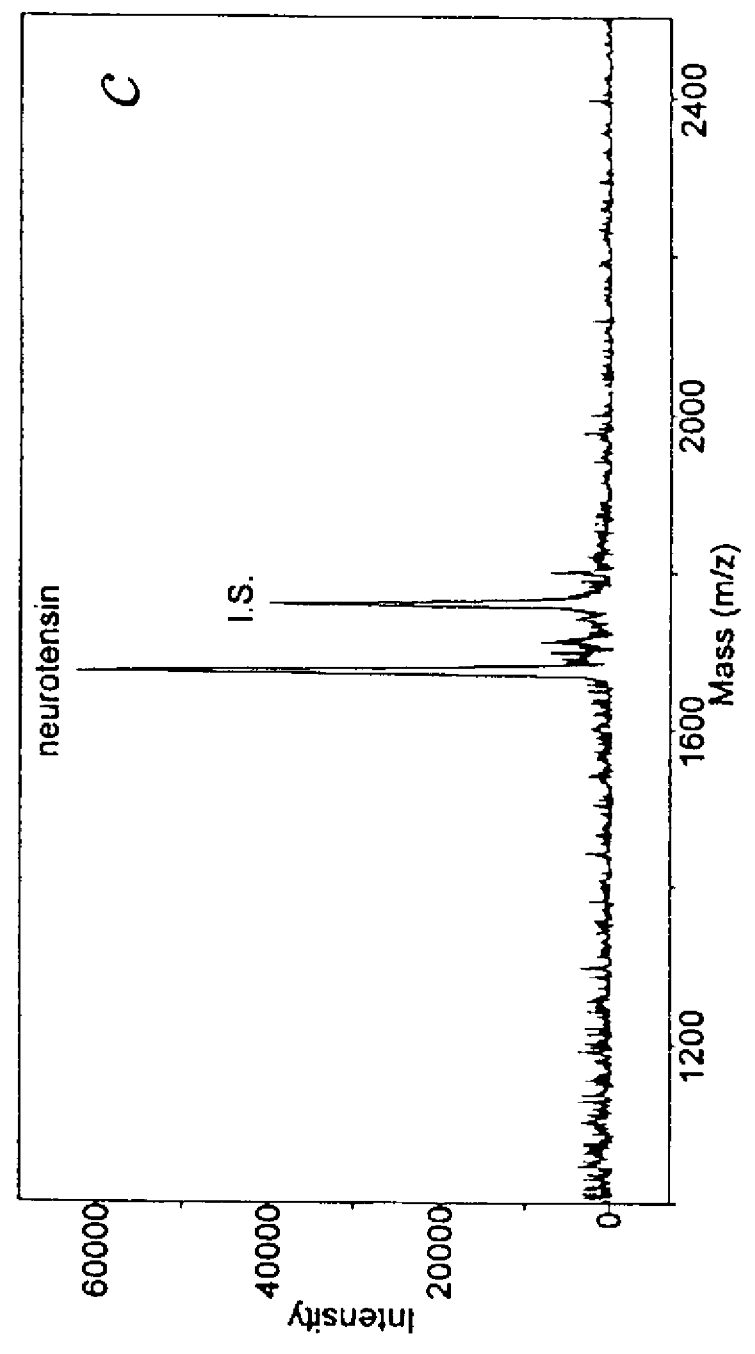
FIGS. 3*c* and 3*d* are MALDI spectra panels taken at 140.9 s and 186.1 s, respectively, from panel 3(*a*).
Figure 3D:
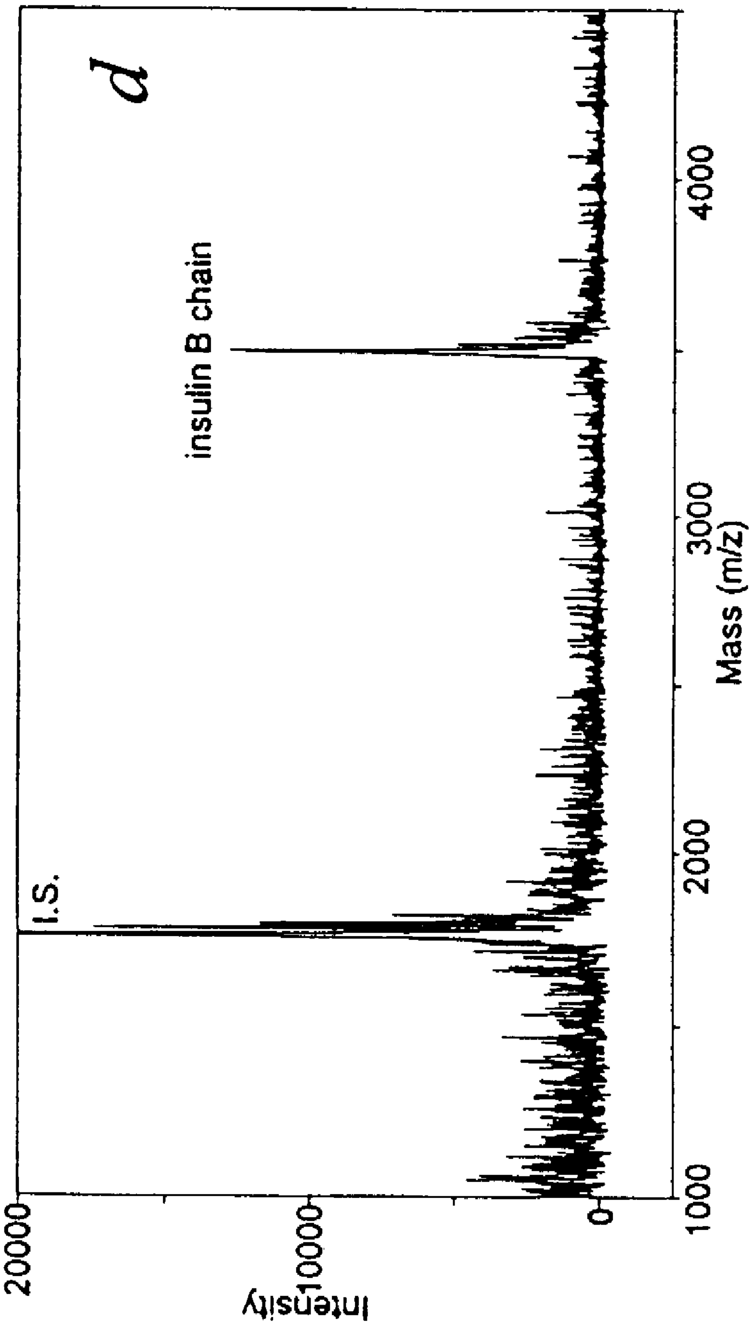

The continuous deposition of effluent from the capillary onto the membrane target produces a 'track' which contains separated compounds as they exit the capillary. The performance of this continuous deposition method in terms of the preservation of separation efficiency was assessed with several peptide mixtures. FIG. 3*a* shows the composite selected ion electropherograms for the $[M+H]^+$ions for each peptide of a mixture of six peptides. An internal standard of renin substrate tetradecapeptide was included in the running buffer to facilitate relative intensity measurement. The CE separation was completed in 5 minutes using a 40 cm capillary at 30 kV in a 2% acetate buffer. The CE peaks are less than 10 s wide and the separation pattern in this electropherogram is similar to that recorded using a UV detector (FIG. 3*b*). Representative MALDI mass spectra along the CE track are illustrated in FIGS. 3*c* and 3*d* for a loading of about 250 attomoles for each peptide. It should be noted that the lower ion yields of the last three peptides in FIG. 3*a* were not caused by the membrane target but rather was a consequence of the MALDI process itself For example, the ion intensities for the same three peptides were typically 5–10 times lower than those for the remaining peptides in a mixture of 250 femtomoles each when the conventional stainless steel target was used.

Figure 4:
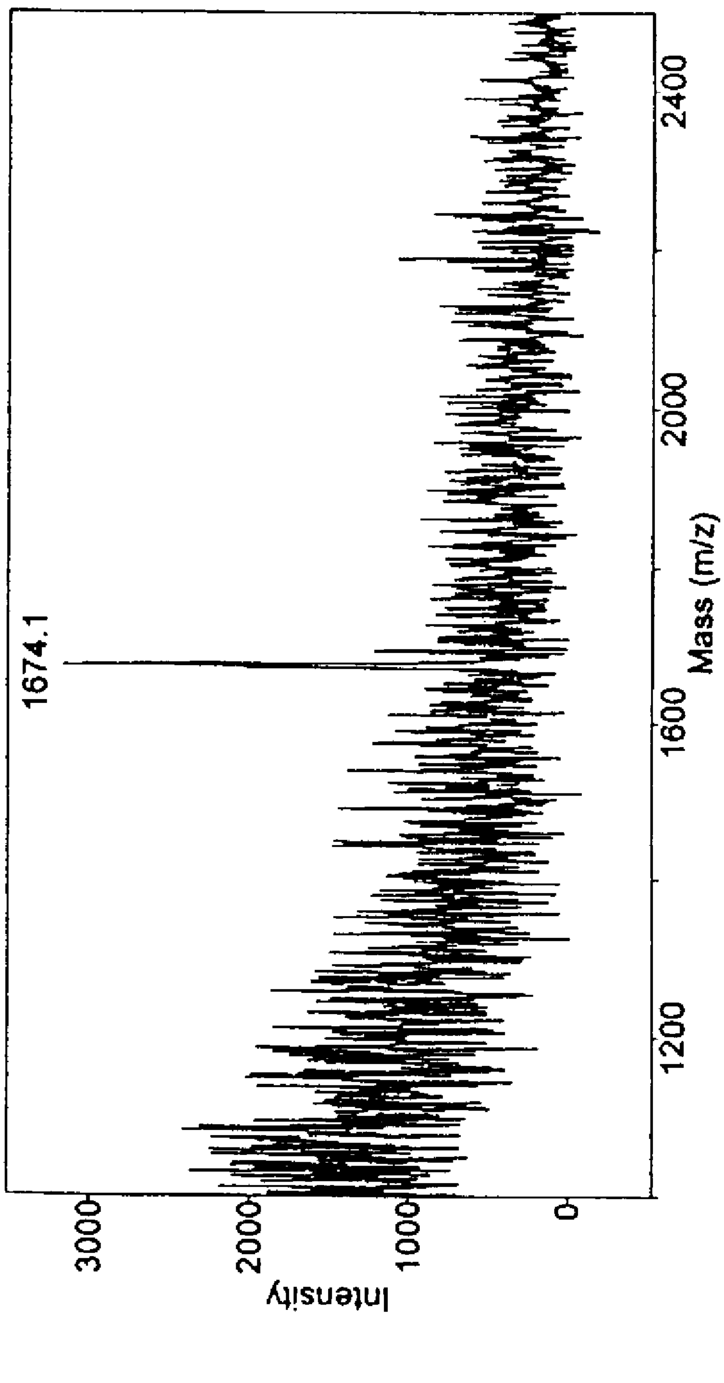
FIG. 4 is a MALDI spectrum of 45 attomoles of neurotensin from a CE separation where the effluent was deposited on a CHCA-precoated regenerated cellulose membrane. Experimental conditions: capillary, 38 cm; electrokinetic loading of a 10 fmol/μL solution in buffer at 5 kV for 4 s; migration time for neurotensin, 117 s.

High sensitivity CE/MS, in the low attomole range, can be achieved with this membrane target technique. FIG. 4 shows the MALDI mass spectrum of the CE analysis of 45 attomoles of neurotensin. The $[M+H]^+$ion was recorded at a sign-to-noise ratio of better than 3:1 and was detected in a band in the effluent track between 115–119 s, corresponding to a band width of less than 1 mm of the track. The distribution of compound is gaussian in both the X and Y dimensions, and about 90% of the 45 attomoles lies in an area of $5\times10^4$ $\mu m^2$. Since the laser irradiates an area of approximately $7\times10^2$ $\mu m^2$, therefore, approximately 570 zeptomoles of material was desorbed to produce the spectrum shown in FIG. 4, assuming all of the sample was removed as appeared to be the case from examination of the spot by electron microscopy.

Figure 5:
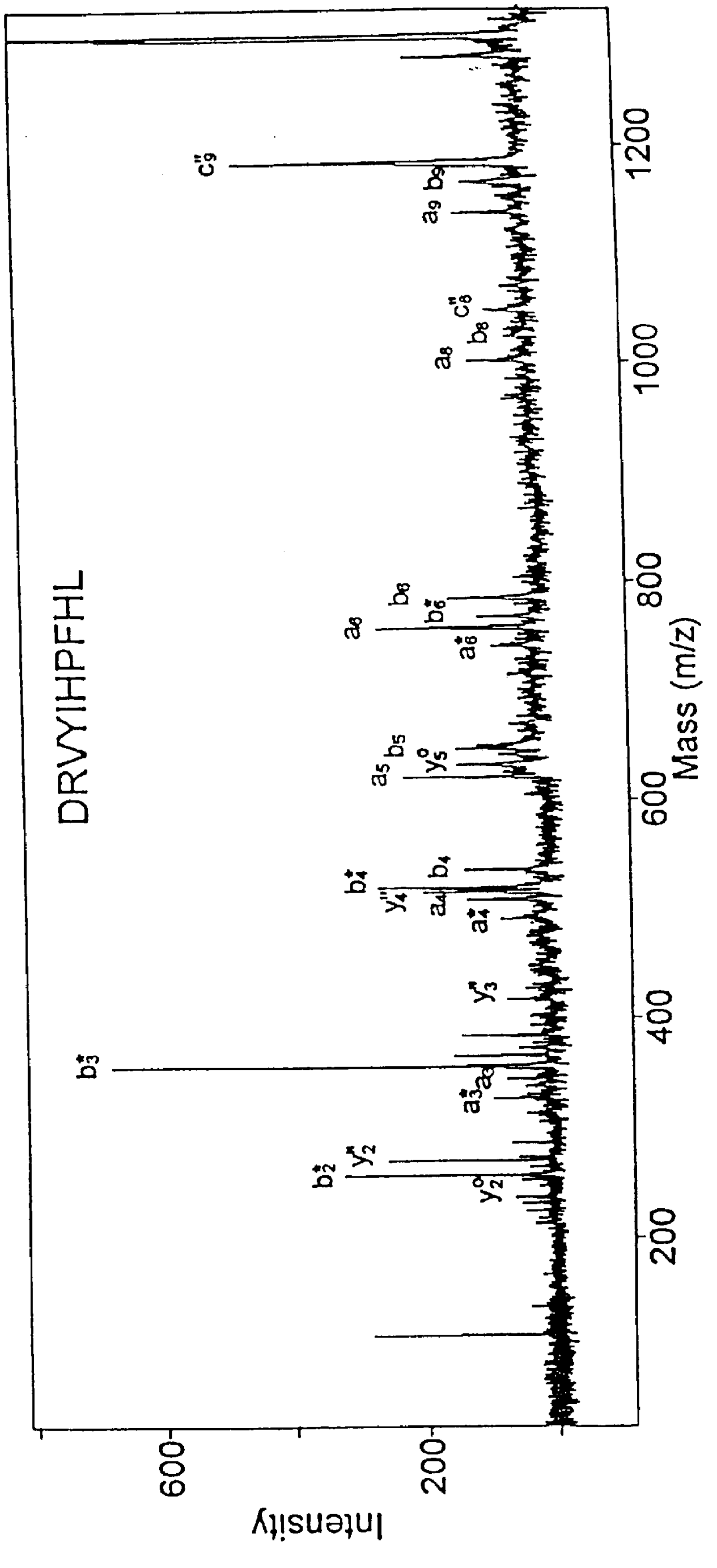
FIG. 5 is a MALDI post-source decay spectrum of 12 femtomoles of angiotensin I obtained by varying the reflectron ratio from 1.00 to 0.11. The notation for bond cleavage is that of Roepstorff and Fohlman, with * and ° denoting the loss of ammonium and water, respectively. The sample was obtained from a CE effluent deposited on a CHCA-precoated regenerated cellulose membrane. Experimental conditions: capillary, 40 cm; electrokinetic loading of a 3 pmol/μL solution in buffer at 5 kV for 4 s; migration time for angiotensin I, 125 s.

With sample amounts deposited in the low femtomole range, high quality post-source decay (PSD) spectra can be obtained. FIG. 5 shows the PSD spectrum for the CE analysis of 12 femtomoles of angiotensin I. This composite spectrum is produced from a combination of spectra using several reflectron ratios. For this example, the final analysis of the CE peak provides the molecular weight and sequence (or partial sequence) of the peptide in addition to its electromigration time.

Figure 6:
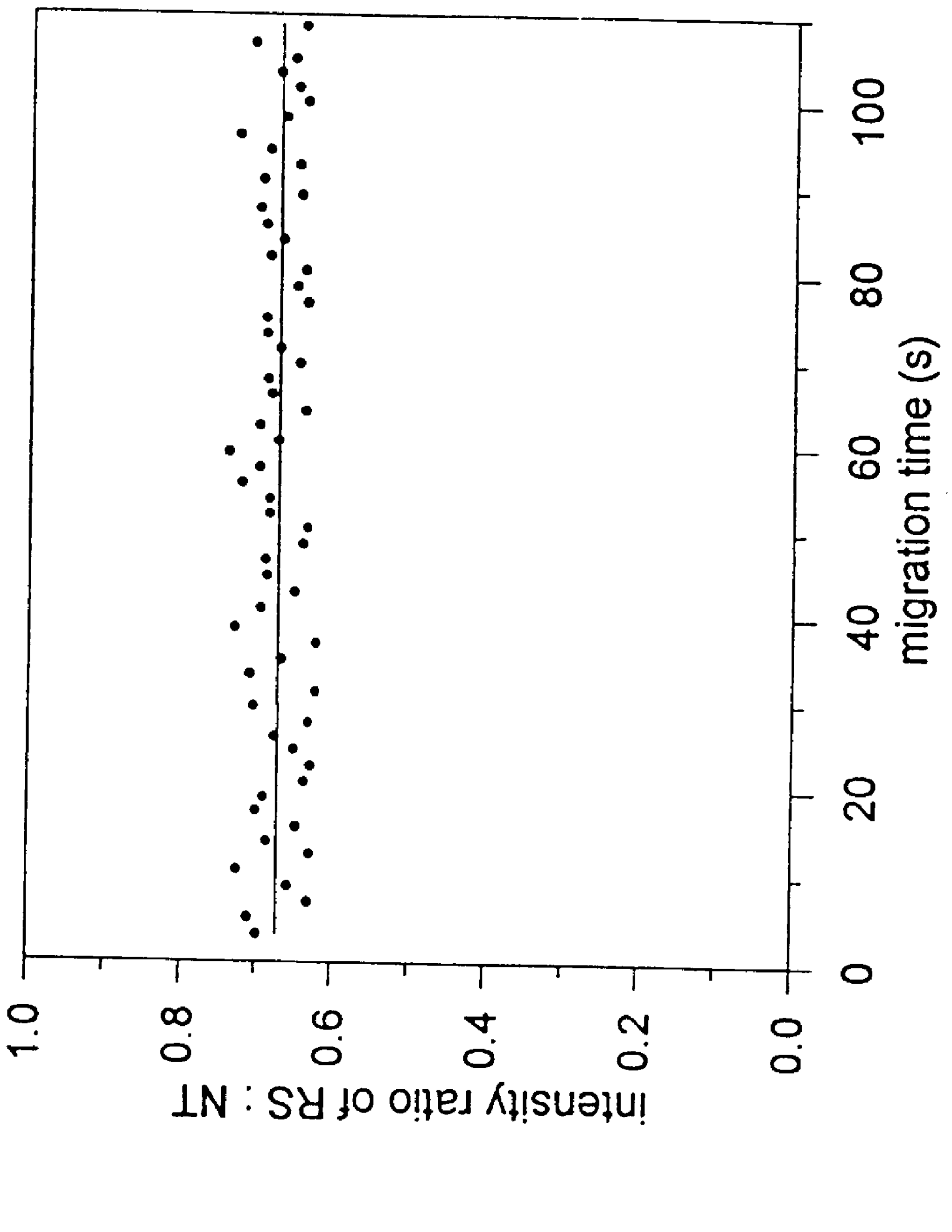
FIG. 6 depicts intensity ratio of the $[M+H]^+$ions of renin substrate tetradecapeptide to that of neurotensin plotted against migration time obtained by MALDI analysis of a CE effluent deposited on a CHCA-precoated regenerated cellulose membrane. Experimental conditions: capillary, 40 cm; effluent contains, 50 fmol/μL each of renin substrate tetradecapeptide and neurotensin in 2% HAc.

The uniformness of MALDI signals along the deposited sample track was characterized in a test analysis by including two peptide standards, renin substrate tetradecapeptide and neurotensin, in the CE running buffer that was deposited on the membrane. MALDI acquisitions were taken along the track about every 500 $\mu$m. As shown in FIG. 6, intensity ratios of these two peptides along the CE track were quite reproducible, showing a standard deviation of ±4.6%. This suggests that at least for peptides, the MALDI response is quite uniform along the target track following the sample deposition process and that an internal standard can be used in a CE buffer when quantitative determinations are necessary.

Figure 7A:
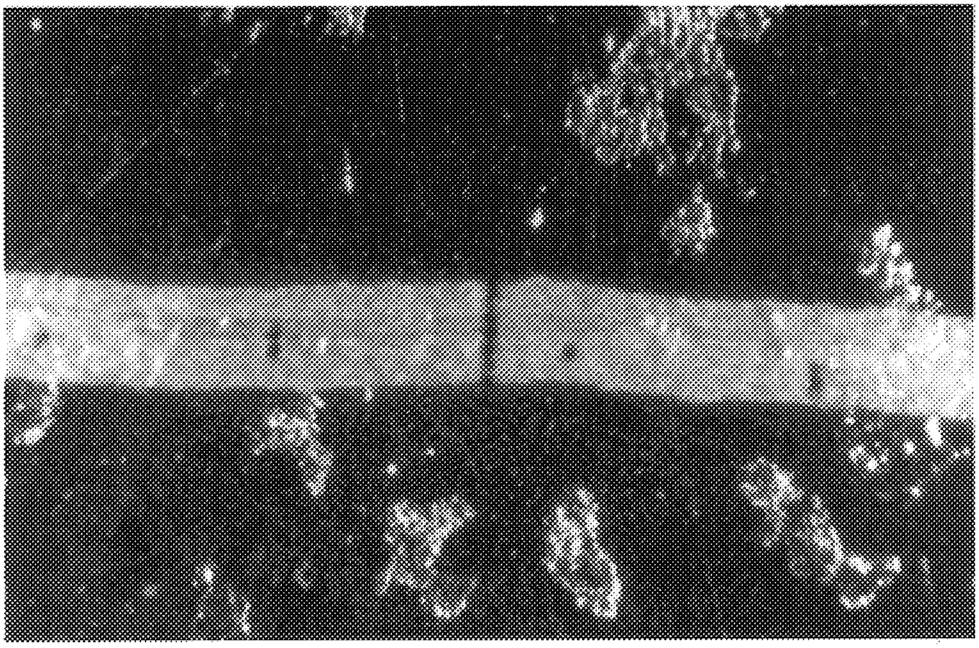
FIG. 7*a* is a photograph of a region of a membrane target plate taken under a 70×magnification on a light microscope. The white band was formed from CE effluent deposition; each dark "hole" on this track was formed by ~10 laser shots; the dark "channel" across the band was formed by sequential exposure to 7 laser spots.
Figure 7B:
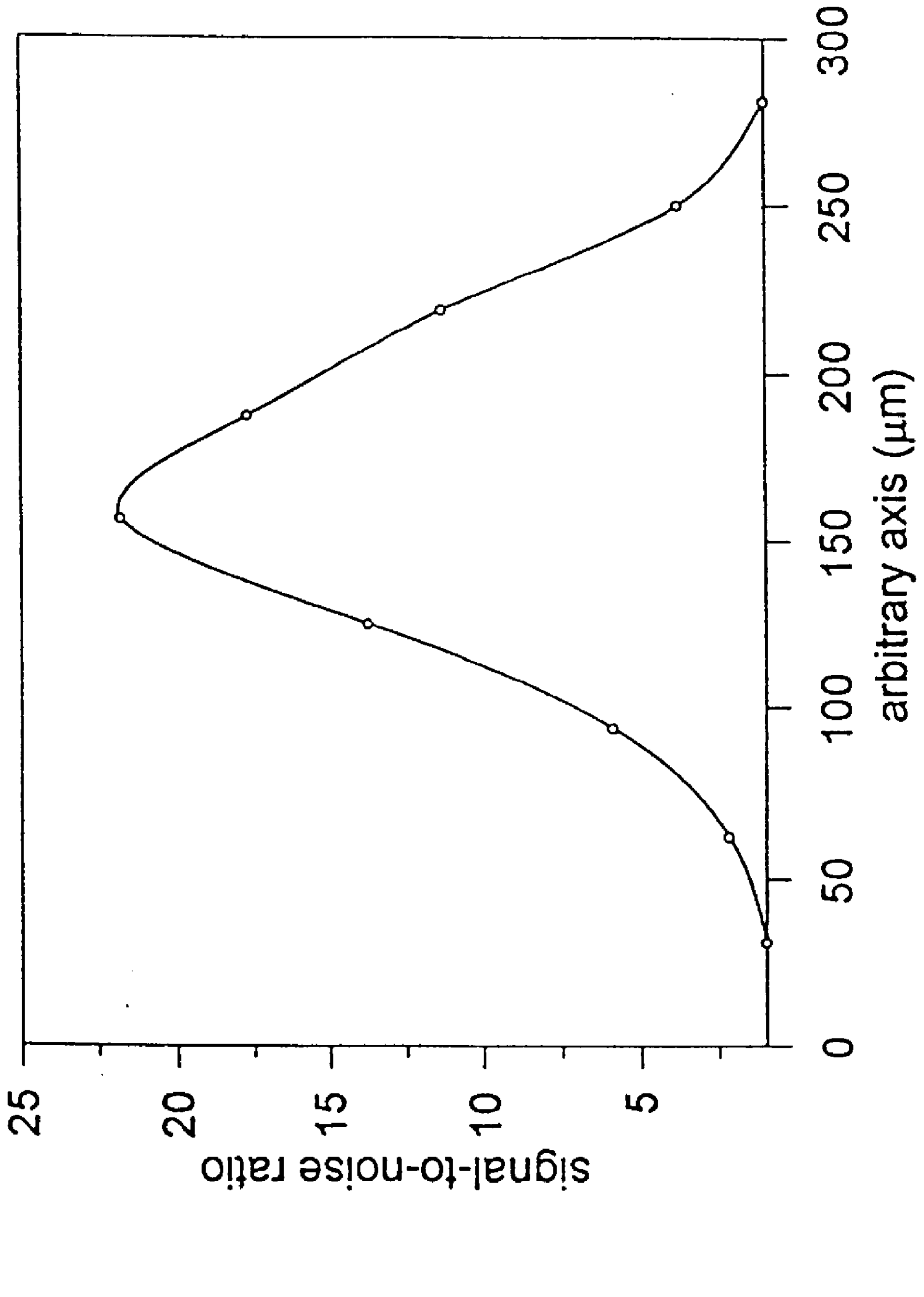
FIG. 7*b* depicts MALDI data across the track was plotted as signal-to-noise ratio versus arbitrary distance. Experimental conditions: capillary, 40 cm; effluent contains, 50 fmol/μL renin substrate tetradecapeptide in 2% HAc.

An image of a CE track and the distribution of signals of a peptide across the track are shown in FIGS. 7*a* and 7*b*. Under CE experimental conditions, effluent containing renin substrate tetradecapeptide at a concentration of 50 attomoles/nL was continuously deposited on the membrane to form a tract and MALDI acquisitions taken across the track, about 200 μm wide, at a distance of about every 30 μm. FIG. 7*a* shows a "channel" formed across the track by approximately 7 sequential laser spots. FIG. 7*b* plots the signal-to-noise for the $[M+H]^+$ion obtained from these spots and shows that the distribution of the peptide detected across the track was Gaussian-like. This suggests that there is an interaction of the peptide with the membrane, and perhaps the matrix, which leads to a concentration of the peptide closest to the point of initial deposition.

Figure 8A:
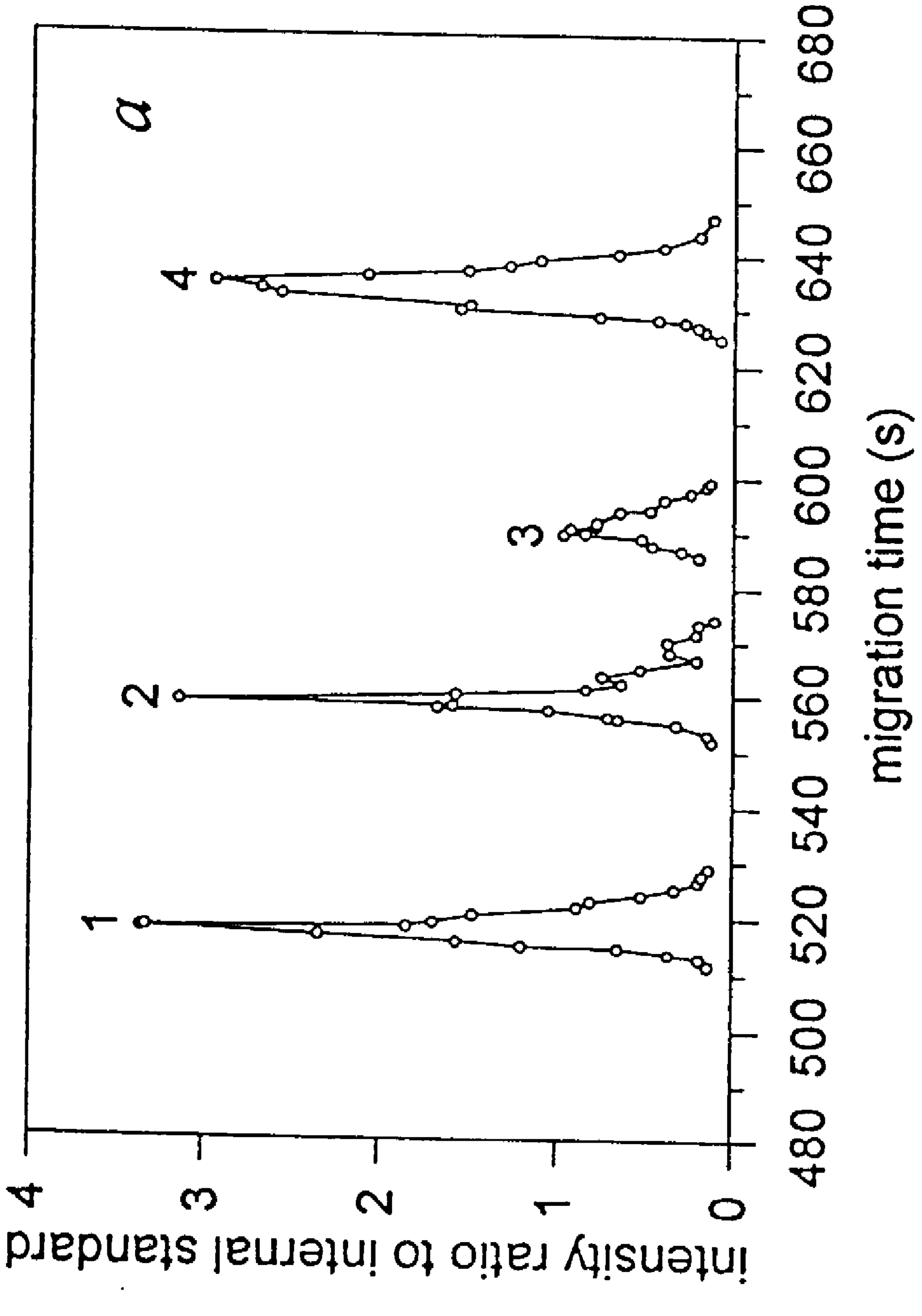
FIG. 8*a* is a composite selected ion electropherogram obtained using a CHCA-precoated regenerated cellulose membrane for the separation of a mixture of four proteins (1:horse cytochrome c, 2:chicken lysozyme, 3:bovine lactoglobulin A and 4:bovine ribonuclease A). Experimental conditions: μSIL-WAX capillary, 80 cm; hydrostatic height, 30 ; total amount injected was 2 femtomoles each from a sample solution containing 500 fmol/μL each; buffer, 10 mM sodium phosphate (pH 2.8) containing 500 fmol/μL horse apomyoglobin as an internal standard (I.S.).
Figure 8B:
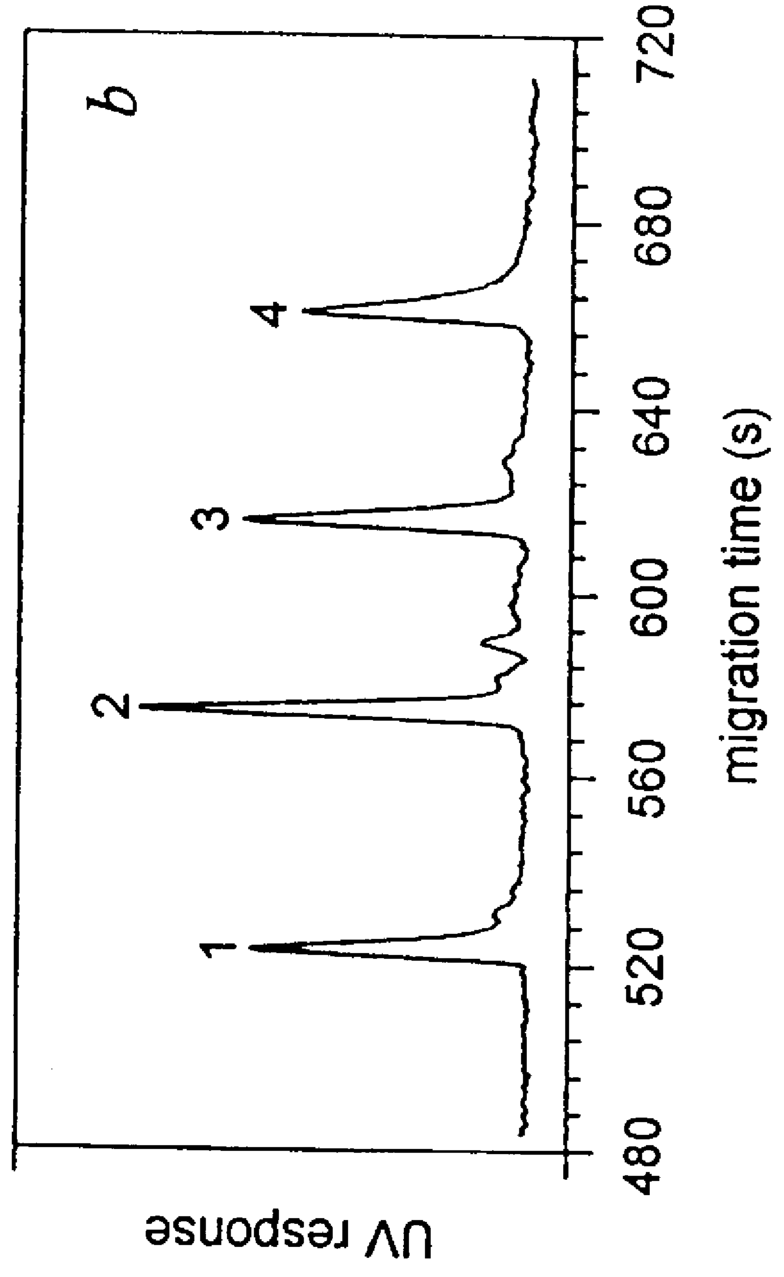
FIG. 8*b* is an electropherogram obtained using on-line UV detection for a similar separation, except that a total of 80 femtomoles each of sample was injected from a solution containing 20 pmol/μL each; hydrostatic height, 10 cm; the detector was 10 cm from the capillary exit end.
Figure 8C:
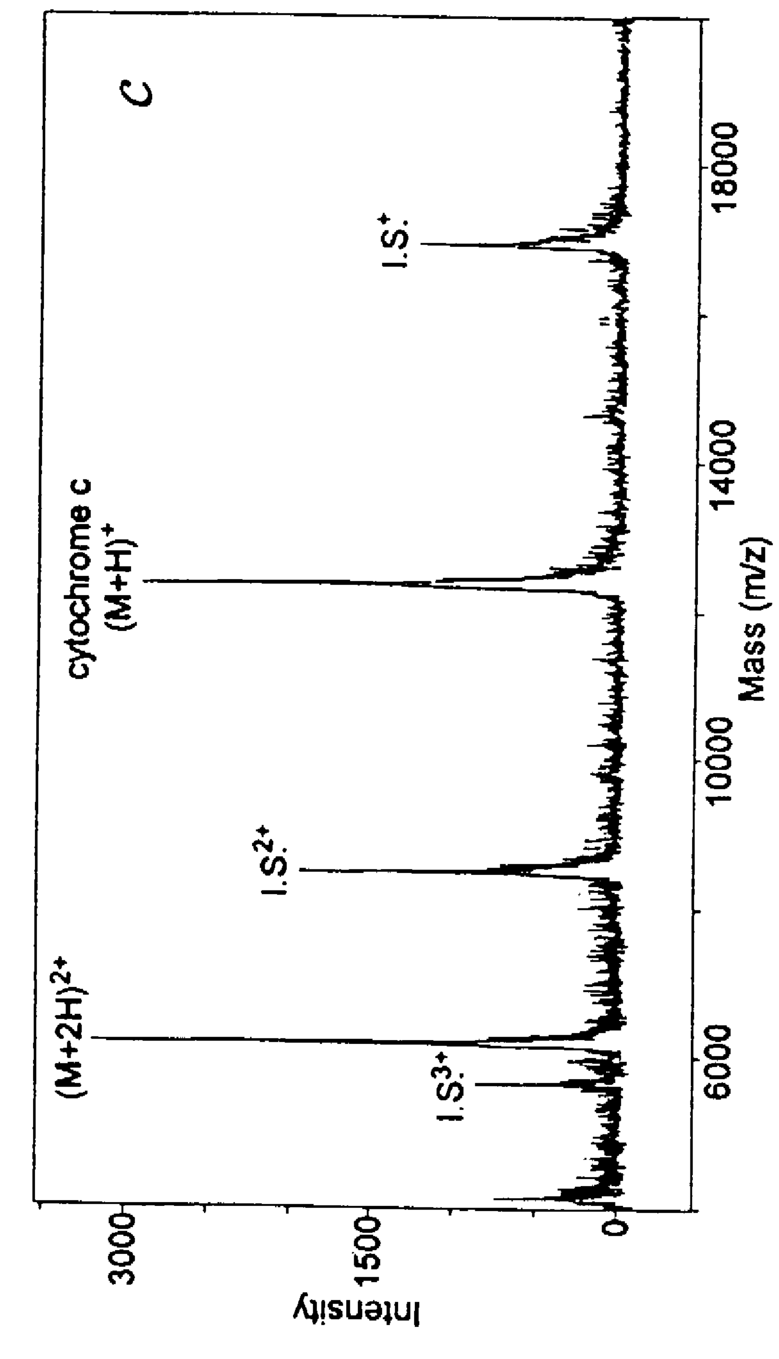
FIGS. 8*c* and 8*d* are MALDI spectra taken at 516.8 s and 633.6 s, respectively, from panel 8(*a*).
Figure 8D:
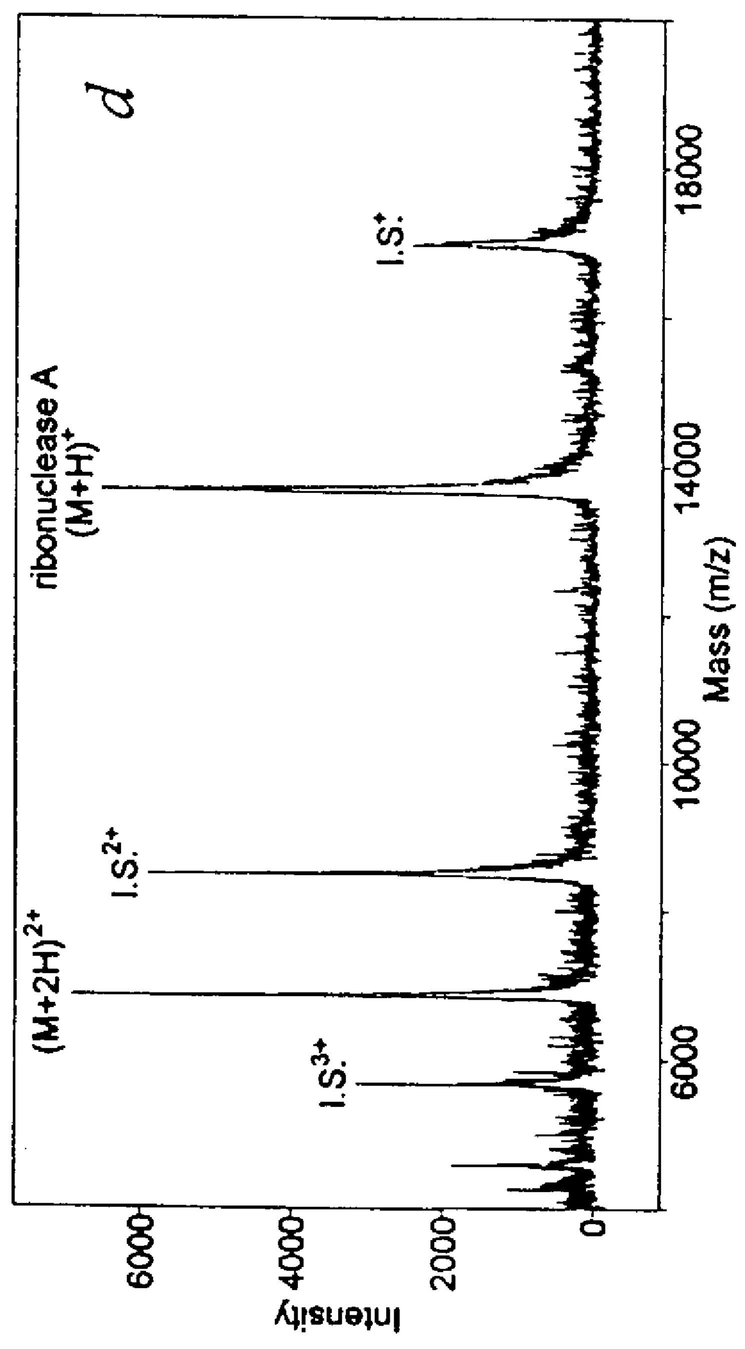

The suitability of this continuous deposition method for small proteins was assessed with a protein mixture. A polyethylene glycol coated capillary was employed in this study to avoid wall adsorption. Since the electroosmotic flow is extremely low in this capillary, a hydrostatic height of 30 was maintained during a CE run to provide an approximate flow rate of 35 nL/min. The CE separation was accomplished in a 10 mM phosphate buffer (pH 2.8) at 30 kV. A composite selected ion electropherogram is shown in FIG. 8*a* for the $[M+H]^+$ion for each protein of a mixture of four proteins. FIG. 8*b* shows a similar electropherogram recorded using a UV detector. The separation efficiency, calculated as theoretical plate numbers from the electropherograms, shows for FIG. 8*b* an average of about 80,000 for the four peaks, while that for FIG. 8*a* average about 70,000. Thus, the membrane deposition procedure appears to cause only a little practical loss of electrophoretic performance as measured from the electropherogram produced. Representative MALDI mass spectra along the CE track are illustrated in FIGS. 8*c* and 8*d* for a loading of about 2 femtomoles for each protein in this CE analysis.

Figure 9A:
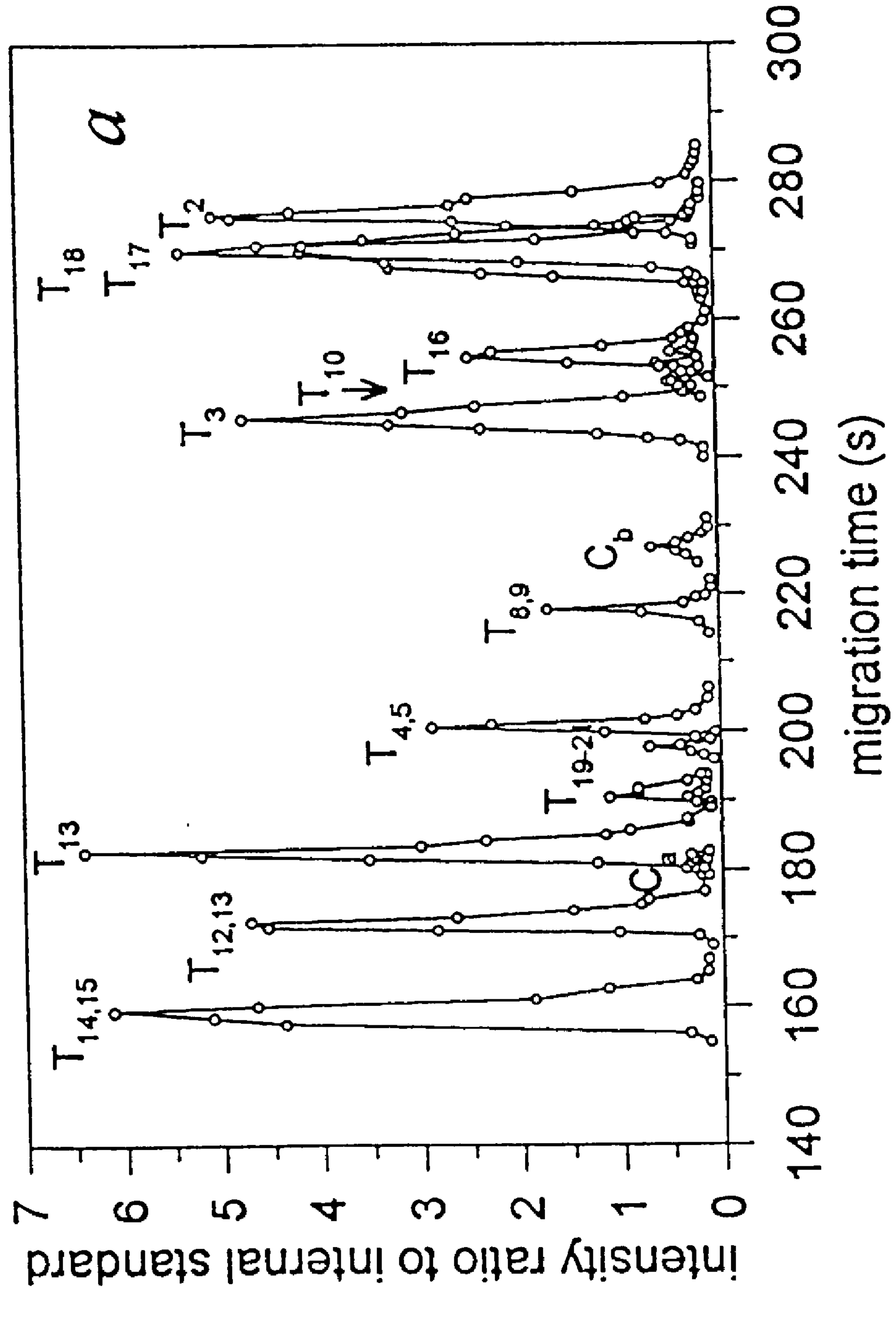
FIG. 9*a* is a composite selected ion electropherogram obtained using a CHCA-precoated regenerated cellulose membrane for the separation of a tryptic digest of horse apomyoglobin. Experimental conditions: capillary, 50 cm; total amount of injected sample, ~3 femtomoles, electrokinetic loading at 5 kV for 4 s; effluent was 2% HAc containing 50 fmol/$\mu$L renin substrate tetradecapeptide as an internal standard (I.S.). Peaks labeled T represent tryptic fragments; C, chymotryptic fragments.

In order to assess the suitability of the technique for analysis of complex biological mixtures, a sample of the tryptic digest of horse apomyoglobin was analyzed. A sample of the digest estimated to contain 3 femtomoles of peptides was electrokinetically loaded into the capillary. The CE capillary was 50 cm in length and a time cut of the CE effluent corresponding to 2 to 5 minutes was deposited on the membrane. A composite of several single ion electropherograms is depicted in FIG. 9*a*, with individual peptide intensities plotted as a ratio to an internal standard included in the running buffer. A total of 15 tryptic peptides including several chymotryptic fragments, were separated and identified using MALDI MS, as shown in Table 1.

TABLE I

CE and MALDI MS of Tryptic Peptides of Horse Apomyoglobin

| fragment* | residues | (M + H) (calcd) | (M + H)hu + (measd) | migration time(s) |
|---|---|---|---|---|
| $T_1$ | 1–16 | 1817 | 1817 | 365.0 |
| $T_2$ | 17–31 | 1608 | 1608 | 275.0 |
| $T_3$ | 32–42 | 1272 | 1272 | 245.6 |
| $T_{4,5}$ | 43–47 | 685 | 685 | 200.6 |
| $T_6$ | 48–50 | 398 | — | — |
| $T_7$ | 51–56 | 709 | — | — |
| $T_{8,9}$ | 57–63 | 791 | 791 | 217.7 |
| $T_{10}$ | 64–77 | 1380 | 1380 | 254.5 |
| $T_{11}$ | 78–78 | 147 | — | — |
| $T_{12,13}$ | 79–96 | 1983 | 1983 | 172.0 |
| $T_{13}$ | 80–96 | 1855 | 1855 | 182.5 |
| $T_{14,15}$ | 97–102 | 736 | 736 | 159.5 |

TABLE I-continued

CE and MALDI MS of Tryptic Peptides of Horse Apomyoglobin

| fragment* | residues | (M + H) (calcd) | (M + H)hu + (measd) | migration time(s) |
|---|---|---|---|---|
| $T_{16}$ | 103–118 | 1886 | 1886 | 250.5 |
| $T_{17}$ | 119–133 | 1503 | 1503 | 270.0 |
| $T_{18}$ | 134–139 | 749 | 749 | 270.0 |
| $T_{19-21}$ | 140–153 | 1555 | 1555 | 197.7 |
| $C_a$ | 124–139 | 1680 | 1681 | 181.0 |
| $C_b$ | 34–42 | 1012 | 1012 | 226.9 |

*T represents tryptic fragments; C represents chymotryptic fragments.

Figure 9B:
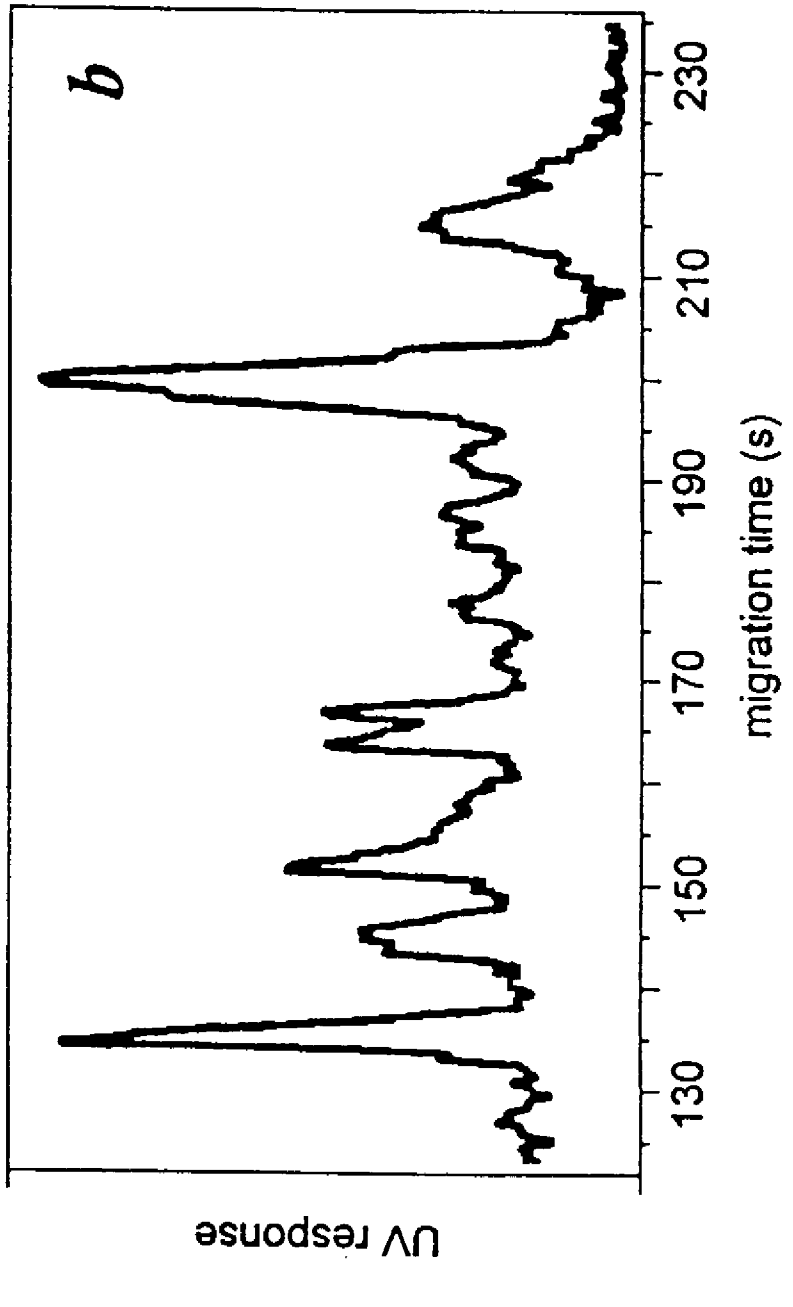
FIG. 9*b* is an electropherogram obtained using on-line UV detection for a similar separation, except that sample injection was about 600 femtomoles and the detector was 7 cm from the exit end.
Figure 9C:
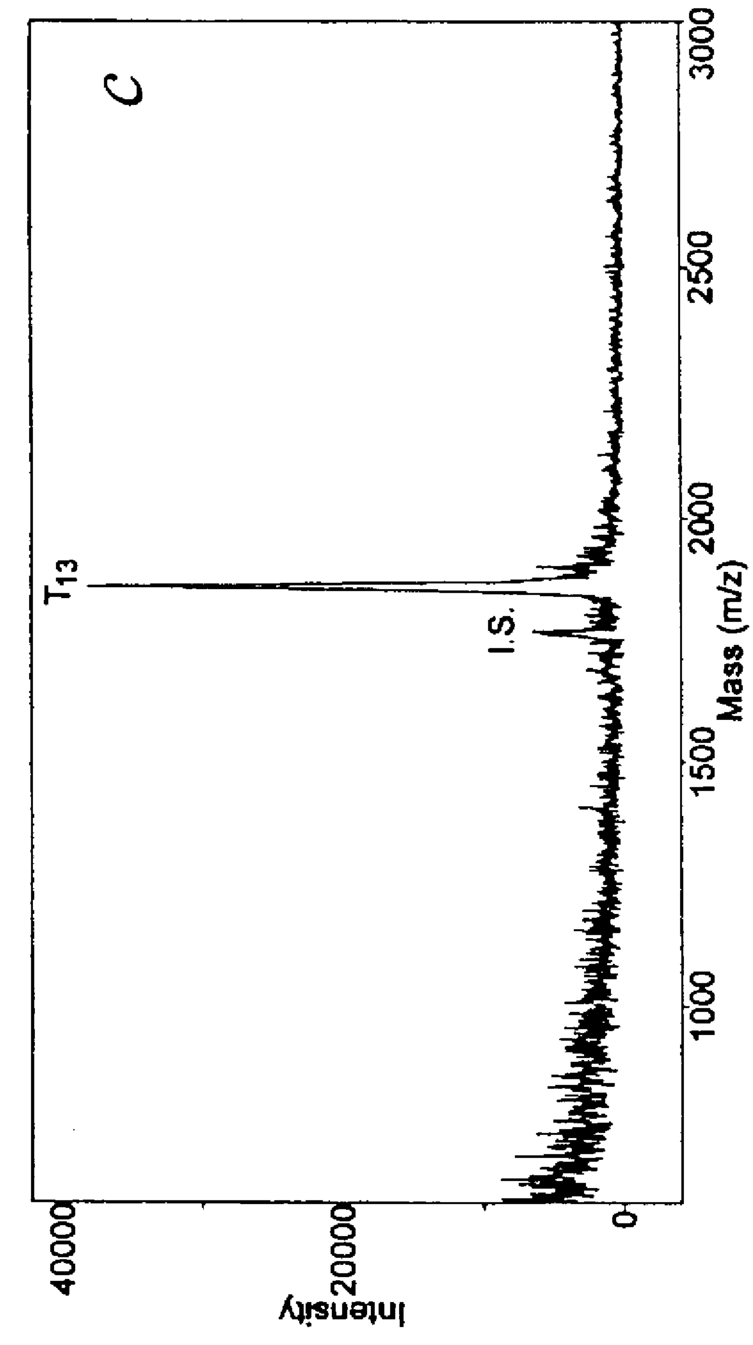
FIGS. 9*c* and 9*d* are MALDI spectra panels taken at 182.8 s and 275.1 s, respectively, from panel 9(*a*).
Figure 9D:
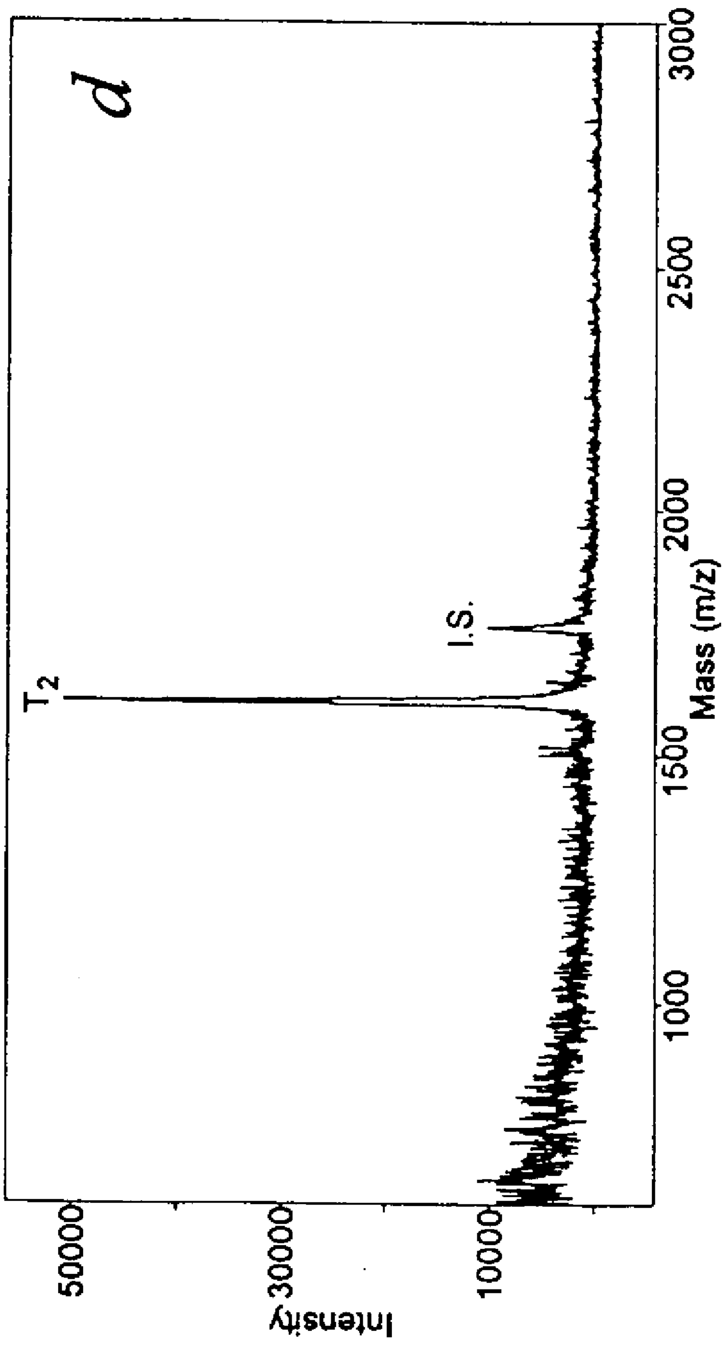

The large peptide $T_1$ was detected in a separate experiment, with a migration time of about 6 minutes. The separation efficiency of the electropherogram produced by MALDI MS was somewhat less than that obtained by on-line UV detection (see FIG. 9*b*). Representative MALDI spectra of two peptide fragments are shown in FIGS. 9*c* and 9*d*.

The compatibility of CE and MALDI MS achieved through the use of precoated membrane targets is believed to be the result of a combination of several factors; i) the water-insoluble matrix can be solubilized on the surface of the gel-like membrane, forming a homogeneous (probably amorphous) thin film of matrix material, ii) the membrane/matrix network provides an aqueous/organic milieu for interaction with the analyte, iii) the aqueous solution containing the analyte solubilizes the thin layer of CHCA and subsequently dries forming microcrystals, iv) the small volume of CE effluent helps achieve high detection sensitivity, and v) the electrical force that directs the charged analyte onto the membrane helps maintain chromatographic performance.

The experiments described in this section utilized a single linear track on the membrane having the maximum length of the membrane strip of 5 cm. Of course, with the appropriate plate movement device, deposited tracks may be circular or continuously bi-directional in order to extend the track for collections of 20–30 minutes or longer. For most peptides, a typical CE analysis (e.g., 40 cm capillary, 2% acetate buffer and 30 kV) can be achieved in less than 5 minutes if a continuous sample deposition is desired.

The matrix-precoated membrane target can be utilized as a continuous CE sample deposition interface to fully exploit the sensitivity and mass identification capability of MALDI MS. The technique is based on conditions necessary to achieve high resolution separation and high sensitivity MS detection, necessitating the use of a thin film of matrix and utilization of small sample volumes. It is therefore not optimal for high sample loads or for the analysis of proteins above about 30 kDa. The methodology described in this report may be applicable for off-line coupling of MALDI MS with other separation techniques as well, including normal and reverse phase micro LC. In addition, the conditions necessary to produce micro-crystalline thin films containing sample and matrix may help other analytical procedures involving MALDI MS, especially when high sensitivity is desirable.

Imaging

Method and apparatus are disclosed for the molecular mass imaging of a sample that provides a 2-D or 3-D mass analysis of a sample, either directly or by imprinting the sample surface onto a specially formulated target. The technique creates an x, y, z template which is a record or imprint of the chemical nature of a sample such that it represents, (1) an image of a given sample (for example, a cell or portion of a cell) where the spacial arrangement of chemicals is preserved, where x and y are distances and z is intensity or (2) a history of a chemical reaction which is stored in a (chemical) track, i.e., a physical recording of the chemical events which have occurred during a given reaction. In latter case, one of the physical coordinates, Z, represents time. This template is created in such a way so as to be capable of being interrogated by an analytical or physical measurement system, or being further processed by physical and chemical means.

EXAMPLE 1

Figure 10:
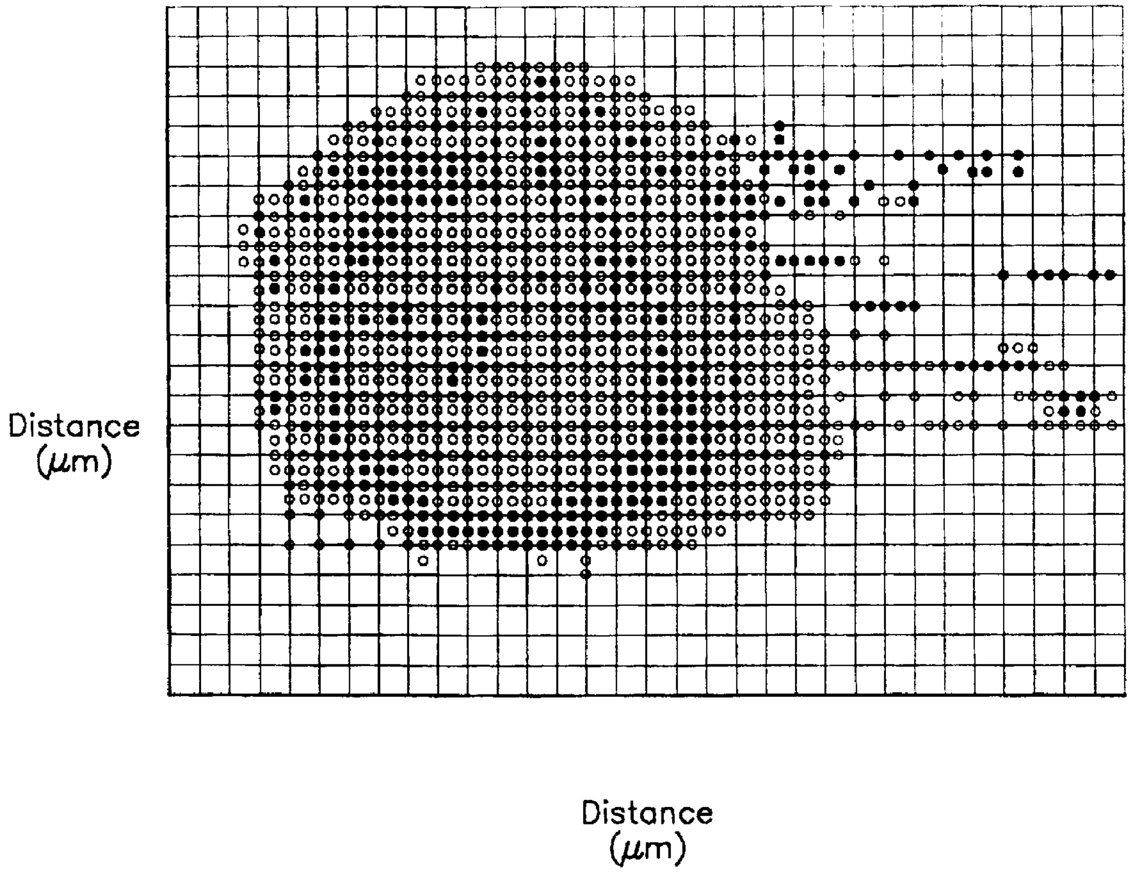
FIG. 10 is a 2-D map of laser shots on an imprinted sample. Solid circles, laser shots showing m/z 1674; open circles, laser shots showing no signal at m/z 1674.
Figure 11:
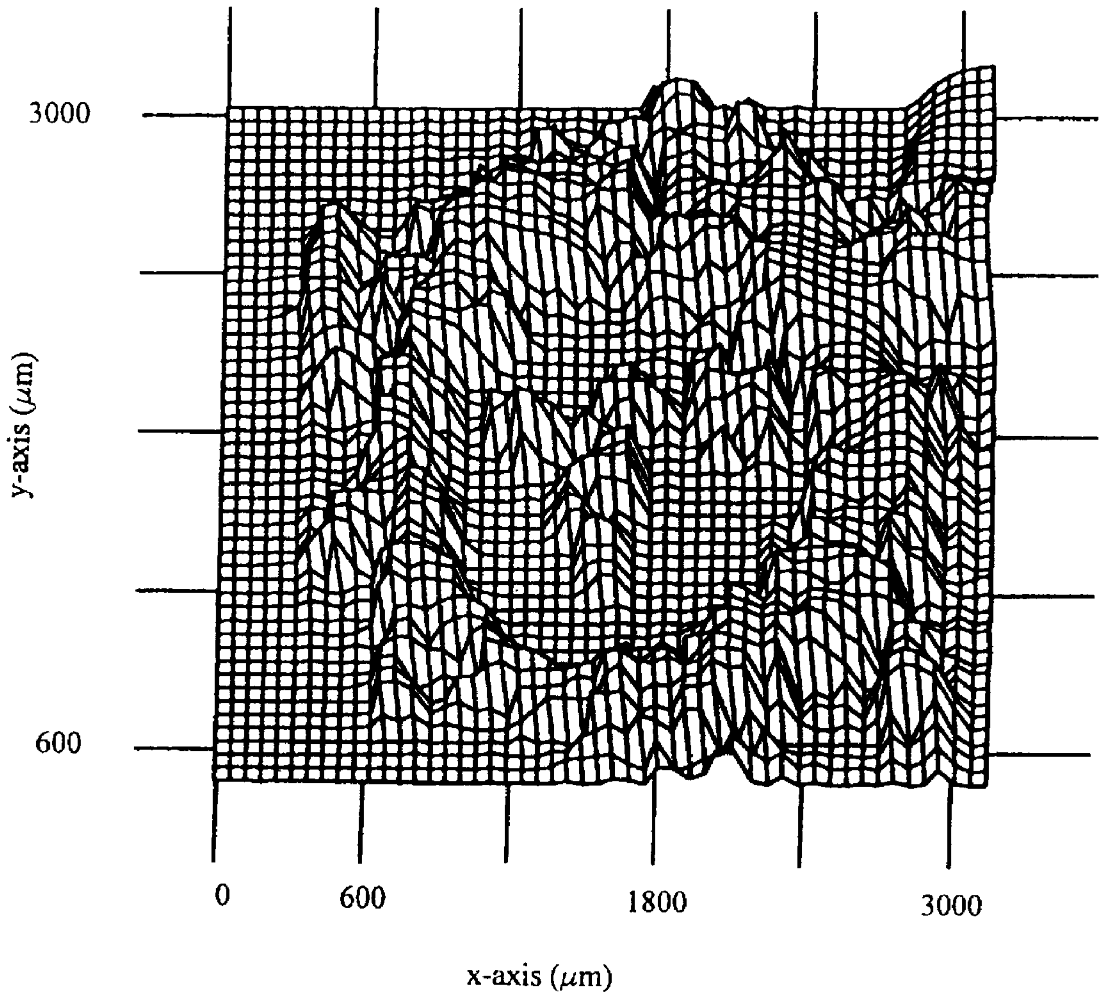
FIG. 11 is a molecular mass image of m/z 1674.

The imaging of a sample to determine the spacial arrangement of chemicals within the sample. For example, if an imprint of a sample is made onto a target under conditions where there is little diffusion or sample migration, then that image can be analyzed by appropriate surface analysis instrumentation. The sample may be a specific chemical pattern or distribution on the surface of a specimen or the spacial distribution of chemical species within a cell. In the latter case, the cell contents would be deposited on a suitably prepared surface under conditions where this spacial arrangement is preserved. If for example the cell was a neuron and neuropeptides were of interest, the cell would be "imprinted" onto a C-18 coated surface and subsequently analyzed for molecular mass using a mass spectrometer. To illustrate the example, a sample of a neuropeptide neurotensin (mw 1674), applied to a circular hollow needle, was "imprinted" onto a target previously pretreated with a matrix so as to allow molecular analysis by MALDI MS. A line was then "drawn" through the circle with the sample solution using a capillary filled with sample solution, flowing at about 50 nL/min. The laser was then used to "image" the sample by measuring only m/z 1674 on the surface by individual laser shots. FIG. 10 shows a map of the laser spots on an X,Y map of the sample. FIG. 11 shows a 3-D plot of the molecular mass analysis of this imprint, with the x and y coordinates physical size dimensions and the Z coordinate molecular intensity. This figure represents an image of the imprint.

EXAMPLE 2

Recording a chemical reaction: the hydrolysis of a polypeptide by an exopeptidase. The reaction would be initiated in a small volume inside a capillary. Through any one of several physical means, the solution within the capillary is made to flow as a slow rate so that the exiting liquid can be deposited on a surface. The time domain of the reaction is represented by a distance, where $t_0$ is the X=0 point. The surface, for this example, could be a membrane or surface material such as 3–5 micron diameter C-18 coated particles prepared as a layer on the target or a polyethylene membrane which is able to bind reaction products. The surface can be chemically treated either before or after sample deposition. In this case, the C-18 particles would be treated with a chemical matrix so that molecular analysis can be performed along the length of the deposited track, using MALDI MS. The time/concentration domain of the solution chemistry is recorded as a distance/amount domain for the reaction, and can be molecularly examined after the reaction is complete, or further reacted or processed. The analogy is that of a motion picture of an athletic event whereby movement is recorded on film, and where this event can be replayed, whether fast or slow, in order to observe the details of the event after the fact.

MALDI mass spectrometry has become a widely used tool for the analysis of many types of biological molecules, especially peptides and proteins. The technique requires that a matrix compound, typically cinnamic acid derivatives for instruments equipped with nitrogen lasers, is mixed with the sample of interest in a mixed aqueous/organic solvent system. The mixture is then dried, producing a crystalline sample where the analyte and matrix are co-crystallized. Further, it has been shown that very high detection sensitivity, e.g., 50 attomoles or less of peptides, can be achieved by spotting 3–5 nL of sample solution. typically, the preparation procedure involves addition of matrix solution in organic solvent to an aqueous sample followed by drying, and subsequent analysis. However, in certain cases, this procedure is undesirable, especially where analytes amounts are low because addition of matrix solution dilutes the sample, decreases detection sensitivity, introduces organic solvents, and can cause band spreading in on-line separation systems such as liquid chromatography, capillary electrophoresis, and microdialysis.

The use of precoated targets for the MALDI MS analysis of peptides and small proteins has been investigated so that aqueous solutions could be directly spotted without subsequent addition of matrix. A number of investigators have reported the use of transfer membrane targets, such as nylon, PVDF, polyethylene and nitrocellulose, where matrix was added in organic solvent after the sample was transferred. In another report, a stainless steel surface was first layered with matrix by fast evaporation of the organic solvent followed by deposition of the sample containing organic solvents to redissolve the matrix. In contrast, in the current embodiment, thin-layer precoated membranes are produced and are then used for direct analysis of aqueous samples, preferably without use of organic solvents during or after sample transfer.

Several types of membrane material have been tested for their possible use as matrix-precoated MALDI targets, including regenerated cellulose, anion or cation modified cellulose, nylon, PVDF and nitrocellulose. Regenerated cellulose dialysis membrane gave the best overall results in terms of sensitivity and quality of spectra. The matrix-precoated membrane target was prepared as follows; a strip of regenerated cellulose membrane (SpectrPor 2 or 4, Spectrum Medical Industries) preserved in 0.1M citric acid was attached to a polished stainless steel sample plate using a thin layer of adhesive (spray-mount, 3M). This membrane assembly was then thoroughly dried in a vacuum desiccator. A sufficient volume of solvent containing 10 mg/mL of α-cyano-4-hydroxycinnamic acid in 80% acetonitrile with 2% acetic acid was applied to cover the membrane surface and, after 30 seconds, excess liquid was removed by decanting. The plate was then placed in a vacuum desiccator for 2 minutes. At this point, the membrane appears transparent, without any visible crystalline material on it. Samples in aqueous solutions were deposited on this precoated membrane in 3–5 nL volumes, achieved by delivering samples through a fused silica capillary (185 $\mu$m od, 50 $\mu$m id) using an Instech Model 2000 syringe pump. MALDI mass spectra were obtained on a Voyager Elite (PerSeptive Biosystems, Vestec Products) time-of-flight mass spectrometer equipped with a nitrogen laser (337 nm, 3 ns pulse, ~25 $\mu$m spot size). The positive ion/linear mode was used, with an accelerating voltage of 20 kV. Each spectrum was produced by summing data from 8–10 laser shots.

Figure 12A:
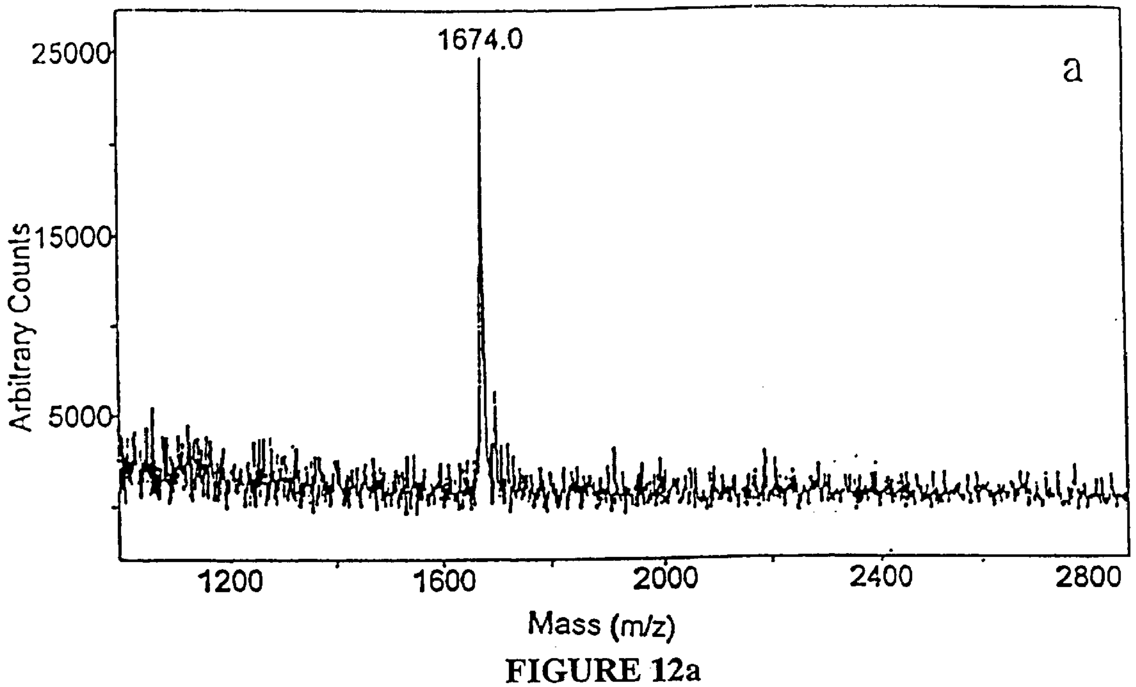
FIG. 12 is a MALDI mass spectra produced from a matrix precoated SpectraPor membrane with (a) 200 attomoles of neurotensin and (b) 1 femtomole of horse cytochrome c. In both cases, samples were spotted in 4 nL of 50 mM phosphate (pH 2.5).
Figure 12B:
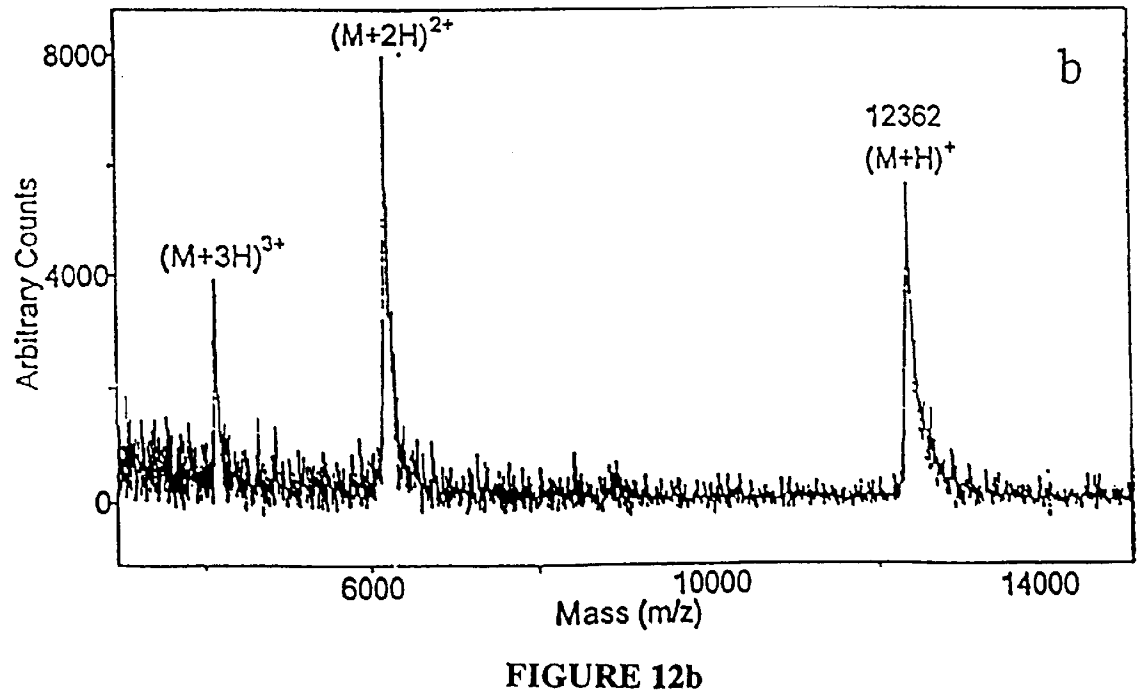

The MALDI mass spectra of more than 25 peptides and small proteins have been obtained from precoated regenerated cellulose membranes in the presence and absence of salt in order to assess the general usefulness of the technique. As examples, samples containing 200 attomoles of neurotensin ($[M+H]^+$at m/z 1674) and 1 femtomole of cytochrome c ($[M+H]^+$at m/z 12,362) were analyzed in phosphate buffer. Each sample was dissolved in water containing 50 mM phosphate (pH 2.5) and was spotted on the membrane in a 4 nL volume. The mass spectra are shown in FIG. 12. Detection levels giving signal-to-noise of >3:1 for several peptides tested were approximately 40 attomoles, while that for proteins up to 20,000 daltons were higher at about 300 attomoles, These detection levels are approximately the same as the reported earlier from this laboratory using 5 nL volumes of samples already containing matrix which were deposited on normal stainless steel targets. Thus, use of precoated membranes appears not to compromise these high sensitivity applications. In terms of higher analyte levels, samples in concentrations up to 200 pmol/μL show no degradation in the quality of the mass spectra. However, since the matrix coating is thin, the quantitative relationship between the amount of analyte and signal level is linear only at lower analyte levels. For bovine insulin, for example, this linear response occurs up to a sample loading of 50 fmol spotted in 5 nL.

Figure 13A:
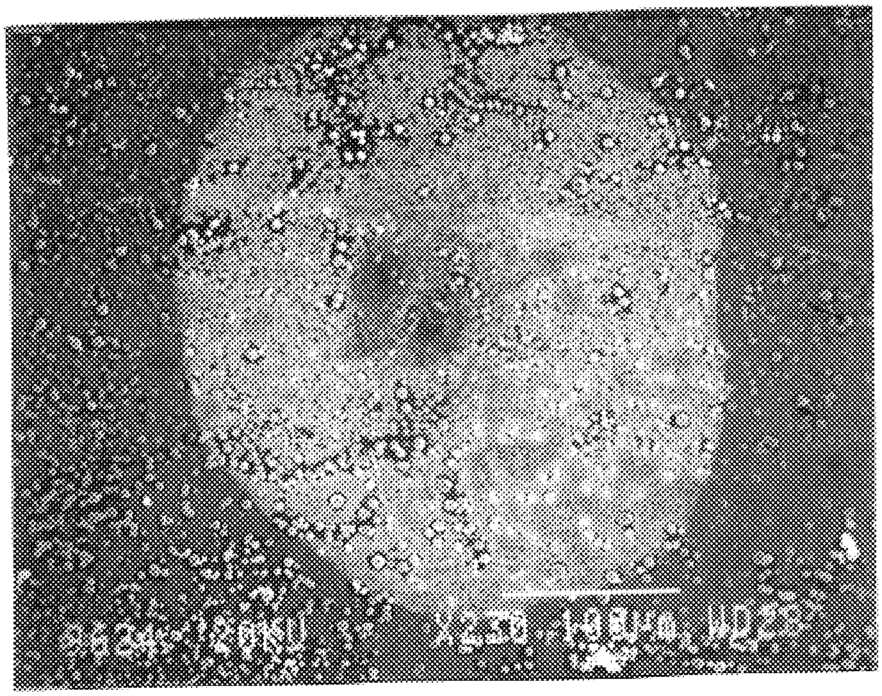
FIG. 13*a* and 13*b* are photographs from a scanning electron microscope of the precoated membrane surface.
Figure 13B:
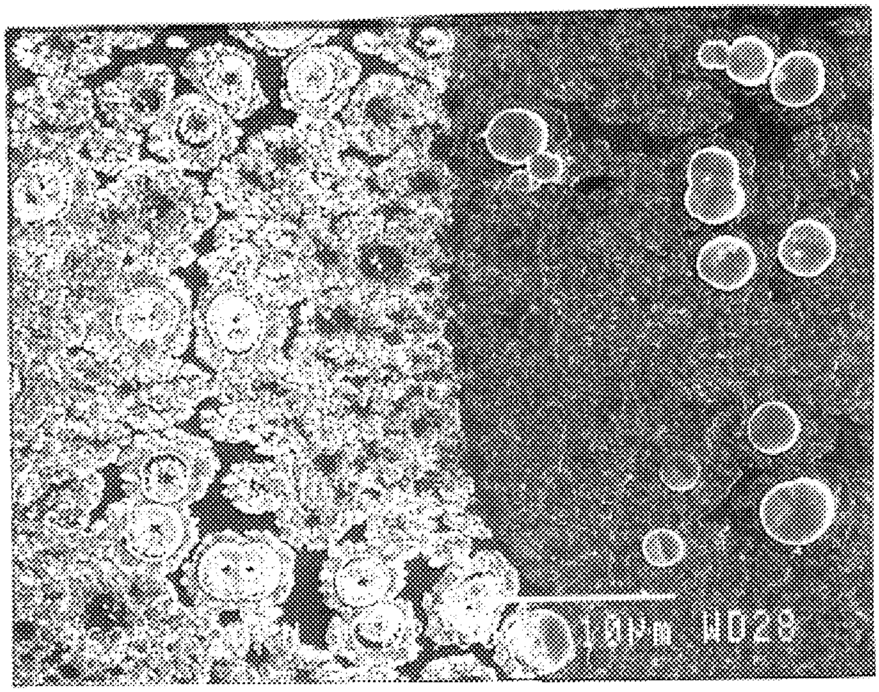

Examination of the precoated membrane target with an electron microscope after spotting of an aqueous sample shows that a fine field of microcrystals have grown in the area exposed to the aqueous sample. This is shown in FIG. 13 at two different magnifications. At low power (230× magnification), the area spotted is clearly visible as a result of the light reflected off the recrystallized matrix on the membrane surface. The two dark areas in the center are regions exposed to the laser beam, each spot representing about 10 laser shots. At high power (2600×magnification), the homogeneous microcrystalline field is clearly visible together with the nearby precoated membrane surface which was not exposed to the aqueous sample. This untreated area appears amorphous in nature with no visible crystal formation even though precoated with matrix. It is believed that the small amount of matrix deposited on the membrane by this procedure forms a thin layer as the organic solvent rapidly dries and is substantially amorphous in nature, perhaps the result of interaction of the matrix with the cellulose. When a small mount of water is added to the dry coated membrane, the matrix dissolves (at least in part) and on slow drying, the solubilized matrix concentrates and forms microcrystals containing the analytes of interest. This recrystallization is seen in FIG. 13*b* in the form of rosettes of microcrystals.

Figure 14A:
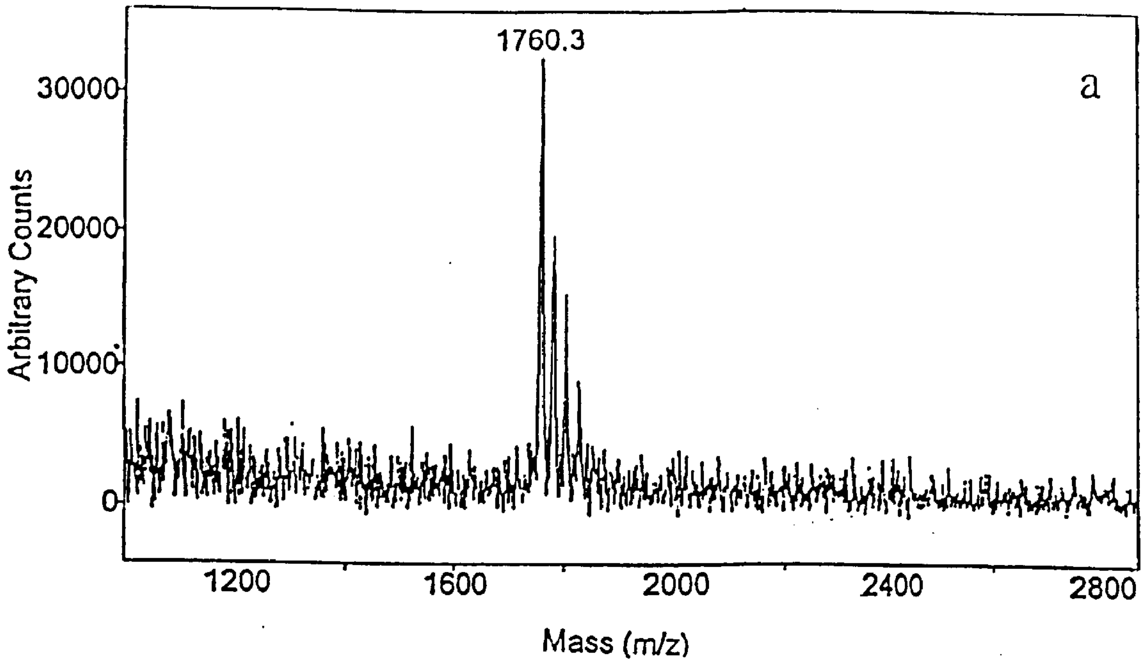
FIG. 14*a* is a MALDI mass spectrum of 200 attomoles renin substrate tetradecapeptide in 1.0 M NaCl obtained from deposition of 4 nL aqueous solution on the precoated membrane.
Figure 14B:
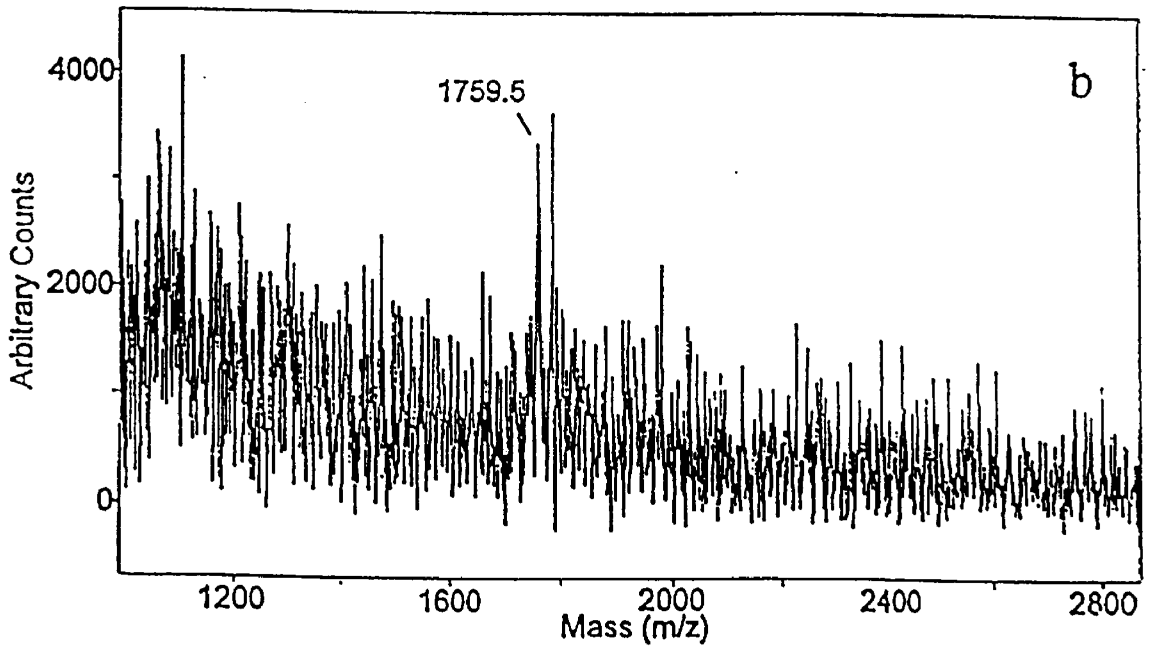
FIG. 14*b* is a MALDI mass spectrum of 500 attomoles renin substrate tetradecapeptide in 1.0 M NaCl from deposition of 5 nL matrix solution in 40% acetonitrile on a normal stainless steel target. The $[M+H]^+$ion is seen at m/z 1760, with sodium adductions at higher m/z values.

One of the interesting observations found with the use of these precoated membranes was the apparent increase in salt tolerance. FIGS. 14*a* and 14*b* compares the MALDI mass spectra of renin substrate tetradecapeptide in 1.0 M NaCl spotted on a precoated membrane (FIG. 14*a*) and spotted on a stainless steel target in a solution containing matrix and organic solvent (FIG. 14*b*). In both cases, spotted sample solutions were 5 nL in volume, with a total of 200 and 500 attomoles of peptide, respectively. The results show the matrix precoated membrane gives a spectrum of superior quality to that produced from the stainless steel target. Similar results were obtained when 0.1 M phosphate buffer (pH 6.8) was used, although 1.0 M phosphate buffer did not give a suitable spectra in either case. In the case of proteins, a similar improved salt tolerance was observed in the case of samples analyzed using the precoated membrane. For example, for horse heart cytochrome c (12,361 daltons), 5 nL containing 500 attomoles of the protein in 1.0 M NaCl gave a signal for the molecular ($[M+H]^+$) ion with signal-to-noise of about 6:1, whereas no signal above background could be detected using the normal stainless steel target.

Quantitative measurements can be obtained from the precoated membrane targets, and internal standards easily incorporated. For example, the intensity of the $(M+H)^+$ion of a series of samples of renin substrate tetradecapeptide containing 50, 100, 500, 1000, 2000 and 5000 attomoles in 5 nL aqueous solution, was measure relative to that of an internal standard, 400 attomoles of angiotensin I, which was included in each sample. A plot of the ratio of the $[M+H]^+$ ions of analyte to internal standard versus analyte amount gave a linear relationship with a correlation coefficient of $r^2$ equal to 0.9988. On average, the standard deviation (n=8) measure for each of the six points on the line was ±14%. These data indicate that accurate quantitative measurements are possible at low analyte amounts using the precoated membrane targets and that both peptides remain homogeneously distributed in the microcrystal field after drying. When measurements were made without reference to an internal standard, a somewhat poorer quantitative relationship was produced with a correlation coefficient of 0.9655 in the range of 50–1000 attomoles.

In comparison with the usual MALDI sample preparation procedure, the use of the matrix precoated membrane targets for the analysis of polypeptides and small proteins such as insulin was found to provide comparable sensitivity. Results with proteins under 20,000 daltons (e.g., horse heart cytochrome c, β-lactoglobulin A) also gave comparable results, but higher molecular weight proteins (>about 25,000 daltons) gave poorer results when using the precoated membrane method. Thus, for the monomer of yeast alcohol dehydrogenase (36,744 daltons) and carbonic anhydrase (29,021 daltons) the spectral quality was poorer and not reproducible compared to the normal procedure using a stainless steel target. Presumably, this is the result of the limited matrix available in these precoated membrane preparations and/or the inability to form suitable microcrystals containing protein.

In conclusion, for cases involving the analysis of peptides and small proteins where addition of matrix solution to a sample would significantly alter the sample, the use of precoated targets may offer the best approach. The combination of MALDI with separation systems such as low flow rate capillary systems where post-column addition of matrix will dilute the sample, give band spreading, and decrease the sensitivity of the analysis, the deposition of the eluate directly onto a precoated membrane target could considerably optimize and simplify the analytical process. In addition, the capability of direct deposit of aqueous samples on precoated targets may present a more convenient and rapid means of analyzing large numbers of similar samples.

MALDI MS For Direct Sample Imaging (Without CE)

The following is another embodiment of the invention, wherein a mass analyzer, and preferably MALDI MS, is used to detect sample molecules of interest generated from various laser spots on a single sample. Two different techniques are disclosed: (1) direct imaging of the sample, and (2) analysis of targets blotted with the sample. The equipment and the techniques are set forth below.

Mass Spectrometry

MALDI MS spectra were acquired using a PerSeptive Elite TOF instrument equipped with delayed extraction (DE) and a nitrogen laser (337 nm). A mask with a 3 mm diameter hole was placed immediately in front of the exit aperture of the laser beam from the laser unit so that, together with the normal focusing lens system, the laser spot size on the target was approximately 25 μm in diameter. Two matrices were used for analysis; 2,5-dihydroxy benzoic acid (DHBA) and α-cyano-4-hydroxy cinnamic acid (CHCA).

Matrix Application

Two sample preparation methods were used to obtain signals from biological samples: rinsing the sample in saturated DHBA dissolved in Milli Q water and coating samples by electrospraying a solution of CHCA. Pituitary tissue samples were prepared by rinsing in a saturated solution of DHBA dissolved in Milli Q water. Excess matrix solution was removed by pipetting, and the sample allowed to dry thoroughly at least 18 hours in a vacuum desiccator prior to analysis by MALDI MS. For electrospray coating of samples, a 250 μL gas tight syringe was filled with matrix solution consisting of saturated CHCA in a solvent consisting of 80–85% methanol and 15–20% Milli Q water with 2% acetic acid or 0.1% TFA. The matrix solution was centrifuged briefly to remove particulate matter and transferred to a clean amber colored Eppendorf tube. A 12 inch length of polyimide-coated fused silica capillary (250 μm i.d.) was used to transfer matrix solution from the syringe to a metal zero dead volume (ZDV) HPLC fitting. Teflon tubing with the internal diameter drilled to fit the outer diameter of fused silica capillary was used to make the connections from the syringe to the transfer capillary and from this capillary to the ZDV fitting. The electrospray needle consisted of a 6 inch length of polyimide-coated fused silica capillary (250 μm i.d.) connected to the metal ZDV fitting using teflon tubing. The end of the electrospray needle was ground flat and the polyimide coating was left intact. A syringe pump (Harvard Microliter Syringe Pump) set at a low flow rate of 1.6 μl per minute delivered the matrix solution to the tip of the fused silica capillary needle. To obtain a fine spray of the matrix solution, 2.75 to 3 kV was applied to the ZDV fitting using a Spellman High Voltage DC Supply. The metal sample plate was grounded and placed 3–5 mm from the end of the electrospray needle. The distance of the sample plate to the needle was adjusted until a Taylor cone was visible and stable. The plate was then pulled across in front of the spray at a rate of approximately 5 mm per 30 seconds making sure that the Taylor cone remained stable. Matrix could be seen on the sample as a light yellow coating of small crystals <1 μm in length. Estimates obtained from microscopic examination indicate matrix layers of 0.5–5 μm thick. Once the matrix had been applied, the sample was placed into a vacuum desiccator and allowed to dry at least for 10 minutes (overnight drying is acceptable) before analysis by MALDI MS.

Tissue Preparation

Sprague-Dawley rats were used to obtain tissue specimens. After decapitation, the rats were immediately dissected to remove tissues of interest such as the pituitary and pancreas and stored in artificial cerebrospinal fluid (ACSF) on ice. The tissue was immobilized in 5% low protein binding agar (Type IV: Special High EEO, Sigma Chemicals). One side of the pituitary was stained with Coomassie Brilliant Blue G-250 (Sigma Chemicals) to indicate the orientation of the tissue before immobilizing in agar. The rat tissue was sectioned using a surgical blade or microtome blade either freehand or by attaching a blade to a stereotax unit to obtain more uniform sections. If tissues were permeabilized, they were placed into a solution of alpha toxin (1%) or β-escin (5%) for 10–30 minutes. The sections were placed onto a surface (membrane or metal) and dried overnight or longer (up to a week) either in a vacuum desiccator or on a lyophilizer (50 mm Hg).

Human buccal mucosa epithelial cells (cheek cells) were obtained by scraping the inside of the cheek of a volunteer. The cells were transferred to the metal sample plate, thoroughly washed in Milli Q water at least 3 times, stained with a 0.2% solution of methylene blue, and then dried in a vacuum dessicator for at least 34 hours.

Photographs of samples on targets were taken using a Hammamatsu Photonics Deutschland Color Chilled CCD camera having an Olympus Vanox lens with a 10×objective and 10×eyepiece. The photographs were saved on disk and were cropped and adjusted for color intensity using Adobe Photoshop.

Target Membranes and Surfaces

Membranes were used as blotting surfaces as well as support for fresh tissue. NA49 CM ion exchange membrane (Schleicher and Schull) is a cationic exchange membrane containing carboxymethyl functional groups. C-18 beads (10 μm diameter, Adsorbosphere UHS, Alltech) was smoothed onto double-sided tape to make a homogeneous continuous layer of the C-18 functional group. Metal surfaces of the sample holders were cleaned before placing samples on the smooth metal portions.

Enzyme Digestion

Trypsin (Bovine pancreas, Sigma Chemicals) and Carboxypeptidase Y (Baker's yeast, Sigma Chemicals) were used for proteolytic digestion. Both digests were performed in 25 mM Bis-Tris, pH 7, with 25 mM $CaCl_2$ added to the trypsin solution to reduce autolysis. Freshly collected saliva was placed in a boiling water bath for 5 minutes and then cooled on ice. A 1:20 dilution was made using the buffer solutions. The digests were carried out at 37° C. and aliquots were taken at various time points with addition of the aliquot to MALDI MS matrix (CHCA in 50/50 acetonitrile/0.1% TFA in Milli Q water) to stop the reaction.

Blotting

Direct blotting was performed by placing freshly cut tissue (with or without permeabilization) onto the target surface for 10–30 seconds and then carefully lifting off the tissue. For the C-18 surface, methanol was added to the C-18 beads and the tissue was placed onto the C-18 beads before the sample was dried. The blotted surface (membrane, stainless steel C-18 beads) was rinsed by pipetting approximately 5–10 μl of Milli Q water onto the surface at least three times. The water was removed from the surface by repipetting and the sample holder placed in the desiccator and dried for at least 5 minutes and up to 12 hours. Matrix was then electrosprayed onto the surface and dried in the desiccator for at least 15 minutes. This prepared sample could be stored for up to a week in the dessicator.

A. MALDI Imaging of Visible Imprint

Figure 15:
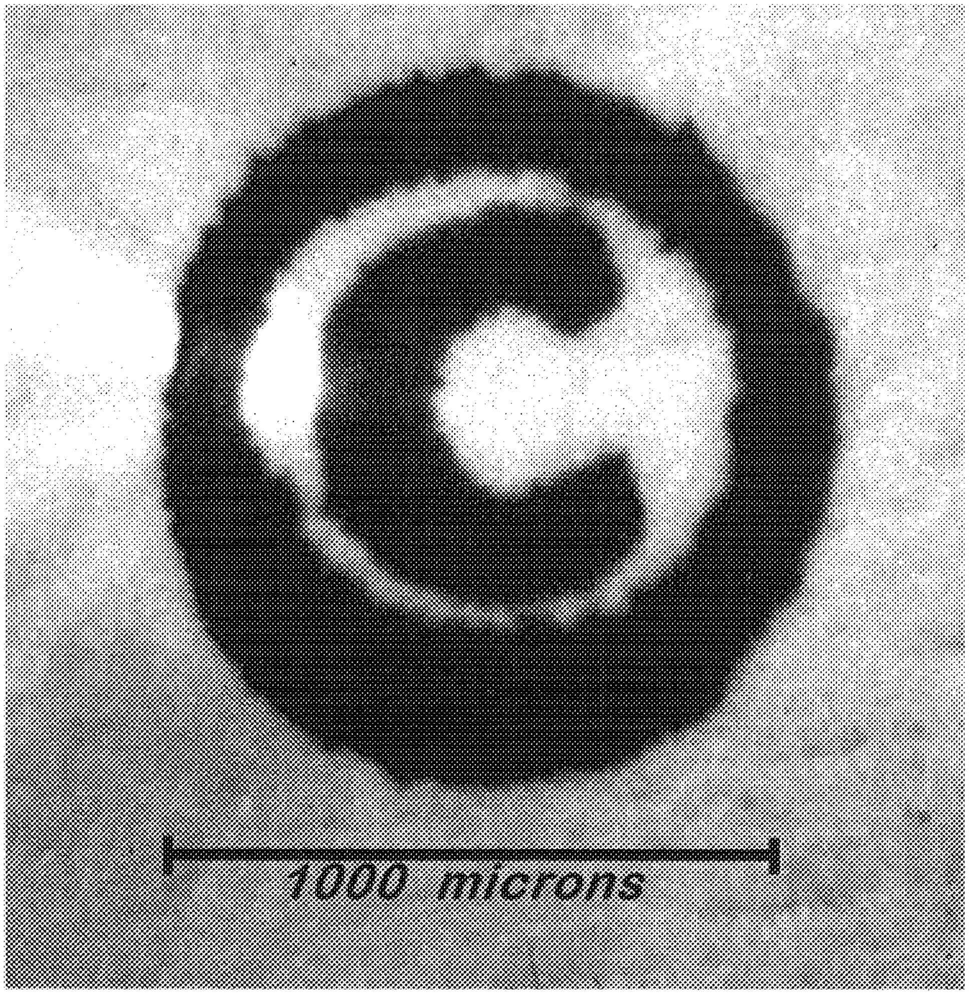
FIG. 15 is a photomicrograph of the Coomassie blue stain imprint of a figure on a NA49 membrane target.
Figure 16:
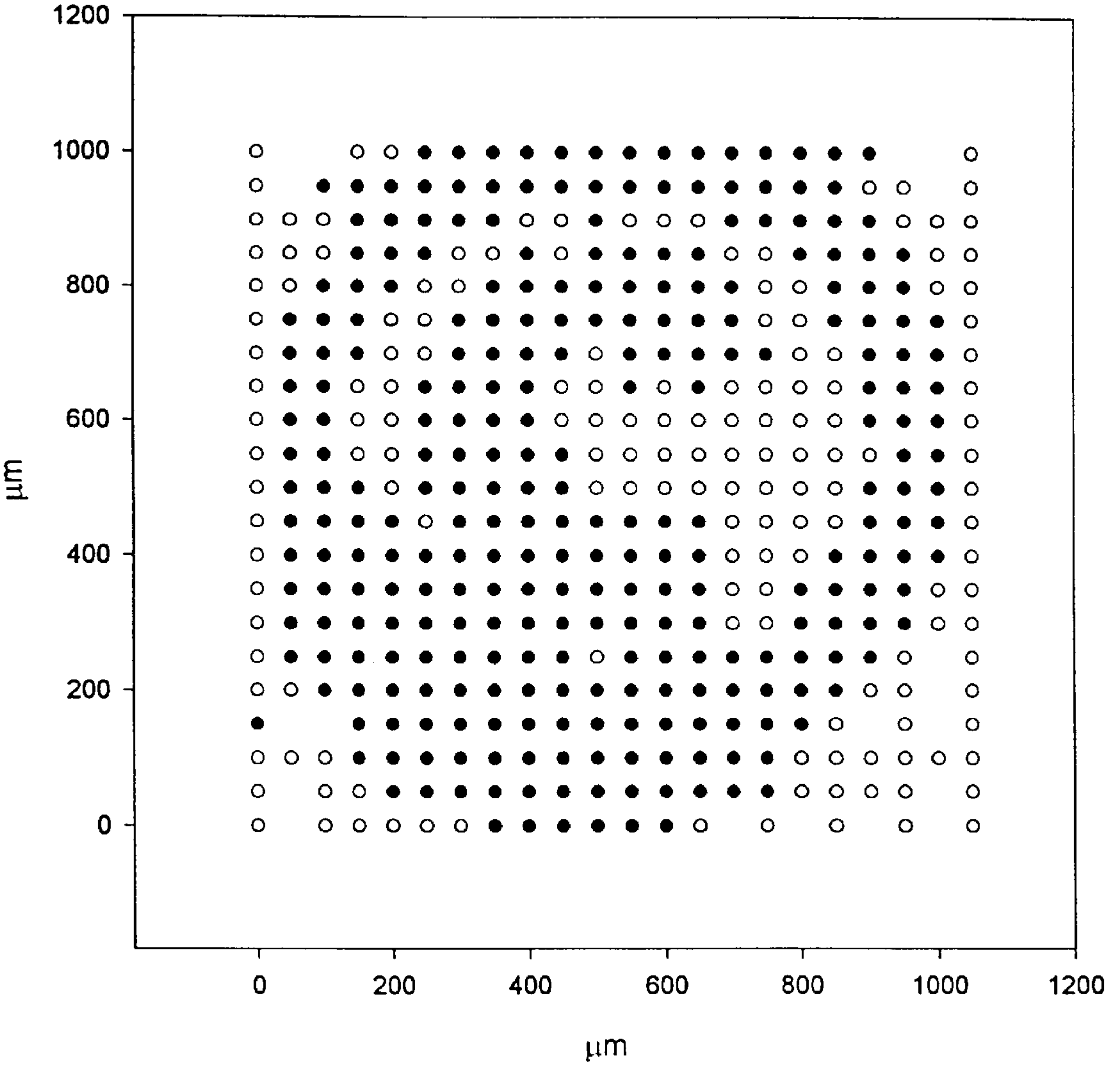
FIG. 16 is an image produced by mapping the intensity of the $[M+H]^+$fragment at m/z 832 over the X,Y coordinates of a 1 mm square area containing the imprint shown in FIG. 15.
Figure 17:
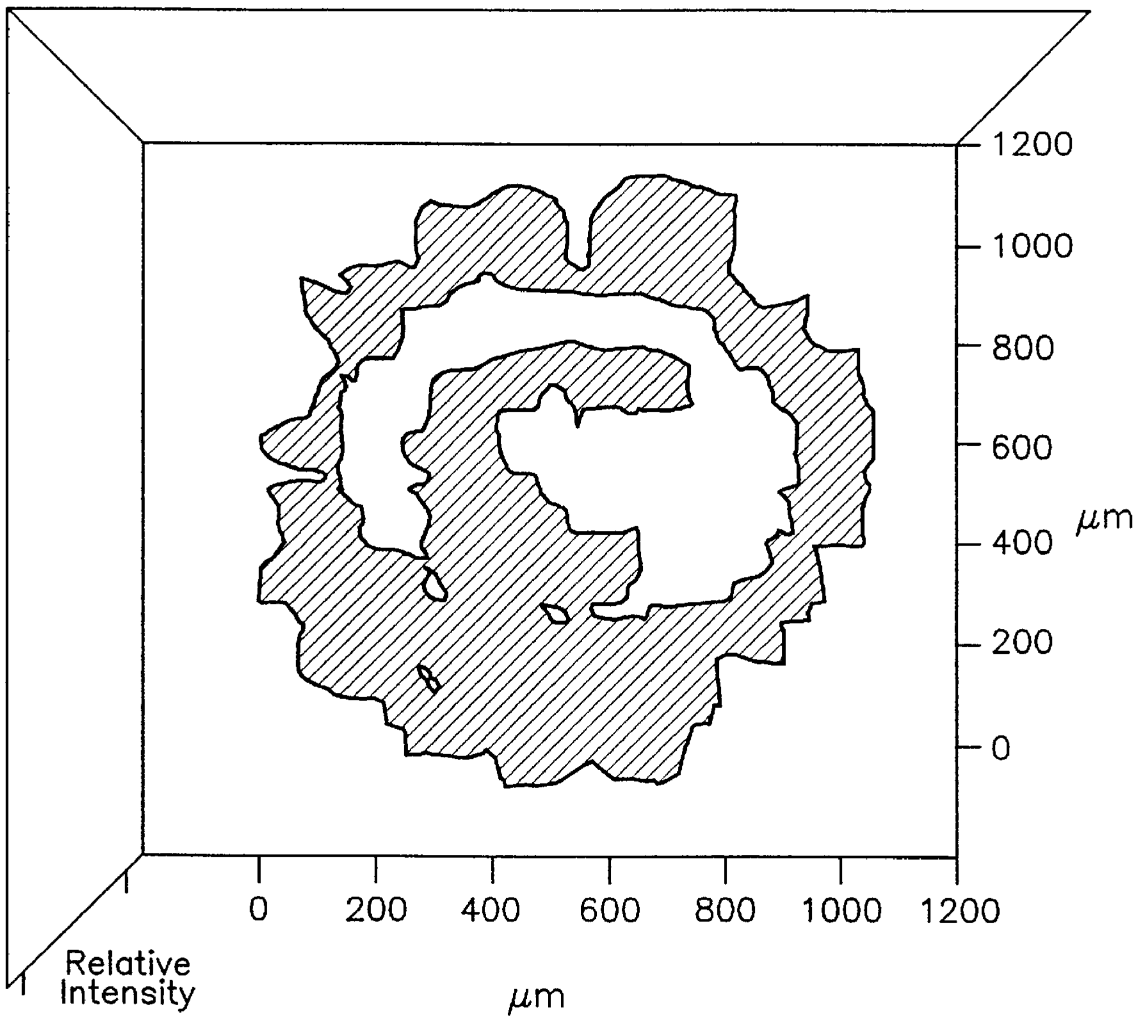
FIG. 17 is another plot of the data shown in FIG. 16 using extrapolated (calculated) data points between measured points so as to produce a continuous surface for data points having $S/N \geqq 2$.

In order to assess the overall usefulness of MALDI for imaging samples and to study the effects of several instrumental parameters on the quality of an image an imprint was made on a target using an ink visible by eye. This image was produced using a dye-coated stamp of a copyright symbol (©) approximately 1 mm in diameter across the outer circle. The dye Coomassie Brilliant Blue (G 250) has a molecular weight of 831. FIG. 15 shows a photograph of the Coomassie blue stained imprint of the symbol on a NA49 (anionic cellulose) membrane target. The matrix (CHCA) was applied as an electrosprayed film as described in the methods section. FIG. 16 shows the image produced from mapping the intensity of the $[M+H]^+$ion at m/z 832 over the area of the target containing the imprint. The laser beam was rastered over this area of approximately $8\times10^5$ μ$m^2$ with laser shots every 75 μm in both the X and Y directions for a total of about 400 spots. Each laser spot exposed a circular area of approximately 25 μm in diameter, (~500 μ$m^2$), thus sampling about 25% of the image area. Each laser spot can be considered a 'pixel' of data of individual m/z values within the scanned mass range, analogous to the minimum data spot or pixel of a video image comprised of 3 color channels for color images. The image shown in FIG. 16 plots signal-to-noise (S/N)$\geq$2 as solid circles and S/N<2 as open circles for the sampled pixels over the imaged area, clearly showing the low resolution aspect of this image. This image can be better visualized by plotting these data using SigmaPlot with the interpolation feature turned on. In the interpolated graph, shown in FIG. 17, intensity values of m/z 832 are calculated and "filled in" between two measured values. The figure was drawn so that all values of S/N<2 at m/z 832 are blank (below threshold) and values of S/N$\geq$2 are plotted as a continuous surface. In this figure, the basic outline and shape of the image is much more evident.

Figure 18:
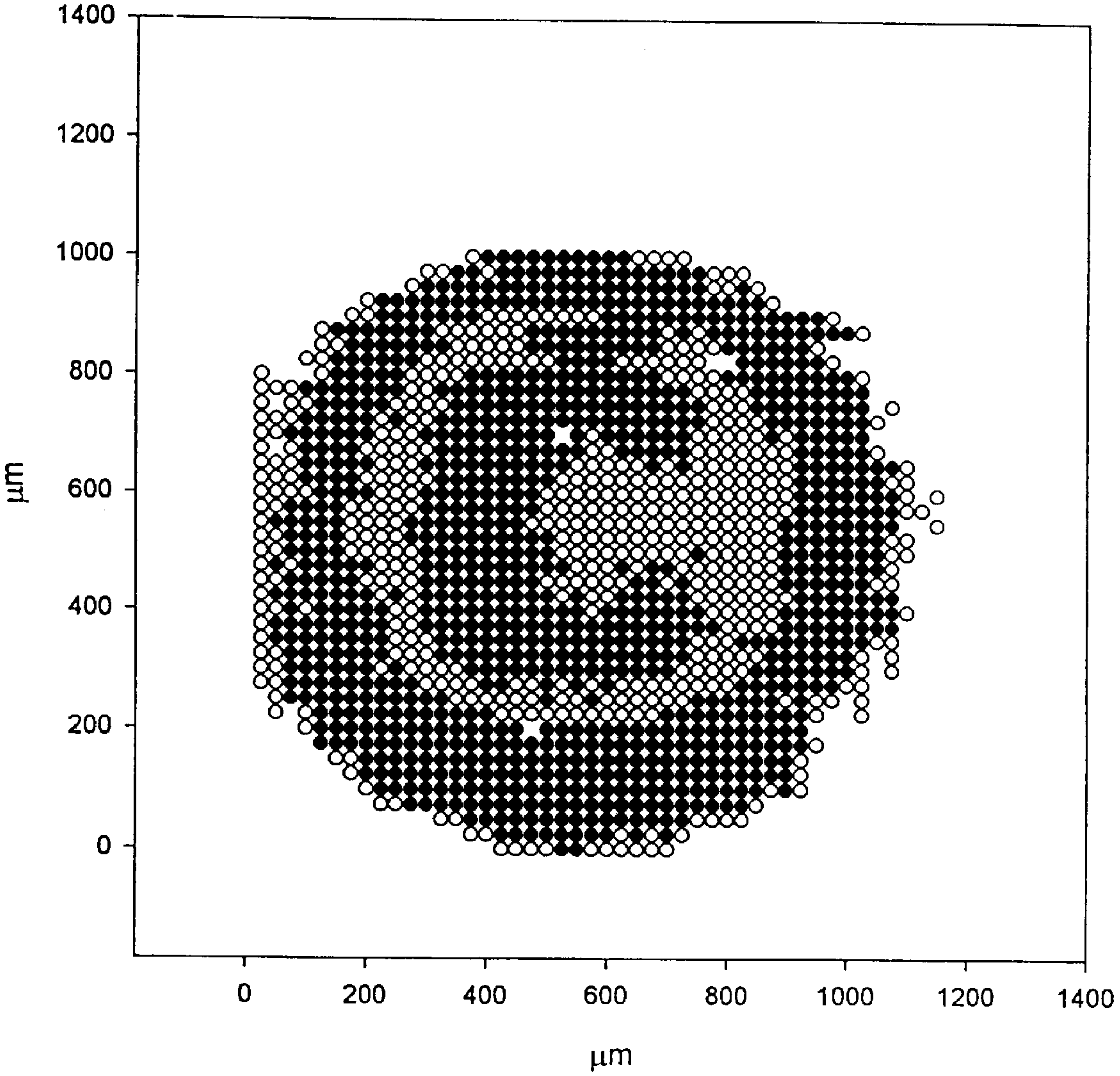
FIG. 18 is a high resolution image of the imprint from raw data with laser spots taken every 25 micrometers.
Figure 19:
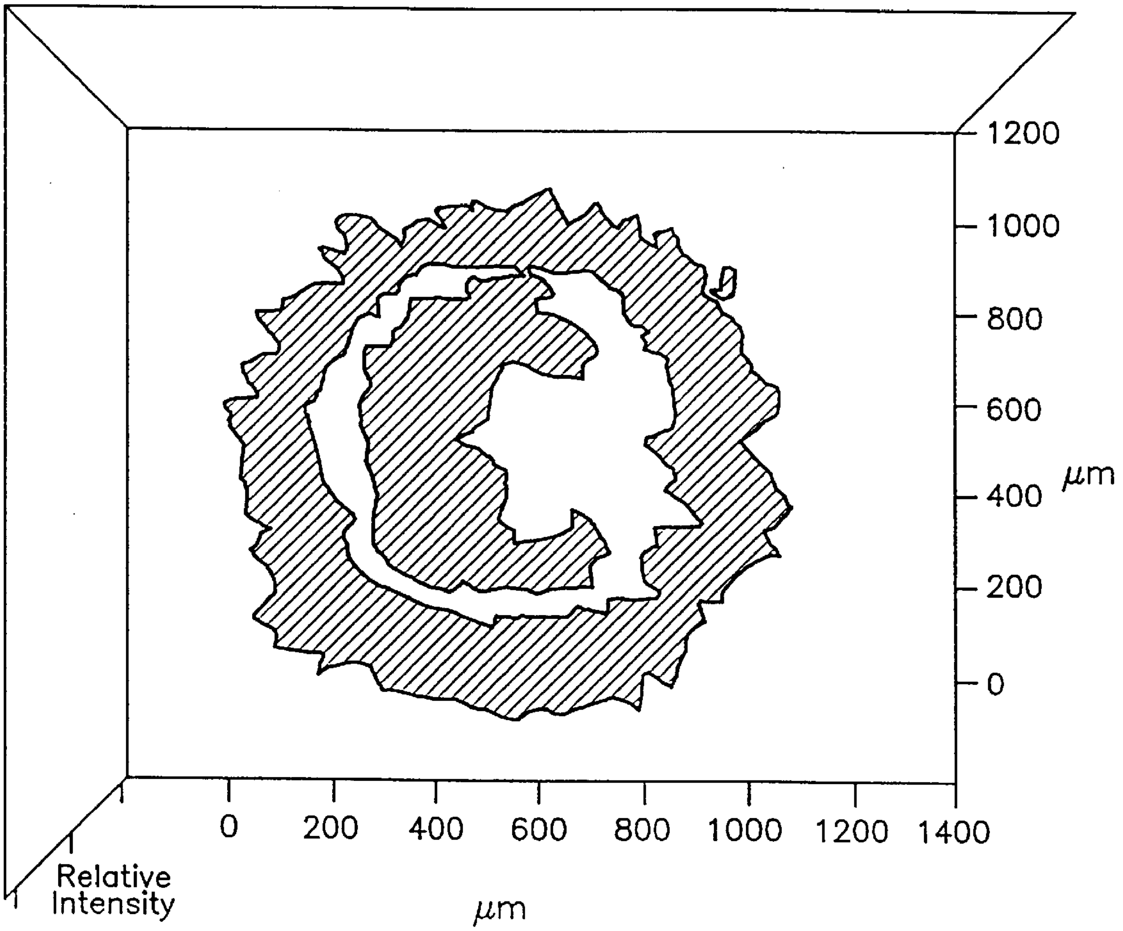
FIG. 19 depicts the high resolution data shown in FIG. 18, wherein the intensity values with $S/N \geqq 2$ are plotted as a continuous X,Y plot (with no extrapolated points added).

The resolution of the image can be increased by increasing the number of pixels. FIG. 18 shows the m/z 832 image where laser shots were taken every 25 μm, producing an image containing about 1500 pixels. In this case, ~95% of the imprint image was sampled (solid circles in FIG. 18) where the intensity values with S/N>1 are plotted as a continuous X,Y plot with SigmaPlot (extrapolation feature off). In this case, the m/z 832 image is quite similar to that of the photograph in FIG. 15. Finally, FIG. 19 shows the same high resolution image data plotted in SigmaPlot for m/z 832, with the interpolation feature on to show a continuous surface of pixels with S/N$\geq$2. This view provides a 3-dimensional quality in which the Z direction (height) is a function of ion intensity.

B. Direct Imaging of Epithelial Cells

Figure 20:
FIG. 20 is a photomicrograph of human buccal mucosa epithelial cells on a target plate.
Figure 21:
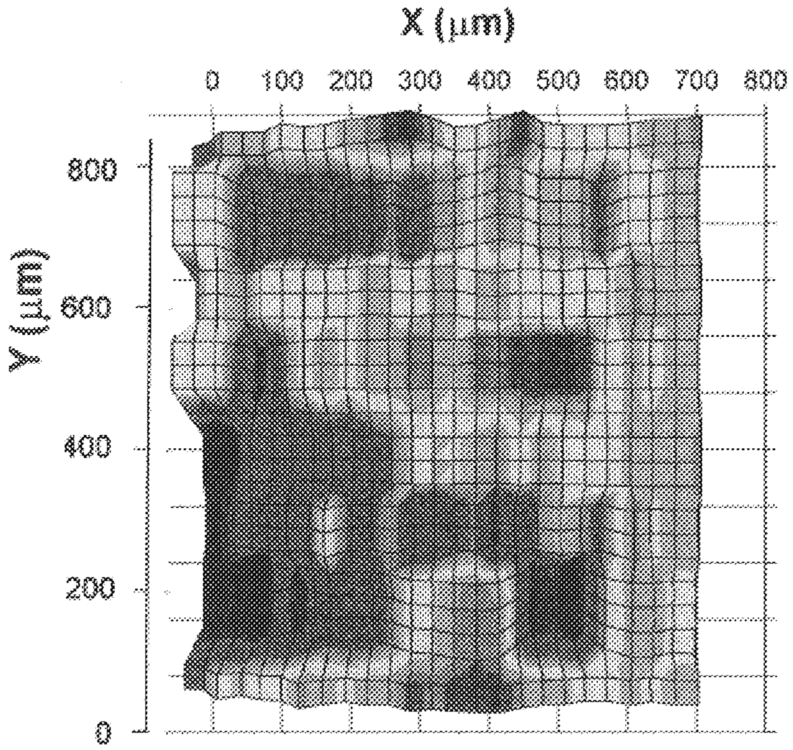
FIG. 21 is a total ion image of cell clusters produced by summing the ion intensities from m/z 500–30,000.
Figure 22:
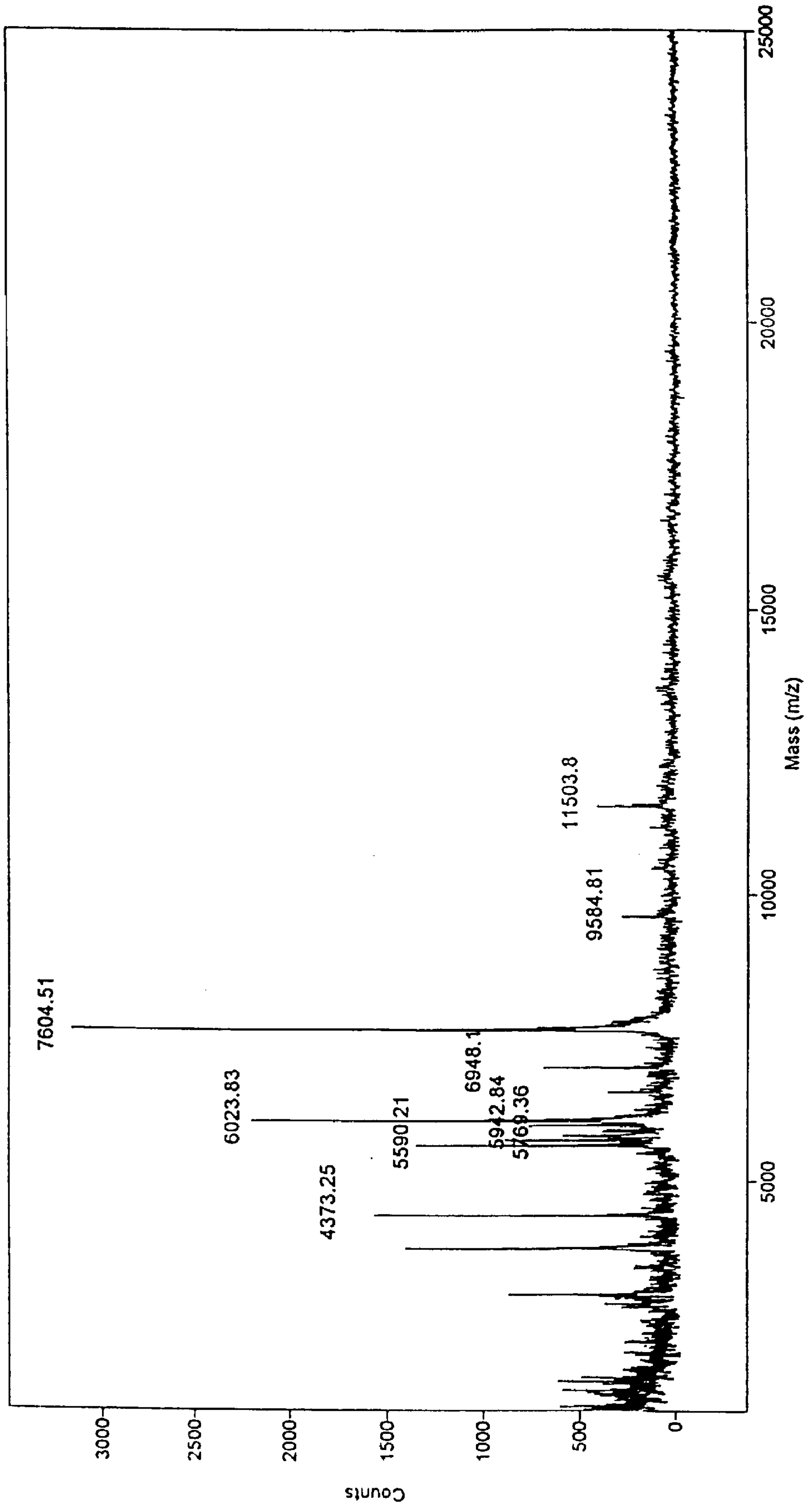
FIG. 22 is a mass spectrum from one of the pixels of the image shown in FIG. 21, where m/z 7605 can be seen as a major component.
Figure 23:
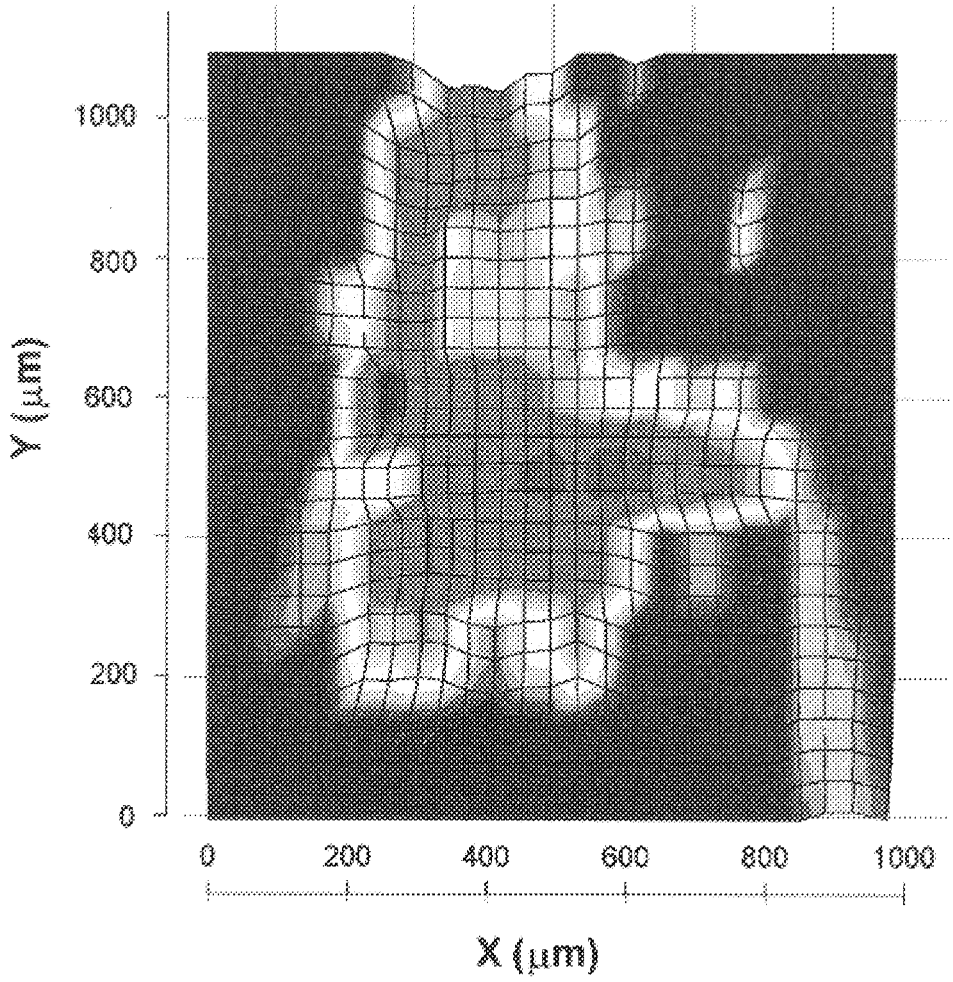
FIG. 23 depicts a selected ion image at m/z 7605 of the buccal mucosa cells.

Human buccal mucosa cells (cheek cells), were spread on the surface of a stainless steel target and were stained with 0.2% methylene blue to visualize the cells. A photomicrograph of this sample is shown in FIG. 20. A cluster of cells was then imaged by MALDI MS, and the total ion image of the cell cluster from m/z 2,000–30,000 is shown in FIG. 21. This image was produced by summing all ion intensities of S/N$\geq$2 in each of the mass spectra taken across the sample. The result is then the best general picture of the sample representing all m/z values found. A typical mass spectrum from one of the pixels of the image is given in FIG. 22, where m/z 7605 can be seen as a major component. The selected ion image at m/z 7605 is given in FIG. 23. This image is a continuous plot of pixels created from the raw mass spectra by SigmaPlot where approximately a total of 262 pixels were taken. This image represents a single data channel of m/z 7605, a molecule that adheres to the cell surfaces, thus mapping the spatial location of this molecule in the sample. Although this molecule is also found in saliva, washing of the cells removed all but that adhering to the cell surface. To confirm the identity of the molecule at m/z 7605, proteolytic enzymes were used to obtain some sequence information. Digestion with trypsin, an endopeptidase which cleaves primarily on the carboxyl side of Arg and Lys, revealed no cleavage after 6 and 12 hours when analyzed by MALDI MS. This is not surprising, since many proteins present in saliva and other body fluids such as tears are proline rich, providing few sites for cleavage by trypsin. Digestion with carboxypeptidase Y, an exodopeptidase that cleaves the C-terminal amino acid of the protein, with subsequent analysis by MALDI MS indicated that digestion of m/z 7605 had occurred. Time points taken over 24 hours showed the slow disappearance of the peak at m/z 7605 and the appearance of an ion at m/z 7450 (a difference of 155 Da), an ion at m/z 7353 (a difference of 97 Da), a peak at 7266 (a difference of 87 Da), and a peak of low intensity at m/z 7112 (a difference of 154 Da). This indicated the C-terminal sequence was: -Arg-Ser-Pro-Arg. From this C-terminal sequence, m/z 7605 appears to be a protein of 78 amino acids composed of the C-terminus of 1B-1(96 amino acid residues, MW=9594) with a MW of 7606 (error of 0.01%). This protein is found in the buccal mucosa and is believed to bind to microorganisms and help prevent tooth decay (7).

C. Direct Imaging of Proteins and Peptides in Tissue Slices

Tissue slices from both rat pituitary and pancreas were imaged to determine the location of various peptides and proteins within the tissue slices. Matrix addition was accomplished in two ways. In the first example, the rat pituitary gland was sectioned directly into DHBA solution and the tissue slice dried on the stainless steel target in the lyophilizer. Many peptides and proteins known to be present in the pituitary were detected in the spectra of material desorbed directly off the tissue. Table II gives the measured and calculated molecular weights of the compounds detected. Although compounds were detected on the surface of the tissue itself, they were also detected at low intensity past the edge of the tissue on the plate, presumably from leakage of extracellular fluid or matrix.

Figure 24:
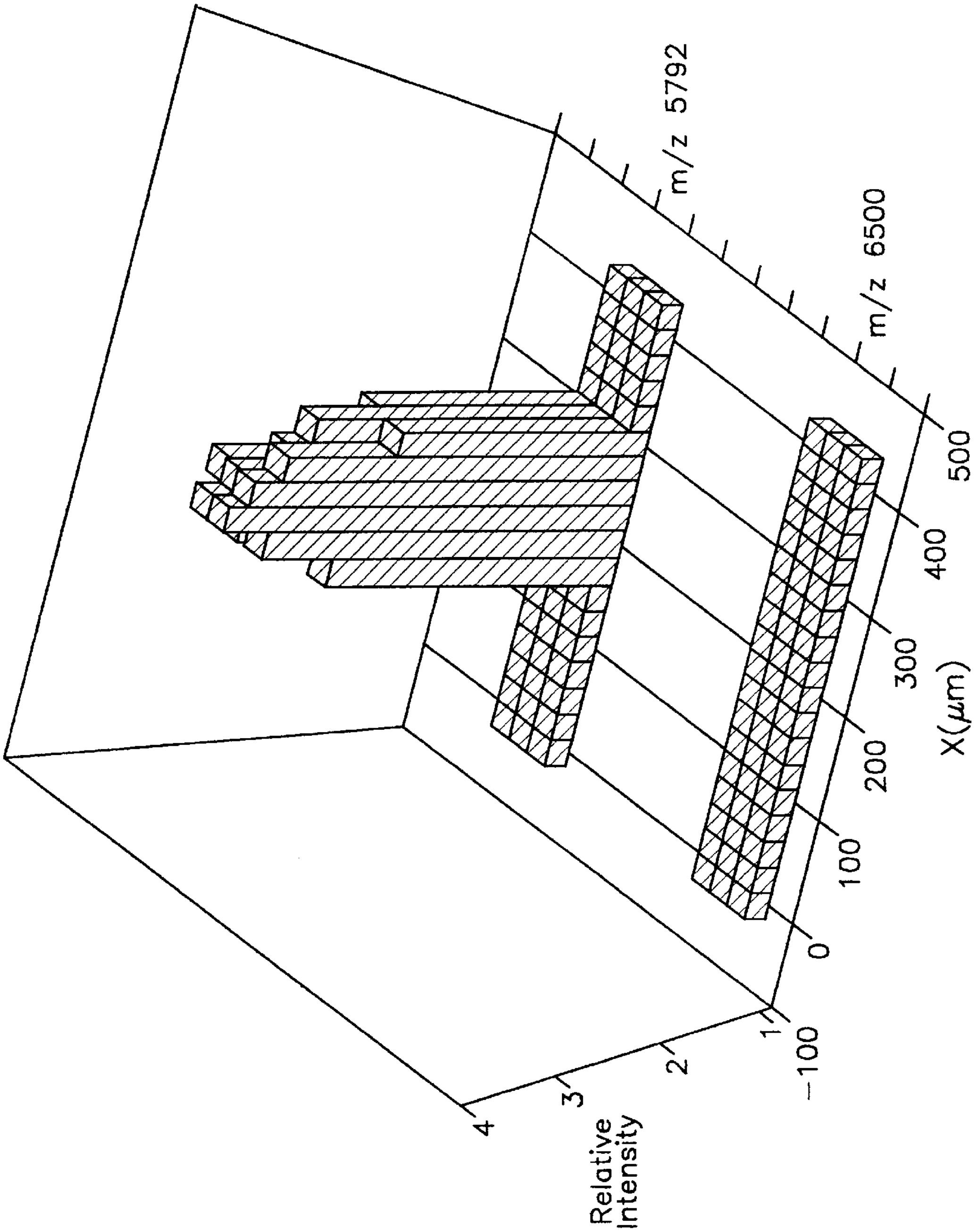
FIG. 24 depicts a 3-line ion image at m/z 5792 of a section of rat splenic pancreas showing the presence of insulin, and one at m/z 6500 as a control (since no pancreatic protein is known at this mass).

In order to minimize sample leakage, several types of sample preparation procedures were evaluated. A general procedure which appears to be best suited for most tissue sections involves drying of the tissue followed by electrospray addition of matrix. For example, a section of rat splenic pancreas was analyzed by placing the tissue on a NA49 membrane and drying it on the lyophilizer for several days. CHCA matrix was electrosprayed directly onto the dried tissue slice followed by another drying step of 15 minutes in a vacuum desiccator. Analysis of a 3-line image across this section showed the presence of many of the peptides and proteins known to be present in pancreas. FIG. 24 shows these line images for insulin at m/z 5792, clearly showing the edges of an islet in the slice. The diameter of the islet was determined from the MALDI data to be 175 μm ±25 μm, well within the size range for rat islets which vary from 50–230 μm. For comparison, the ion image at m/z 6,500 also shown in FIG. 24 was chosen arbitrarily to monitor background and serve as an internal control i.e., an image produced at an m/z value not correlated with the molecular weight of a known peptide or protein in pancreas.

D. Blotting of Tissue on Prepared Target Surfaces

Direct analysis of tissue has several drawbacks, including interference from signals from low molecular weight lipids (MW<1500 Da) which may obscure signals from low molecular weight peptides in the tissue and the potential of leakage of tissue fluid to other areas of the tissue sample preparation. In an effort to maintain the precise spatial position of a molecule in a sample with that of the actual target specimen imaged, a blotting procedure was evaluated.

The exposed cells of a sectioned piece of tissue were blotted onto a specially prepared surface target that was subsequently mounted on the sample stage of the mass spectrometer. The blotted surface is a positive image of all compounds that adhered to this surface from exposure to the tissue. The target may be washed with water to remove salts and other water soluble contaminants that do not adhere to the target surface. Two types of target surfaces were analyzed, the stainless steel metal target itself and a C-18 micro bead covered target.

TABLE II

Rat Pituitary Print

| Location | Protein | (M + H)⁺ Calculated | (M + H)⁺ Observed |
|---|---|---|---|
| Posterior | Vasopressin | 1085.2 | 1085.8 |
| | Vasopressin-Neurophysin | 9680.1 | 9663.0 |
| | Oxytocin | 1008.2 | 1009.3 |
| | Oxytocin-Neurophysin | 9486.8 | 9486.1 |
| | Partial Truncation Oxytocin-Neurophysin | 9357.7 | 9345.0 |
| Intermediate/Anterior | di-acetyl alpha-MSH | 1708.0 | 1709.5 |
| | Joining Peptide | 1883.9 | 1885.5 |
| | Clip | 2507.8 | 2508.7 |
| | Truncated Clip | 2360.6 | 2362.1 |
| | β-Endorphin | 3439.0 | 3439.1 |
| | Gamma-Lipotropin | 4388.0 | 4389.1 |
| Anterior | Growth Hormone | 21827 | 21823.2 |
| | Prolactin | 22552 | 22538.3 |

Figure 25:
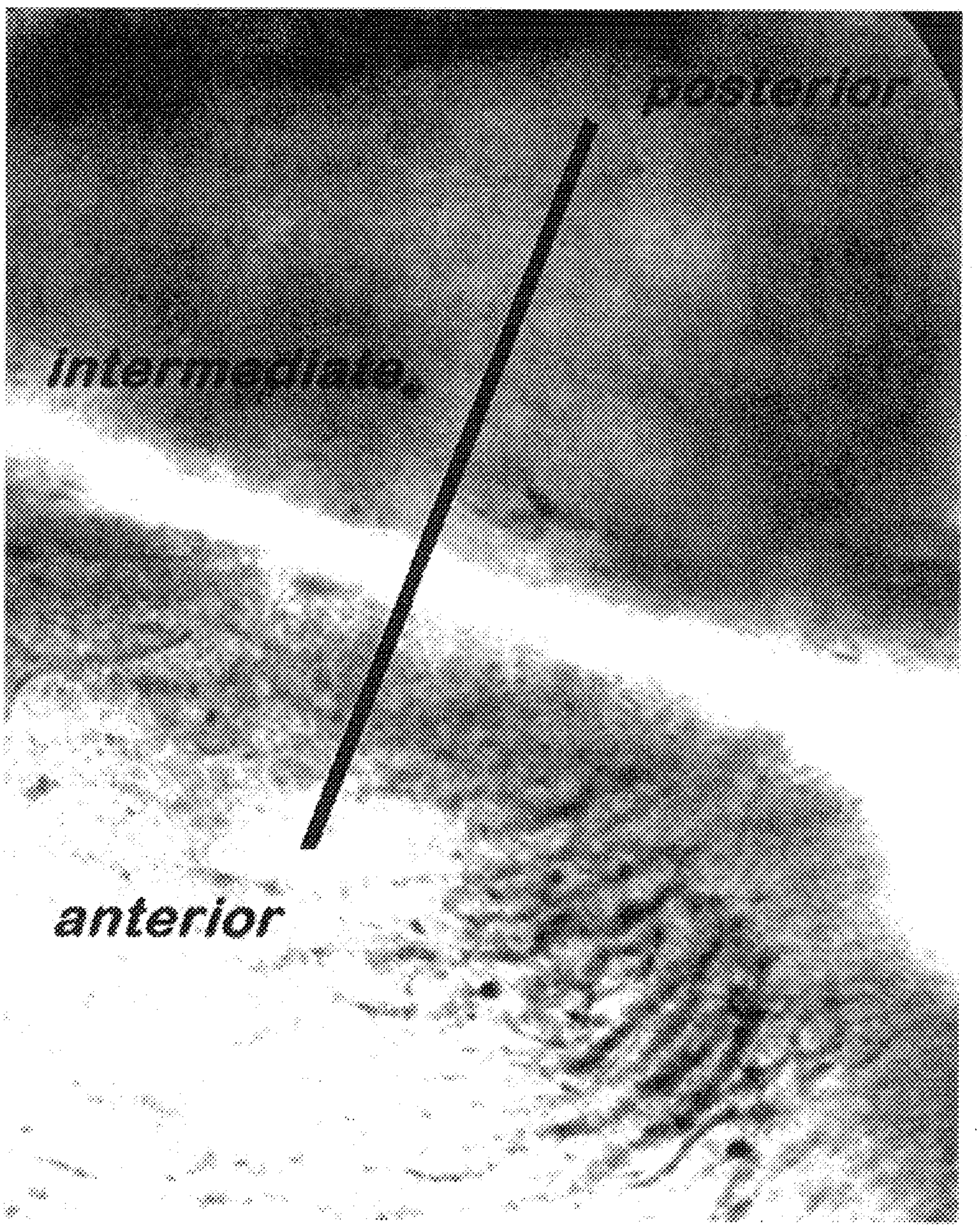
FIG. 25 is a photomicrograph of a sectioned pituitary mounted on the target plate. The black line depicts the consecutive laser spots used to analyze this sample, with the laser covering a distance of 625 micrometers.
Figure 26:
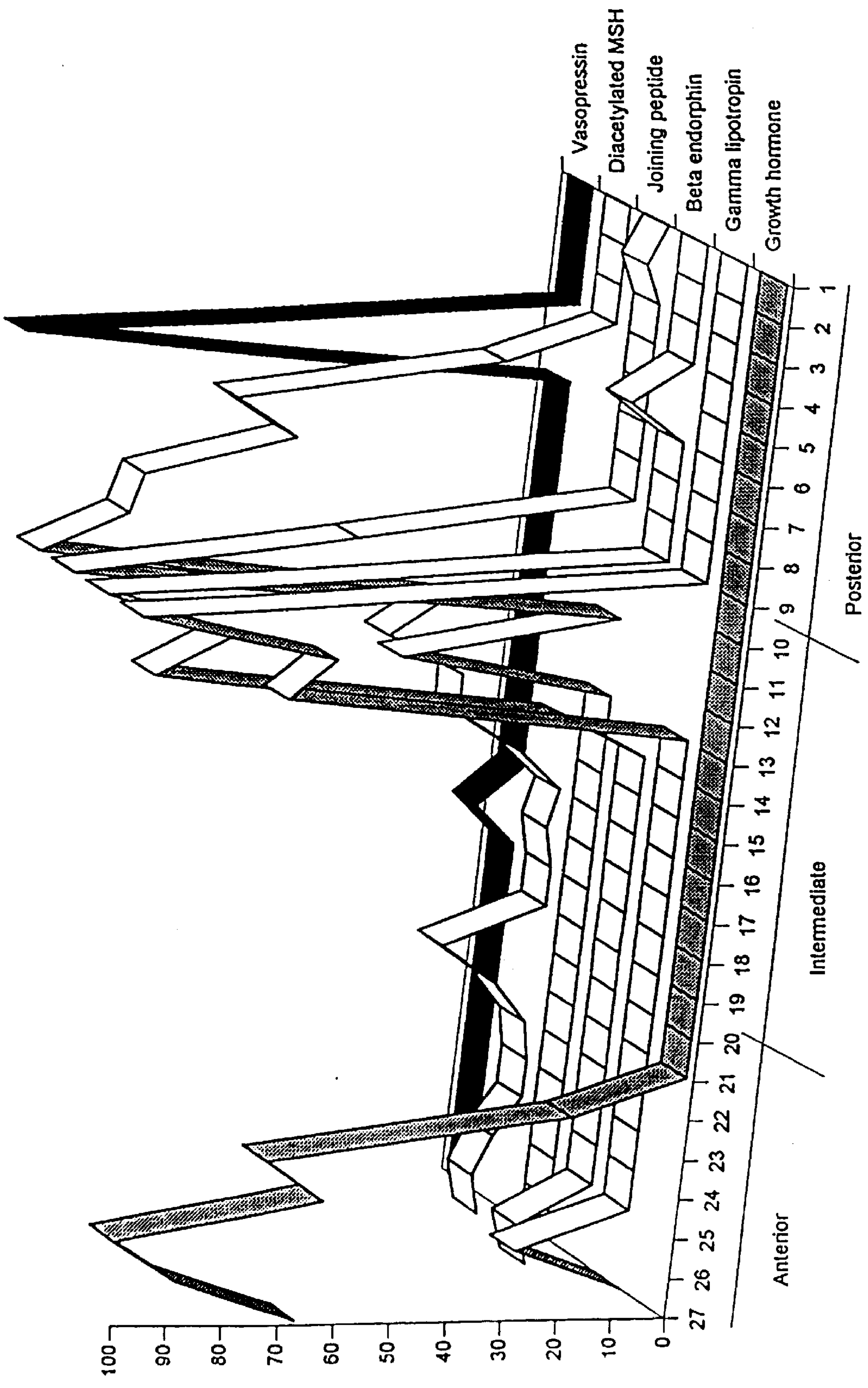
FIG. 26 provides an indication of the various peptides found in the anterior, intermediate, and posterior pituitary, as determined from the imaged area shown in FIG. 25.
Figure 27:
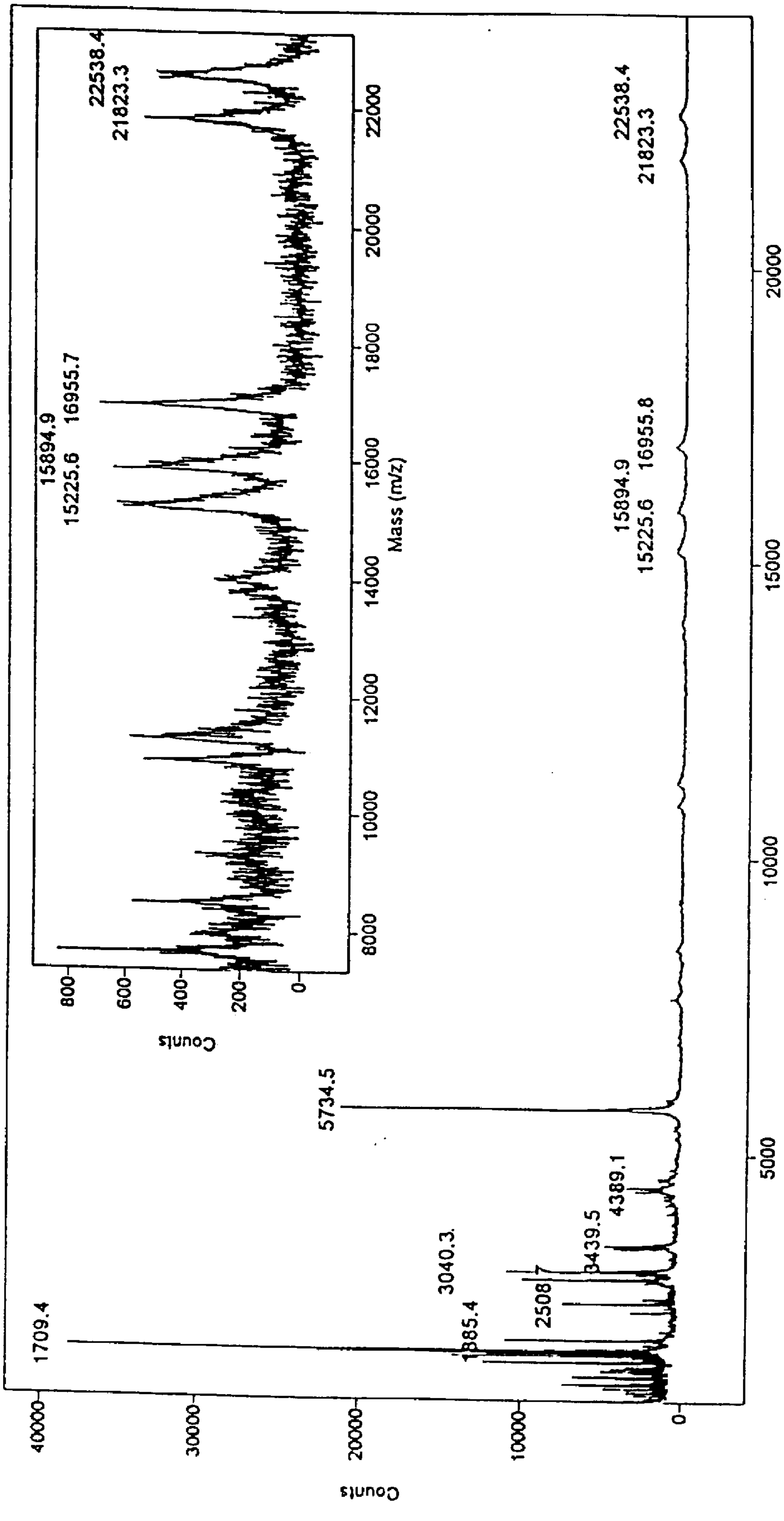
FIG. 27 is a MALDI mass spectrum from one of the pixels in the image track of anterior lobe of the pituitary, taken from the analysis shown in FIG. 25.

A target containing C-18 beads was prepared as a blotting surface to address the problem of mixing of spatially separate protein locations. A sectioned sagital surface of rat pituitary tissue was blotted onto this target and the tissue removed. The target was then washed to remove salts and other contaminants. A single line image across the blotted area over a distance of 625 μm showed the distribution of many peptides on the C-18 surface. FIG. 25 shows a photomicrograph of the tissue section and the line of consecutive analyses across the slice. This line image clearly showed localization of peptides in various parts of the tissue. For example, vasopressin was found in the posterior lobe, diacetylated alpha MSH was found in the intermediate and anterior lobe, and growth hormone was found in the anterior lobe (FIG. 26), corresponding to the natural distribution of these peptides in the pituitary tissue. A typical mass spectrum from one of the pixels in the image track in the anterior lobe of the section is shown in FIG. 27.

Figure 28:
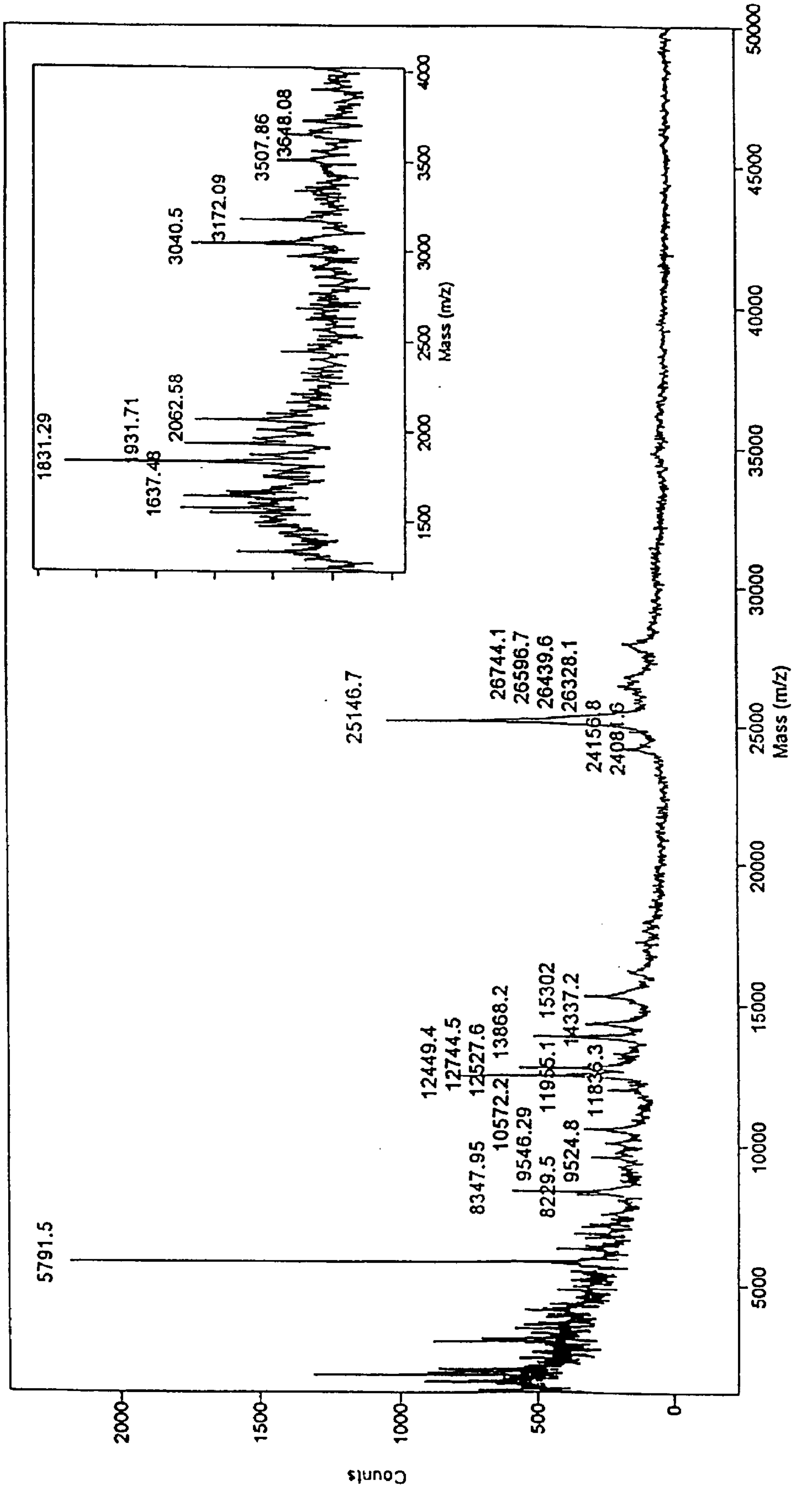
FIG. 28 shows a MALDI mass spectrum of the lower molecular weight peptides and proteins in a slice of a rat splenic pancreas.

In the last example, a slice of rat "splenic" or ventral pancreas was blotted onto a C-18 membrane target. On MALDI analysis of the pancreas, spectra from the blotted target show no glucagon to be detected, but both insulin and pancreatic polypeptide are seen in the spectrum (FIG. 28). Islets in the ventral pancreas contain a high proportion of B cells which produce insulin and D cells which produce pancreatic polypeptide, but very few A cells which produce glucagon. Low molecular weight lipid peaks that had been present in the spectra directly desorbed from the tissue were not as prevalent. Table III lists the proteins and peptides identified in the mass spectra obtained from the C-18 surface for rat pancreas. In some cases, different molecular forms can be observed. For example, the multiplicity of ions around m/z 25,000 reflects the known heterogeneity of the serine proteases present in pancreatic tissue.

TABLE III

PROTEINS IDENTIFIED IN SPECTRUM OF C-18 PRINT OF PANCREAS

| | (M + H)⁺, Calculated | (M + H)⁺, Observed |
|---|---|---|
| Somatostatin-14 | 1638.9 | 1637.5 |
| Pancreatic Polypeptide | 3041.5 | 3040.5 |
| Insulin | 5792.5 | 5791.5 |
| Gastrin Precursor | 11833.0 | 11836.3 |
| Insulin Precursor | 12415.5 | 12413.7 |
| Somatostatin Precursor | 12746.0 | 12744.5 |
| Trypsinogen | 24156.7 | 24156.8 |

The techniques of the present invention provide the ability to image the sample as a function of a spacial arrangement of compounds. This technique may be applied to a slice of tissue and has significant benefits in biological research, as recognized by those skilled in the art. Selected ion surface maps as disclosed in the present application will provide details of compound compartmentalization, cite-specific metallic processing, and selected binding domains for a wide variety of natural and synthetic compounds. Various types of equipment may be used according to the present invention, and different techniques and methods may be employed to generate a sample of interest for mass analysis. Regardless of how the sample is generated, the equipment and techniques of the present invention provide for a laser beam to sequentially strike different locations on the test sample, thereby releasing molecules of interest which are then mass analyzed according to the concepts of the present invention. A suitable mechanism for moving the test sample a predetermined linear distance between laser spots is the motorized X,Y translator (Model 16949) available from Oriel Corporation. Alternatively, the test sample may be stationary, and a suitable moving mechanism provided for moving the successive laser pulses to generate the laser spots at specific locations on the test sample.

In some experiments, only the surface, i.e., several molecular layers, will be of interest and accordingly the display of information in X,Y coordinates as discussed above will suffice. In other experiments, the Z coordinate (depth of sample) may be important. In this case, the method chosen to irradiate the sample can then be used to measure sample depth during irradiation. For example, the mass change of a known compound could provide its relative depth. Surface molecules will arrive at the detector ahead of those lower (deeper) in the sample, and so the deeper molecules will have an apparent mass shift to higher masses since it would take them longer to reach the detector. Another method is time based, such that in a given laser spot, molecules at the surface are desorbed ahead of molecules beneath them. Thus, the desorption of consecutive layers of the sample reveals their relative depth in the sample.

The flatness of the sample is not critical to the above described technique, but may be important, given the type of results required. Overall, the flatter the sample the better. Several factors are (1) for thick sections (80–100 μm), it takes several days of slow drying to get best results. Very fast drying tends to warp the specimen making it complicated to mount. Thin sections (1–10 μm) obviously dry much faster and can be kept flat on the mounting membrane more easily; (2) surface levels that differ significantly in height can produce different mass shifts. Although these shifts tend to be minor (a few mass units), it can still give one an erroneous reading if the required mass accuracy is high (i.e., if one needs ±0.50 mass units); and (3) during sample preparation, samples that are uneven in surface can get "pooling" of extra cellular fluids, i.e., run-off of liquid from higher areas giving concentrations in lower areas that were not present in the original sample.

The size of the laser spot preferably is variable, and is a user-defined input with its specific value dependent on the need of the analyst. The larger the spot size, the fewer spots needed to cover a given area and the lower the amount of data acquired, thereby reducing download, and process time. However, the larger the spot size, the poorer the ability to spacially resolve adjacent locations of compounds. With very small spot sizes, i.e., 1 μm diameter or less, the ability to resolve spacially improves, but this is at the expense of time (more spots needed to cover a given area), thereby dramatically increasing data load.

In a practical sense, being able to selectively vary the laser spot size is very important. A given area may first be exposed to a small number of larger spot sizes to provide a type of "survey" made. If the compounds of interest are present, then smaller spot sizes can be used to increase the resolution of the image so produced.

The foregoing description of the invention is thus illustrative and explanatory, and various changes in the equipment, as well as in the details of the methods and techniques disclosed herein may be made without departing from the spirit of the invention, which is defined by the claims.

What is claimed:

1. A method of analyzing the spacial arrangement of specific molecules within a sample, comprising:

(a) generating a test specimen including a thin sample layer with an energy absorbant matrix;

(b) striking the test specimen with a laser beam such that a predetermined first laser spot on the test specimen releases first sample molecules;

(c) measuring the molecular atomic mass of the released first sample molecules over a range of atomic masses;

(d) moving the test specimen relative to the laser beam a predetermined linear distance functionally related to a size of the predetermined first laser spot;

(e) thereafter striking the test specimen with the laser beam such that a predetermined second laser spot on the test specimen releases second sample molecules;

(f) measuring the molecular atomic mass of the released second sample molecules over a range of atomic masses; and (g) analyzing an atomic mass window of interest within the range of atomic masses to determine the spacial arrangement of specific molecules within the sample.

2. The method as defined in claim 1, wherein analyzing the atomic mass window of interest comprises:

graphically depicting the mass of molecules within the atomic mass window of interest as a function of the linear distance between the first spot and the second spot.

3. The method as defined in claim 2, further comprising:

repeating steps (b) and (c) for numerous laser spots on the test specimen arranged within an X,Y plot; and graphically depicting the atomic mass of molecules within the atomic mass window of interest as a function of the plurality of laser spots on the test specimen arranged within the X,Y plot.

4. The method as defined in claim 1, further comprising:

blotting the sample on a blotting surface to generate the sample layer, the blotting surface being one or more of a liquid absorbing surface, a chemically prepared surface, and biologically prepared surface.

5. The method as defined in claim 1, wherein generating the test specimen includes adding an energy absorbant matrix to the sample layer.

6. The method as defined in claim 5, wherein adding the energy absorbant matrix includes applying the matrix substantially uniformly on the sample layer.

7. The method as defined in claim 1, further comprising:

substantially drying the sample to minimize movement of sample molecules within the sample layer prior to striking the test specimen with laser beams.

8. The method as defined in claim 1, further comprising:

drying the test specimen prior to striking the test specimen with laser beams.

9. The method as defined in claim 1, wherein molecules within the atomic window of interest from the first laser spot are analyzed while the laser beam strikes the second laser spot.

10. The method as defined in claim 1, wherein the atomic mass within a plurality of windows of interest each within the range of atomic masses are analyzed to determine the spacial arrangement of specific molecules within the sample.

11. The method as defined in claim 1, wherein the linear distance of movement between successive laser spots is less than twice the width of each of the successive laser spots.

12. The method as defined in claim 1, further comprising:

concentrating the laser beam such that a width of each laser spot on the test specimen is less than about 25 microns.

13. The method of analyzing a test sample, comprising:

(a) obtaining a sample solution including test sample molecules of interest;

(b) passing the sample solution through a capillary tube and depositing the sample solution in a linear track on an electrically-conductive target plate by capillary electrophoresis;

(c) drying the sample solution while in the linear track on the target plate;

(d) striking the dried linear track with a laser beam such that the linear track releases molecules of interest;

(e) measuring the molecular atomic mass of the released molecules of interest over a range of atomic masses; and (f) analyzing the molecular atomic masses as a function of time indicative of the position of the molecules of interest along the linear track to analyze the test sample.

14. The method as defined in claim 13, wherein the sample solution is deposited on a linear track along a strip of a cellulose membrane.

15. The method as defined in claim 14, wherein a thin layer of an energy absorbing matrix is bonded to the cellulose membrane prior to depositing the sample solution on the target plate.

16. The method as defined in claim 13, wherein the atomic mass of the molecules of interest are analyzed by matrix-assisted laser desorption/ionization mass spectrometry.

17. The method as defined in claim 13, wherein the test sample includes peptides and proteins.

18. The method as defined in claim 13, wherein the sample solution is passed through the capillary tube and onto the target plate at a flow rate of less than about 1 microliter per minute.

19. The method as defined in claim 13, wherein the sample solution is deposited linearly on the target plate as a time domain of a chemical reaction occurring within the solution, such that the analysis of the molecular atomic masses is indicative of chemical changes occurring in the reaction.

20. Apparatus for analyzing a test sample containing molecules of interest, comprising:

a test specimen containing sample molecules of interest and an energy-absorbant matrix;

a laser source for sequentially striking the test specimen with a laser beam at a plurality of laser spots on the test specimen for sequentially releasing sample molecules from each laser spot;

a moving mechanism for sequentially moving the test specimen relative to the laser beam a predetermined linear distance functionally related to the size of the laser spots prior and subsequent to the movement;

a mass analyzer for measuring the atomic mass of the released sample molecules over a range of atomic masses;

a computer for receiving atomic mass data from the mass analyzer; and a display for depicting atomic mass within an atomic mass window of interest as a function of individual laser spots on the test specimen.

21. The apparatus as defined in claim 20, further comprising:

a laser mask for selectively shaping and defining the size of the laser spots on the test specimen.

22. The apparatus as defined in claim 21, wherein the moving mechanism linearly moves the laser beam relative to the test specimen between successive laser spots a distance of less than about twice the width of each of the successive laser spots.

23. The apparatus as defined in claim 20, wherein the atomic mass of molecules within the atomic mass window of interest are graphically depicted as a function of a plurality of laser spots on the test specimen arranged within an X,Y plot.

24. The apparatus as defined in claim 20, wherein released molecules within the atomic mass window of interest from one laser spot are analyzed while the laser beam strikes another laser spot.

25. The apparatus as defined in claim 20, wherein the test specimen includes an electrically-conductive membrane with molecules of interest arranged in a linear track thereon.

26. The apparatus as defined in claim 25, wherein a solution containing samples of interest is deposited by capillary electrophoresis in the linear track along a strip of the cellulose membrane.

27. The apparatus as defined in claim 20, wherein the atomic mass of the molecules of interest are analyzed by a matrix-assisted laser desorption/ionization mass spectrometer.

* * * * *